(12) United States Patent
Koga et al.

(10) Patent No.: US 7,748,592 B2
(45) Date of Patent: Jul. 6, 2010

(54) FRICTION STIR WELDING DEVICE

(75) Inventors: Shinji Koga, Kobe (JP); Masayuki Inuzuka, Ikeda (JP); Hidehito Nishida, Kobe (JP); Yasuo Otsuki, Akashi (JP); Katsumi Nakashima, Kobe (JP); Goro Nishiyama, Miki (JP); Kentaro Yamazaki, Marugame (JP); Kouichi Ohta, Sakaide (JP)

(73) Assignees: Kawasaki Jukogyo Kabushiki Kaisha, Kobe (JP); Kabushiki Kaisha Kawasaki Zosen, Kobe (JP)

( * ) Notice: Subject to any disclaimer, the term of this patent is extended or adjusted under 35 U.S.C. 154(b) by 424 days.

(21) Appl. No.: 11/454,889

(22) Filed: Jun. 19, 2006

(65) Prior Publication Data

US 2007/0000972 A1 Jan. 4, 2007

(30) Foreign Application Priority Data

Jun. 21, 2005 (JP) ............................. 2005-180702

(51) Int. Cl.
*B23K 20/12* (2006.01)
(52) U.S. Cl. .................... 228/2.1; 228/112.1
(58) Field of Classification Search ................. 228/2.1, 228/112.1; 408/77
See application file for complete search history.

(56) References Cited

U.S. PATENT DOCUMENTS

| | | | |
|---|---|---|---|
| 1,728,367 A * | 9/1929 | Sapp ........................... 408/77 |
| 3,176,587 A | 4/1965 | Appleton et al. | |
| 3,323,354 A * | 6/1967 | Daubresse et al. ............. 73/620 |
| 3,387,509 A * | 6/1968 | Lupear ......................... 408/76 |
| 3,575,364 A | 4/1971 | Frederick | |
| 3,764,777 A * | 10/1973 | Sakabe et al. .......... 219/124.31 |
| 4,095,378 A * | 6/1978 | Urakami ....................... 451/88 |
| 4,122,990 A * | 10/1978 | Tasaki et al. .................. 228/2.3 |
| 4,777,971 A * | 10/1988 | Tribout et al. ............... 134/99.1 |
| 5,302,045 A * | 4/1994 | Johnsen ................... 403/322.1 |
| 5,543,600 A * | 8/1996 | Ozamoto et al. ........ 219/124.34 |
| 5,693,286 A * | 12/1997 | Hatanaka et al. ............... 266/67 |
| 5,852,984 A * | 12/1998 | Matsuyama et al. .......... 114/222 |
| 5,853,655 A * | 12/1998 | Baker ........................... 266/44 |
| 6,173,880 B1 * | 1/2001 | Ding et al. .................... 228/2.1 |
| 6,276,478 B1 * | 8/2001 | Hopkins et al. ............... 180/164 |
| 6,325,273 B1 * | 12/2001 | Boon et al. ................. 228/112.1 |
| 6,691,811 B2 * | 2/2004 | Bruntrup et al. ............. 180/164 |
| 6,719,184 B2 * | 4/2004 | Ishida et al. .............. 228/112.1 |
| 6,917,013 B2 * | 7/2005 | Kondo .................... 219/124.31 |

(Continued)

FOREIGN PATENT DOCUMENTS

DE 3015532 A * 10/1981

(Continued)

*Primary Examiner*—Kiley Stoner
*Assistant Examiner*—Carlos Gamino
(74) *Attorney, Agent, or Firm*—Oliff & Berridge, PLC

(57) ABSTRACT

A friction stir welding device for welding an article by means of a welding tool, includes: a tool holding section configured to hold the welding tool and rotate round a predetermined reference axial line; rotation driving unit configured to drive the tool holding section to rotate round the reference axial line; movement driving unit configured to drive the tool holding section to move along the reference axial line; and a car body loaded with the tool holding section, the rotation driving unit and the movement driving unit, the car body being configured to travel above or below the article.

13 Claims, 34 Drawing Sheets

U.S. PATENT DOCUMENTS

| | | | |
|---|---|---|---|
| 6,964,312 B2 * | 11/2005 | Maggio | 180/164 |
| 7,225,968 B2 * | 6/2007 | Packer et al. | 228/112.1 |
| 7,387,475 B2 * | 6/2008 | Beggs et al. | 408/76 |
| 2004/0026390 A1 | 2/2004 | Kondo | |

FOREIGN PATENT DOCUMENTS

| | | |
|---|---|---|
| FR | 2 769 529 A1 | 4/1999 |
| GB | 2 320 218 A | 6/1998 |
| JP | A 2002-160077 | 6/2002 |
| JP | A 2005-186084 | 7/2005 |

* cited by examiner

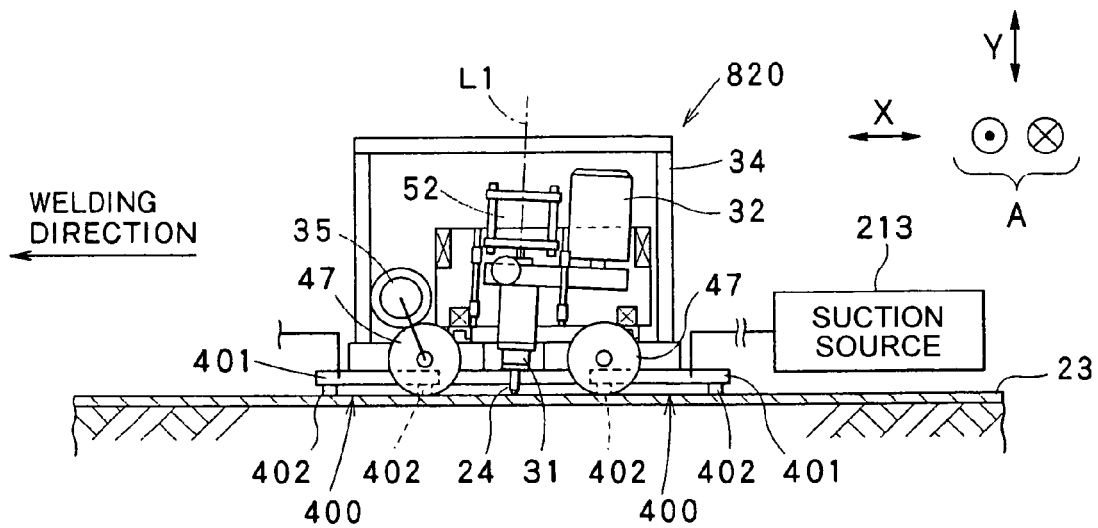
F I G . 4 2
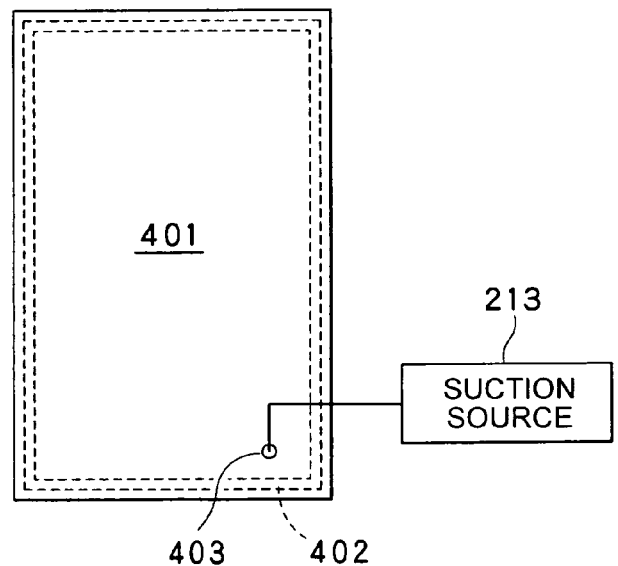
F I G . 4 3

FRICTION STIR WELDING DEVICE

CROSS REFERENCE TO RELATED APPLICATIONS

This application is based upon the prior Japanese Patent Application No. 2005-180702 filed on Jun. 21, 2005, the entire contents of which are incorporated herein by reference.

BACKGROUND

1. Field of the Invention

The present invention relates to a friction stir welding device for welding an article to be welded by frictionally stirring the same.

2. Description of the Related Art

An article to be welded forms a joint section by butting two members to be welded. The friction stir welding device fluidizes and stirs the joint section of the article to be welded due to frictional heat by a welding tool, thereby welds the two members to be welded.

FIG. 51 is a perspective view showing a friction stir welding device 1 of the first related art. The friction stir welding device 1 of the first related art includes a friction stir welding (FSW) head 2 and a table 3. The FSW head 2 is provided with a welding tool 4 and rotates the welding tool 4 round a predetermined reference axial line L1 and also moves it along the reference axial line L1. The table 3 butts two members to be welded 5 and 6, thereby holds them as an article to be welded 9.

The table 3 includes a workpiece holding section 7 for holding the article 9, a base 8, and a table driving means (not shown). The workpiece holding section 7 is movably installed on the base 8. The table driving means moves the workpiece holding section 7 in parallel with a welding line 10 of the article 9. The FSW head 2 is fixed to the base 8 of the table 3 by a column section 12. The column section 12 is extended horizontally so as to one-sidedly support the FSW head 2.

FIGS. 52 and 53 are perspective views showing friction stir welding devices 13 and 15 of the second related art. The friction stir welding devices 13 and 15 of the second related art include a support section 16 for supporting the FSW head 2 and a head driving means 14 for driving to move the support section 16. The support section 16 supports the FSW head 2 extended horizontally one-sidedly or double-sidedly. The head driving means 14 moves the support section 16 in parallel with the welding line 10 of the article 9. For example, Japanese Patent Laid-Open Publication No. 2002-160077 discloses this kind of related art.

In the first related art aforementioned, the table driving means must convey the workpiece holding section 7 extending over the length of the welding line 10 or more. Further, in the second related art, the table driving means must convey the support section 16 over the length of the welding line 10 or more. Further, the head driving means 14 must carry the support section 16 horizontally outside the article 9.

There is a case that the article to be welded 9 is large and heavy such as a pillar panel, a hull structural member, or a railroad car panel. In this case, in the friction stir welding devices 1, 13, and 15 of the related arts, the table driving means and the head driving means are also made inevitably large. Therefore, the equipment cost and installation space are also made inevitably large. When the friction stir welding device is made large, it is necessary to ensure the positioning accuracy of the welding tool required for friction stir welding in a wide space. Further, the own weight of the device itself is made heavy due to enlargement, so that it is necessary to increase the strength of the driving means.

As mentioned above, in the related arts, when the article to be welded 9 is large, a large friction stir welding device is necessary. Thus the capital investment required for manufacture and introduction thereof is increased inevitably. Further, it is difficult for one friction stir welding device to flexibly deal with articles to be welded in different shapes.

SUMMARY

Therefore, an object of the present invention is to provide a friction stir welding device capable of flexibly dealing with various articles to be welded regardless of the size and shape thereof.

The present invention is a friction stir welding device for welding an article to be welded by frictionally stirring the article by means of a welding tool, comprising: a tool holding section configured to hold the welding tool and rotate round a predetermined reference axial line; rotation driving means configured to drive the tool holding section to rotate round the reference axial line; movement driving means configured to drive the tool holding section to move along the reference axial line; and a car body loaded with the tool holding section, the rotation driving means and the movement driving means, the car body being configured to travel above or below the article.

According to the present invention, in the state that the tool holding section holding the welding tool is rotated and the welding tool is immersed into the article to be welded, the car body is able to travel above or below the article to be welded along a welding line of the article. By doing this, the two members are welded. There is no need to move the article to be welded. Moreover, the car body can travel above or below the article to be welded, so that the friction stir welding device does not need to support the tool holding section, the rotation driving means, and the movement driving means outside the article in the horizontal direction. Therefore, the friction stir welding device can perform welding by frictional stirring regardless of the size and shape of articles to be welded.

Therefore, even if the article to be welded is large, the friction stir welding device is not necessarily enlarged. Therefore, the equipment cost and installation space of the friction stir welding device can be reduced. Further, even if the shape of the article to be welded is changed, only the traveling route of the friction stir welding device is changed and there is no need to separately install a new device. By doing this, a flexible applicability is available and the wide usability can be improved.

Preferably, the car body comprising a contact portion which is configured to make contact with a part of a guide body on one side of the guide body in a width direction in a traveling state of the car body, the guide body being disposed so as to extend parallel with a welding line of the article while keeping a predetermined interval from the welding line, the contact portion transmitting a reaction force, which is given from the article in a transverse direction perpendicular to both the reference axial line and a traveling direction of the car body, to the guide body.

Further, according to the present invention, the car body travels in the state that the contact portion is in contact with the guide body, so that it is guided by the guide body. Therefore, the car body is prevented from greatly shifting in the transverse direction, and can travel while keeping a predetermined positional relationship with respect to the welding line. In other words, the car body is guided by the guide body to travel.

Concretely, if the car body travels along the welding line in the state that the rotating welding tool is immersed in the article to be welded, it is applied with reaction force acting in the transverse direction from the article. The reaction force is force applied in the direction in which the outer circumferential part of the tool holding section passes the welding line on the backward side in the traveling direction. When the car body in travelling is applied with the reaction force in the transverse direction, the contact portion makes contact with the guide body and transmits the reaction force to the guide body, so that the car body is prevented from shifting in the transverse direction from the welding line.

Further, according to the present invention, the contact portion makes contact with the part of the guide body on one side in the width direction, so that the guide body can put the car body into the guidable state. Therefore, compared with a case that contract sections are arranged on both sides of the guide body in the width direction, that is, a case that the so-called cam follower is used, the preparation operation for frictional stirring and welding can be simplified.

Preferably, the friction stir welding device further comprises: shift amount detection means configured to detect a shift amount of the tool holding section from the welding line in the transverse direction; correction moving means mounted on the car body and configured to move the tool holding section in the transverse direction with respect to the car body; and control means configured to control the correction moving means based on a detection result of the shift amount detection means.

According to the present invention, a shift amount of the tool holding section from the welding line in the transverse direction is detected by the shift amount detection means. And, the control means controls the correction moving means so as to cancel the shift by moving the tool holding section with respect to the article to be welded. The shift of the tool holding section from the welding line is canceled in this way, thus even if the guide body is slightly shifted from the installation line parallel with the welding line, the article can be welded accurately along the welding line. Therefore, there is no need to extend accurately the guide body and the welding preparation can be made easier.

Preferably, the car body comprises a wheel or an endless belt which is configured to rotate on a traveling road surface.

Preferably, the wheel or the endless belt is configured to be detachably mounted on any one of upper and lower sides of the car body so that the car body can be reversed upside down together with the tool holding section.

Preferably, the car body is configured to travel in a trackless manner.

Preferably, the car body is configured to be placed on the article so as to travel on the article.

Preferably, the car body is configured to travel above the article. The friction stir welding device further comprises suctioning means mounted on the car body and configured to be attached to a traveling road surface by suction so that the car body is fixed on the traveling road surface.

According to the present invention, when immersing the welding tool into the article to be welded, the car body receives reaction force in the reference axial direction from the article. When the car body is fixed on the traveling road surface by the suctioning means, pressing force against the reaction force can be given to the car body, thus the car body can be prevented from rising from the traveling road surface. By doing this, the immersion amount of the welding tool into the article can be prevented from deficiency and the welding quality can be improved. Further, according to the present invention, the car body is pressed against the traveling road surface by the suctioning means, thus as compared with the case that a weight is loaded on the car body to prevent the car body from rising, the car body can be lightened. Therefore, the friction stir welding device can be conveyed easily and the welding preparation can be made easily.

Preferably, the suctioning means comprises an opposite section connected to the car body so as to be opposite to the traveling road surface and a pad section configured to close a space between the opposite section and the traveling road surface, a fluid filled in a suction space enclosed by the opposite section and the pad section being suctioned by a suction source.

According to the present invention, the fluid filled in the suction space is suctioned by the suction source, thus the pressure inside the suction space is decreased compared with the atmospheric pressure. By doing this, the opposite section is pressed to the traveling road surface by the atmospheric pressure and the car body is pressed to the traveling road surface. Therefore, the car body, when the welding tool is immersed, can be prevented from rising from the traveling road surface.

Preferably, the suction source is installed separately from the car body.

Since the suction source is installed separately from the car body, the friction stir welding device can be lightened more. Further, the horizontal area of the opposite section can be made larger, thus the suction force can be made larger and the friction stir welding device can be prevented surely from rising from the welded article.

Preferably, the suction space is formed in an area excluding a backward space in a middle in a transverse direction which is perpendicular to both the reference axial line and a traveling direction of the car body, the backward space extending backward in the traveling direction from the reference axial line including the reference axial line.

According to the present invention, when the car body travels above the article to be welded and frictional stirring and welding are performed, the opposite section of the suctioning means is prevented from facing the welding mark portion of the welded article. Therefore, the pad section can be prevented from touching burrs formed in the welding mark portion of the welded article and the adhesion of the suction space can be kept. The life span of the pad section can be lengthened. Further, even if the welding mark portion is uneven, the gap between the pad section and the welded article is prevented from growing larger and the adhesion of the suction space can be prevented from lowering.

Preferably, the suction space is formed in an area excluding a forward space in a middle in a transverse direction which is perpendicular to both the reference axial line and a traveling direction of the car body, the forward space extending forward in the traveling direction from the reference axial line including the reference axial line.

According to the present invention, when the car body travels above the article to be welded and frictional stirring and welding are performed, the opposite section of the suctioning means is prevented from facing the beveling portion of the article to be welded. Therefore, the pad section can be prevented from touching burrs formed in the beveling portion of the article to be welded and the adhesion of the suction space can be kept. The pad section can be prevented from damage and the life span thereof can be lengthened. Further, even if the beveling portion is uneven, the gap between the pad section and the article to be welded is prevented from growing larger and the adhesion of the suction space can be prevented from lowering.

Preferably, the suction space comprises a plurality of suction spaces, fluids filled in the suction spaces being able to be suctioned independently of each other.

Preferably, the suction spaces comprises a first suction space formed forward in a traveling direction with respect to the reference axial line and a second suction space formed backward in the traveling direction with respect to the reference axial line, fluids filled in the first and the second suction spaces being able to be suctioned independently of each other.

According to the present invention, the suction operation of a fluid filled in each suction space can be switched. When the fluid filled in the first suction space is suctioned, even if the part of the welding device on the backward side in the traveling direction with respect to the reference axial line is not arranged on the article to be welded, the welding device can be pressed surely to the article to be welded. Further, when the fluid filled in the second suction space is suctioned, even if the part of the welding device on the forward side in the traveling direction with respect to the reference axial line is not arranged on the article to be welded, the welding device can be pressed surely to the article to be welded.

Therefore, when welding the end of the article on the upstream side in the traveling direction, the fluid filled in the first suction space is suctioned. And when welding the end of the article on the downstream side in the traveling direction, the fluid filled in the second suction space is suctioned. Thus the welding device can be prevented from rising from the article over both ends of the article in the welding direction thereof and the welding quality can be improved.

Preferably, the car body comprises a wheel or an endless belt which is configured to rotate on the traveling road surface. The suction means comprises a plurality of suction spaces circumferentially arranged on an outer periphery of the wheel or the endless belt so as to open radially outward, a fluid in a part of the suction spaces opposite to the traveling road surface being suctioned by a suction source when the car body is traveling on the traveling road surface.

Preferably, the article comprises two members to be welded, each of the members being formed in a curved surface shape.

By use of the aforementioned friction stir welding device of the present invention, the wide usability can be improved and even if the members to be welded are formed in a curved surface shape, the time required for welding preparation can be decreased, and the restrictions on the welding equipment can be reduced, and the two members can be welded easily. Further, according to the related art, when the members to be welded are formed in a curved surface shape, the adjustment of the FSW head in the vertical direction is complicated. On the other hand, when the welding device travels above the article to be welded as in the present invention, the immersion amount of the welding tool can be adjusted easily and the adjustment of the welding tool in the vertical direction can be prevented from complication.

The present invention is a guide body for guiding a friction stir welding device as defined above, wherein the guide body is configured to be attached by suction to the article or an object fixed to the article.

According to the present invention, the car body of the friction stir welding device is guided, thus the car body can travel along the welding line, thereby can be prevented from shifting greatly in the transverse direction from the welding line. The guide body is fixed by suction to the article or the fixed object when it is positioned parallel with the welding line, thus the guide body can be fixed simply to the article or the fixed object. Further, the suction force given to the guide body is released after completion of the frictional stirring and welding, thus the fixing of the guide body to the article or the fixed object can be released simply.

Therefore, the welding preparation can be made easily and the time required for welding preparation can be shortened. Further, as compared with the case that the guide body is fixed to the article to be welded by welding, little damage is caused to the welded article or fixed object. Further, the guide body can be fixed regardless of the materials of the welded article and fixed object, thus the wide usability can be improved.

BRIEF DESCRIPTION OF THE DRAWINGS

The above and other objects, features and advantages of the present invention will become more apparent from the following description taken in connection with the accompanying drawings, in which:

FIG. 42 is a side view showing the welding device 820;

FIG. 43 is a plan view showing a suction means 400;

DETAILED DESCRIPTION OF EMBODIMENTS

Figure 1:
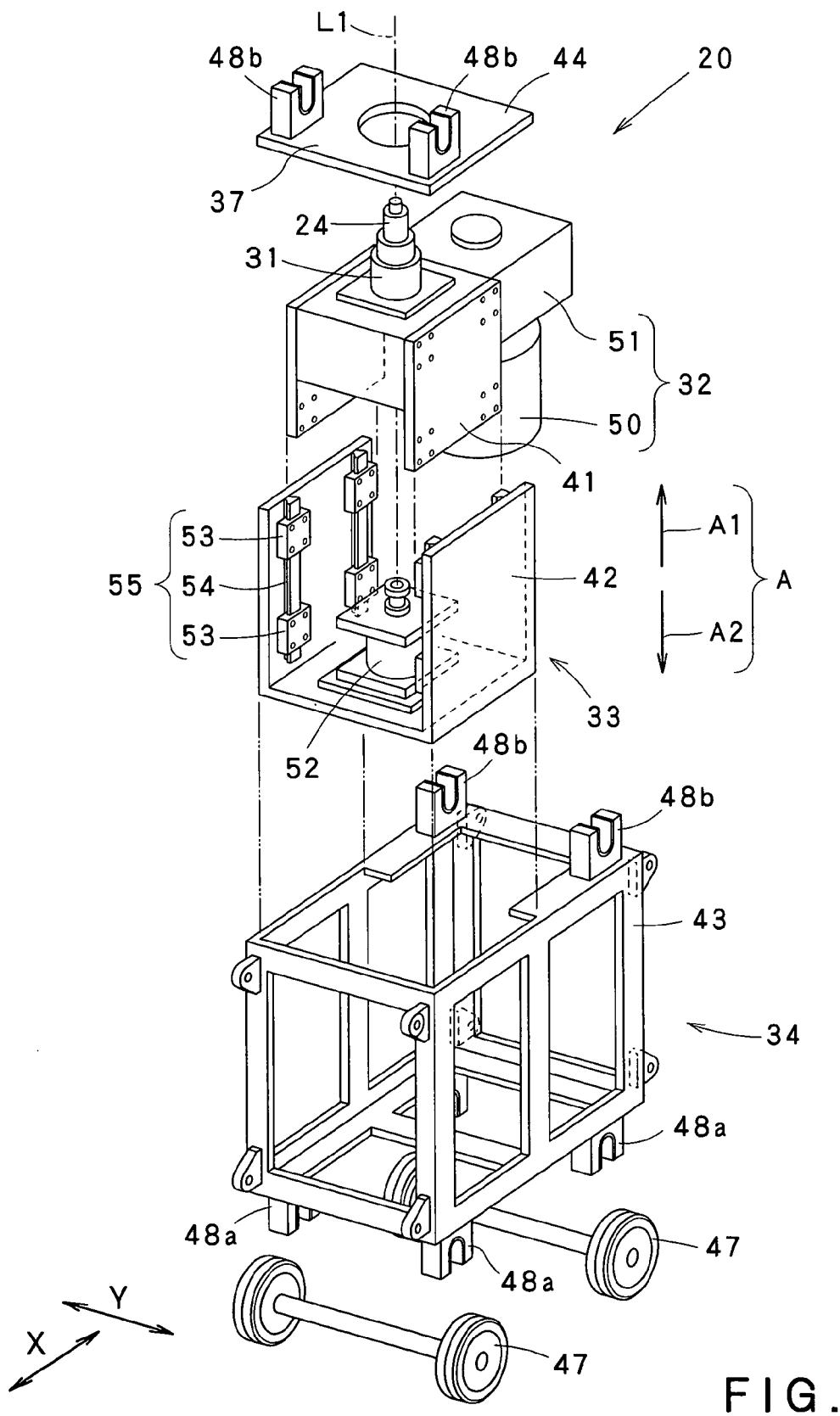
FIG. 1 is an exploded perspective view showing a friction stir welding device 20 of a first embodiment of the present invention.
Figure 2:
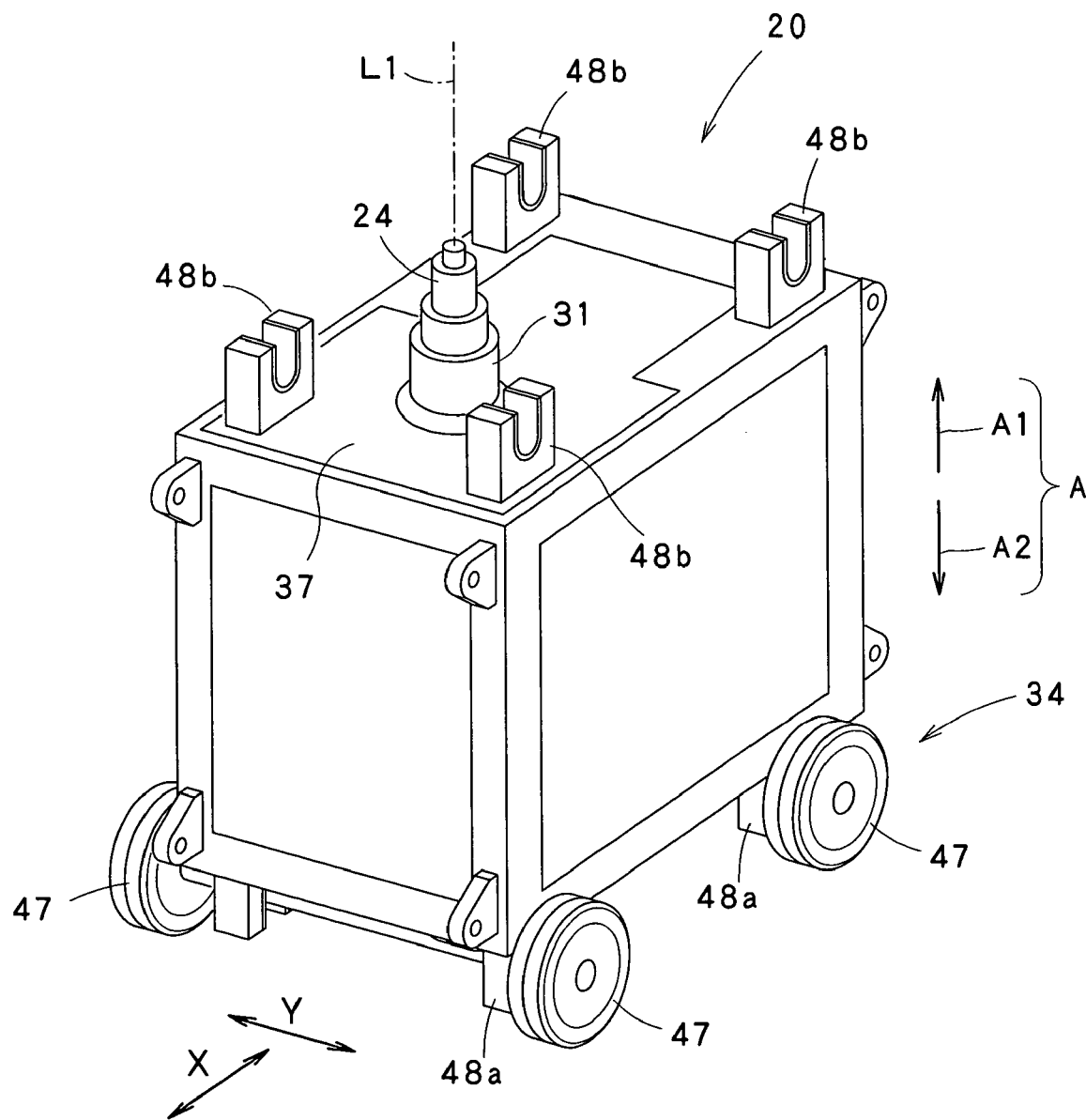
FIG. 2 is a perspective view showing the friction stir welding device 20.
Figure 3:
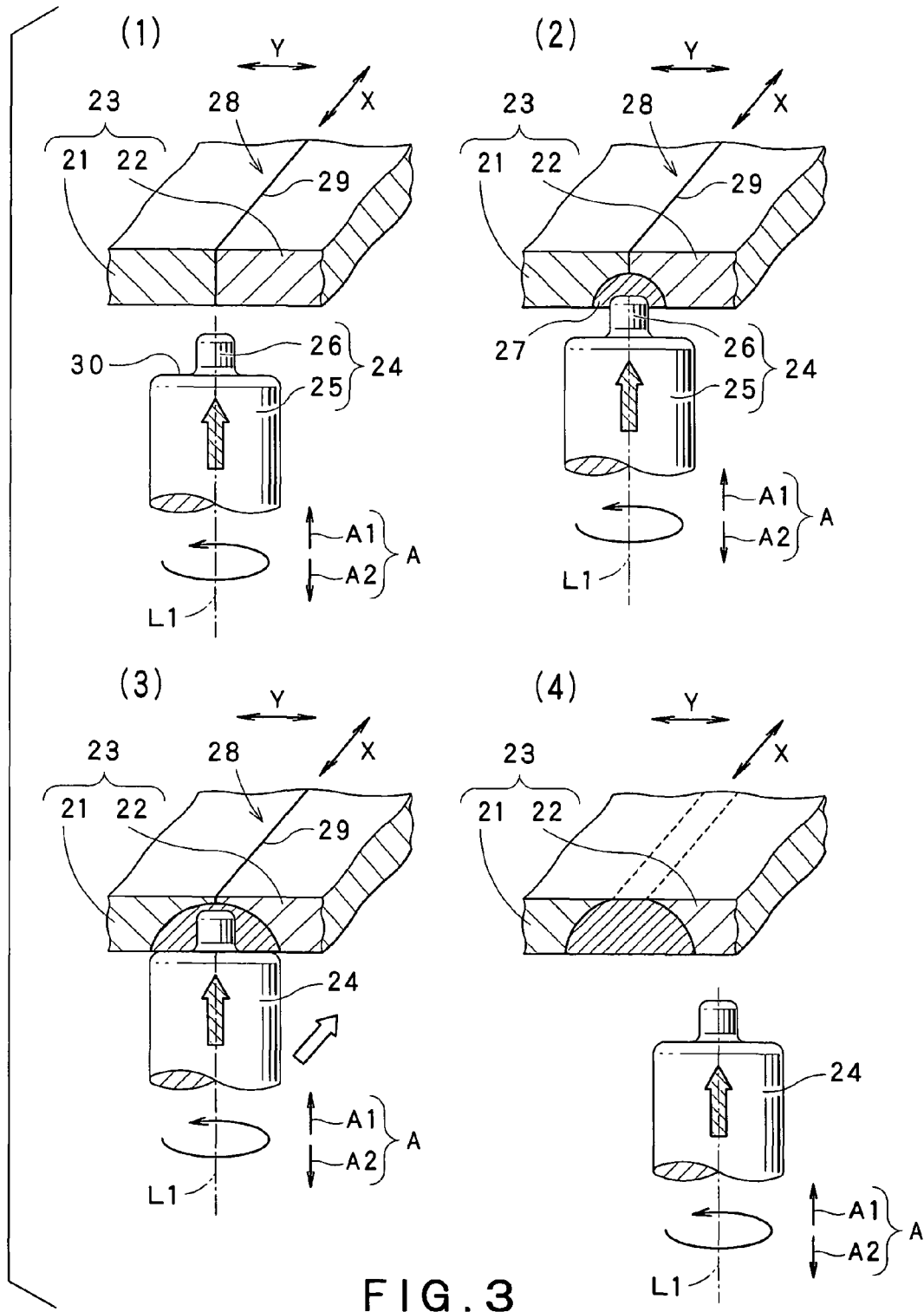
FIG. 3 is a sectional view showing a welding procedure by the friction stir welding device 20.

Referring to FIGS. 1 to 3, the friction stir welding (abbreviated to FSW) device welds an article to be welded 23 composed of two members to be welded 21 and 22 which are butted and arranged side by side. In the article 23, a joint section 28 is formed at the part where the two members 21 and 22 are butted. The welding device 20 moves a welding tool 24 along the joint section 28 and welds continuously the members 21 and 22. On the surface of the joint section 28, a welding line 29 which is a boundary line between the members 21 and 22 is formed. The welding line 29, for example, is extended linearly.

The friction stir welding device 20 (hereinafter, referred to as just the welding device 20) is equipped with the cylindrical welding tool 24 and performs frictional stirring and welding using the welding tool 24. As shown in FIG. 3, the welding tool 24 includes a body part 25 formed in an almost columnar shape and a pin part 26 which is projected on one side A1 in the axial direction from the body part 25 and is formed in an almost columnar shape. The body part 25 has a shoulder surface 30 which is an end face on one side A1 in the axial direction. The shoulder surface 30 is formed almost perpendicularly to the axial line L1 of the welding tool 24. The pin part 26 is projected perpendicularly from the shoulder surface 30. The body part 25 and pin part 26 are formed coaxially and the outside diameter of the pin part 26 is smaller than the outside diameter of the body part 25.

The welding tool 24 is rotating and immersed into the article to be welded 23, thus the article 23 is fluidized partially by the frictional heat with the welding tool 24, and a fluidized portion 27 is solid-phase stirred. The fluidized portion 27 of the article 23 is mixed mutually. Hereafter, the fluidized portion 27 is set, thus the members 21 and 22 are welded. The members 21 and 22 are, for example, composed of an aluminum alloy.

Figure 7:
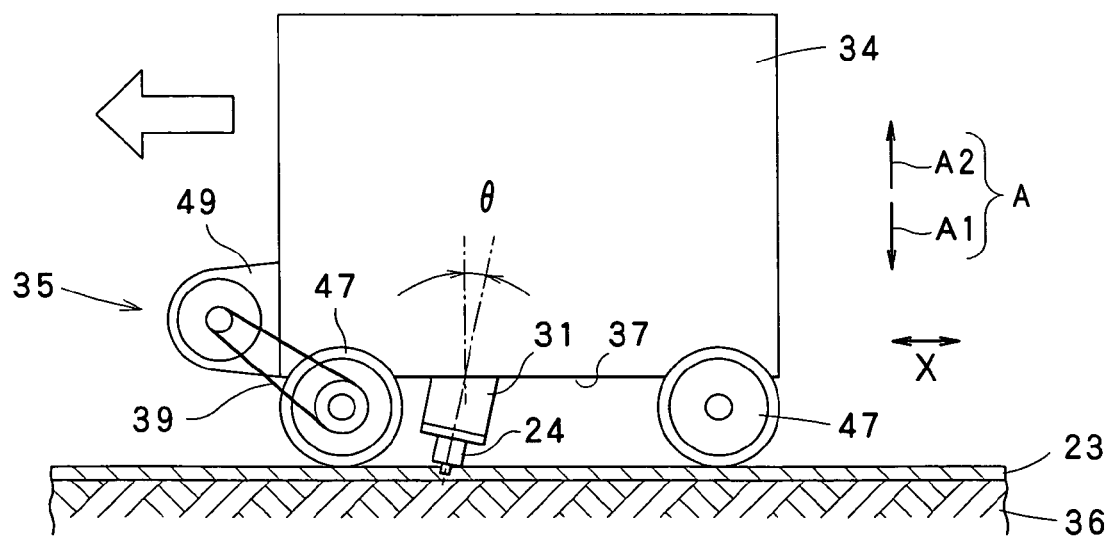
FIG. 7 is a sectional view showing the welding device 20 having a traveling means 35.
Figure 8:
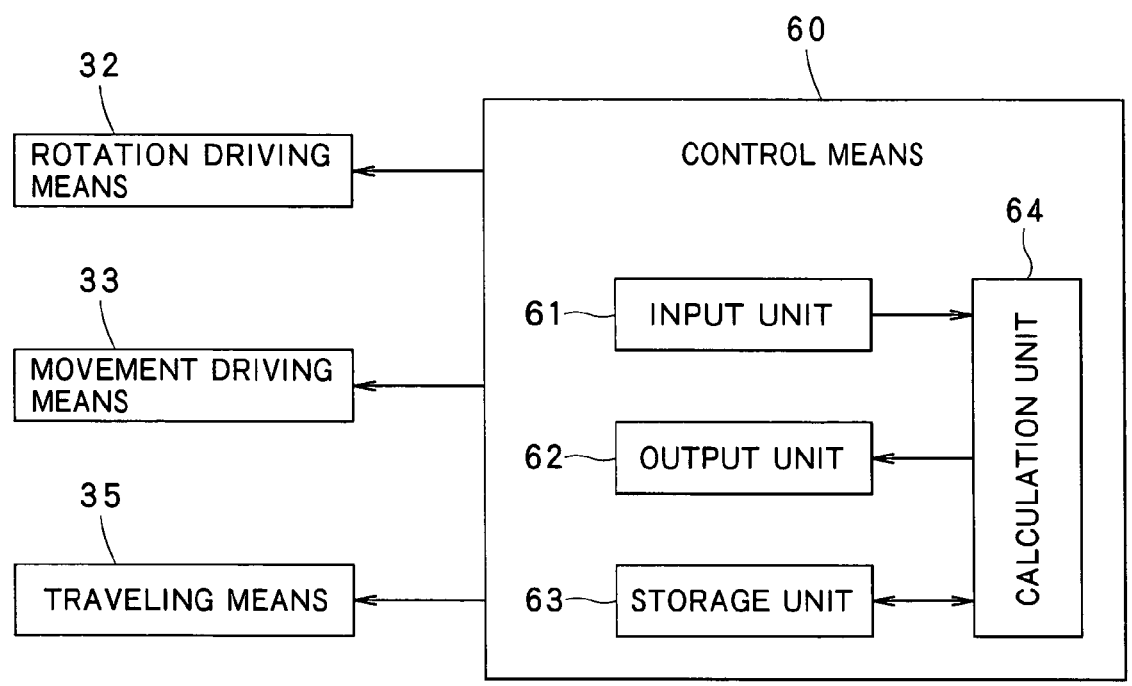
FIG. 8 is a block diagram showing an electric constitution of the welding device 20.

As shown in FIG. 1, the welding device 20 is structured so as to include a tool holding section 31, a rotation driving means 32, a movement driving means 33, a car body 34, a traveling means 35 (FIG. 7), and a control means 60 (FIG. 8).

The welding device 20 has a predetermined reference axial line L1. Further, the reference axial line L1 is an axial line which is coaxial with the welding tool 24 when the welding tool 24 is mounted. Further, the reference axial line L1 is extended vertically at time of welding. Further, in the embodiment of the present invention, the direction extending along the reference axial line L1 is assumed as a reference axial direction A and the direction in which the welding tool 24 travels along the welding line 29 is assumed as a traveling direction X. Further, the direction perpendicular to the traveling direction X and reference axial direction A is assumed as a transverse direction Y.

The tool holding section 31 holds removably the welding tool 24. In the welding tool 24 mounted on the tool holding section 31, the axial line thereof is arranged coaxially with the reference axial line L1 of the welding device 20. The tool holding section 31 is loaded on the car body 34 and is installed rotatably round the reference axial line L1 with respect to the car body 34. Further, the tool holding section 31 is installed movably in the reference axial direction A with respect to the car body 34.

The rotation driving means 32 drives the tool holding section 31 to rotate round the reference axial line L1. The rotation driving means 32 includes a rotation power generation source 50 and a rotation transfer section 51. The rotation power generation source 50 generates power for rotating the tool holding section 31 round the reference axial line L1. Concretely, the rotation power generation source 50 is realized by an electric motor, for example, an induction motor or a servo motor. The electric motor, when power is supplied from the power source, rotates the output shaft thereof. Further, the electric motor is controlled by the control means. In this case, the control means adjusts the current supplied to the electric motor.

The rotation transfer section 51 transfers turning force generated by the rotation power generation source 50 to the tool holder section 31. Concretely, the rotation transfer section 51 is realized by a gear transfer mechanism including a plurality of gears and a gear box for supporting rotatably the gears. The rotation transfer section 51 decelerates the rotation of the output shaft of the servo motor and gives the turning force to the tool holding section 31. Further, the rotation transfer section 51 may be a mechanism other than the gear transfer mechanism, for example, a belt transfer mechanism.

The movement driving means 33 drives the tool holding section 31 to move in the reference axial direction A. The movement driving means 33 has a movement power generation source 52. The movement power generation source 52 generates power for moving the tool holding section 31 in the reference axial direction A. Concretely, the movement power generation source 52 is realized by a pressure cylinder and in this embodiment, is realized by a double-acting air cylinder.

In the air cylinder, the cylinder tube is arranged coaxially with the reference axial line L1 and when compressed air is supplied from the pressure source, the piston rod is moved forward and backward in the reference axial direction. On the piston rod, a joint is formed at the portion exposed out of the cylinder tube. The joint is joined to the tool holding section 31 directly or indirectly. The piston rod is moved forward and backward, thereby gives power to the tool holding section 31. Further, the air cylinder is controlled by the control means. In this case, the control means adjusts the supply route of compressed air to be supplied to the cylinder and supply condition.

The car body 34 loads the tool holding section 31, rotation driving means 32, and movement driving means 33. In this embodiment, the car body 34 is structured so as to include a motor support section 41, a cylinder support section 42, a frame body 43, a cover 44, and wheels 47. The motor support section 41 supports rotatably the tool holding section 31 round the reference axial line L1. Further, the motor support section 41 supports the electric motor (rotation power generation source) 50 and gear box (rotation transfer section) 51. Further, the cylinder support section 42 supports the air cylinder (movement power generation source) 52.

The cylinder support section 42 is loaded in the frame body 43. Further, the cylinder support section 42 supports movably the motor support section 41 in the reference axial direction A. The cylinder support section 42 has a rail mechanism 55 for guiding the motor support section 41 in the reference axial direction A.

The rail mechanism 55 includes rails 54 extending in the reference axial direction A and guide bodies 53 guided by the rails 54. The guide bodies 53 are installed movably in the reference axial direction A and are prevented from movement in the other directions. The motor support section 41 is connected to the guide bodies 53. Therefore, the motor support section 41 is installed movably in the reference axial direction A with respect to the cylinder support section 42. In this embodiment, a plurality of, e.g., four rail mechanisms 55 are installed. The four rail mechanisms 55 are arranged side by side respectively in the traveling direction X and transverse direction Y.

The frame body 43 stores the cylinder support section 42 and motor support section 41. The frame body 43 is set sufficiently strong so as to be free of damage, even if reaction force from the welded article 23 during frictional stirring and welding is given. In this embodiment, the frame body 43 is formed in a cubic shape. Further, the cover 44 covers the outer periphery of the frame body 43. The covered frame body 43 is formed in a cubic box shape. Further, the cover 44 on one side A1 in the reference axial direction has a through hole formed in the reference axial direction L1. Through it, the tool holding section 31 is formed so as to project from the car body 34 on one side A1 in the reference axial direction.

The car body 34 includes the wheels 47 and wheel support sections 48a and 48b for supporting rotatably the wheels 47. The wheel support sections 48a and 48b are installed in either of the frame body 43 or the cover 44. When the wheels 47 are mounted on the wheel support sections 48a and 48b, the car body 34 is structured so as to travel.

The wheel support sections 48a and 48b include the first wheel support sections 48a and second wheel support sections 48b. The first wheel support sections 48a are installed on the other side A2 in the reference axial direction, that is, on the opposite side of the tool holding section 31. The second wheel support sections 48b are installed on one side A1 in the reference axial direction, that is, on the side of the tool holding section 31. The wheels 47 are mounted removably on the wheel support sections 48 and are installed mountably on both the first wheel support sections 48a and second wheel support sections 48b.

The welding device 20, at time of frictional stirring and welding, is arranged so that the reference axial line L1 is extended vertically. Further, in the car body 34, an opposite surface 37, which is an end face on one side A1 in the reference axial direction, can be arranged as either of the top and bottom of the car body 34. As shown in FIG. 2, in the arrangement condition that the opposite surface 37 is the top of the car body 34, the wheels 47 are mounted on the first wheel support sections 48a. Further, in the arrangement condition that the opposite surface 37 is the bottom of the car body 34, the wheels 47 are mounted on the second wheel support sections 48b. Therefore, even if the opposite surface 37 is arranged upward or downward, the car body 34 is structured so as to travel by the wheels 47.

Figure 4:
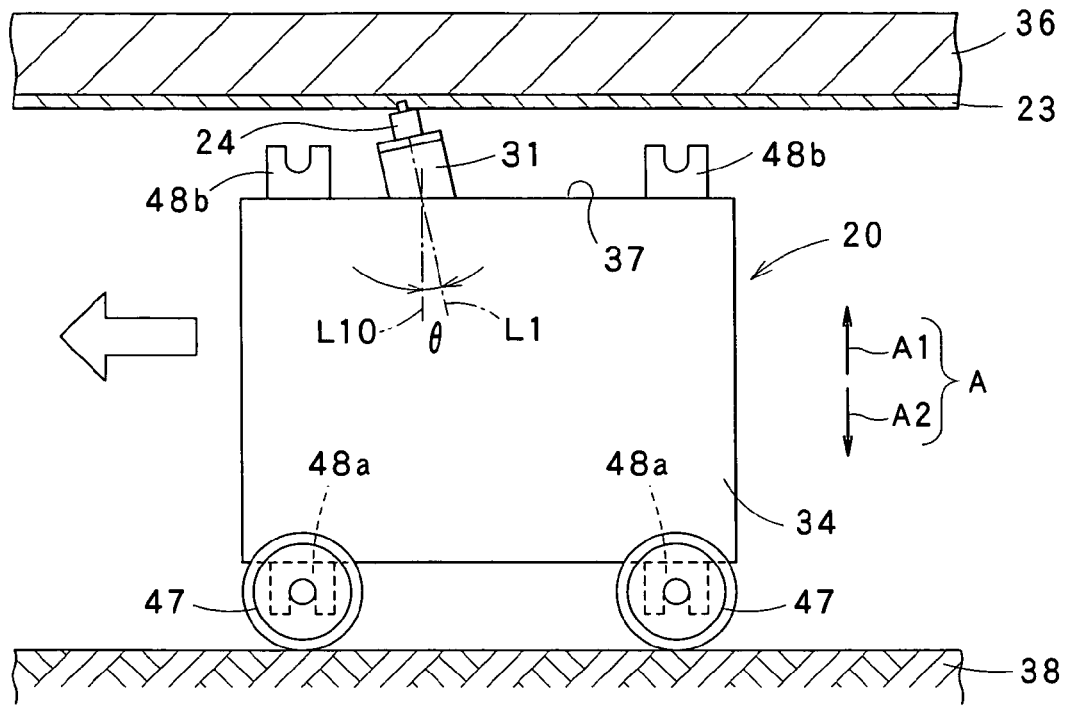
FIG. 4 is a sectional view showing a traveling condition of the welding device 20.

Referring to FIG. 4, when the article 23 is fixed by a holding device (not shown) upward from a traveling road surface 38 of the car body 34, the car body 34 is arranged in the upward posture condition that the opposite surface 37 is the top and the wheels 47 are mounted on the first wheel support sections 48a.

The car body 34, at time of frictional stirring and welding, travels on the traveling road surface 38 below the article 23, for example, on the floor or platen. At this time, a contact member 36 such as a lining metal is preferably in contact with the top of the joint section of the article 23. By doing this, at time of welding, the joint section can be prevented from deformation. Further, the welding device 20 in this embodiment travels when the axial line of the tool holding section 31 is changed from the perpendicular condition with respect to the welding surface to the condition inclined at a predetermined inclination angle of θ. Concretely, the axial line L1 of the welding tool 24 is inclined, in a virtual plane extending in the traveling direction, forward in the traveling direction as the welding device 20 moves from the tool holding section 31 toward the front end 24 of the welding tool. For example, the inclination angle θ between the axial line L1 of the welding tool 24 and a vertical axial line L10 is set at 1 to 3 degrees. Therefore, the frictional heat generated between the article 23 and the welding tool 24 during traveling can be increased. Further, the article can be clamped easily by the welding tool and lining member and the welding quality can be improved.

Figure 5:
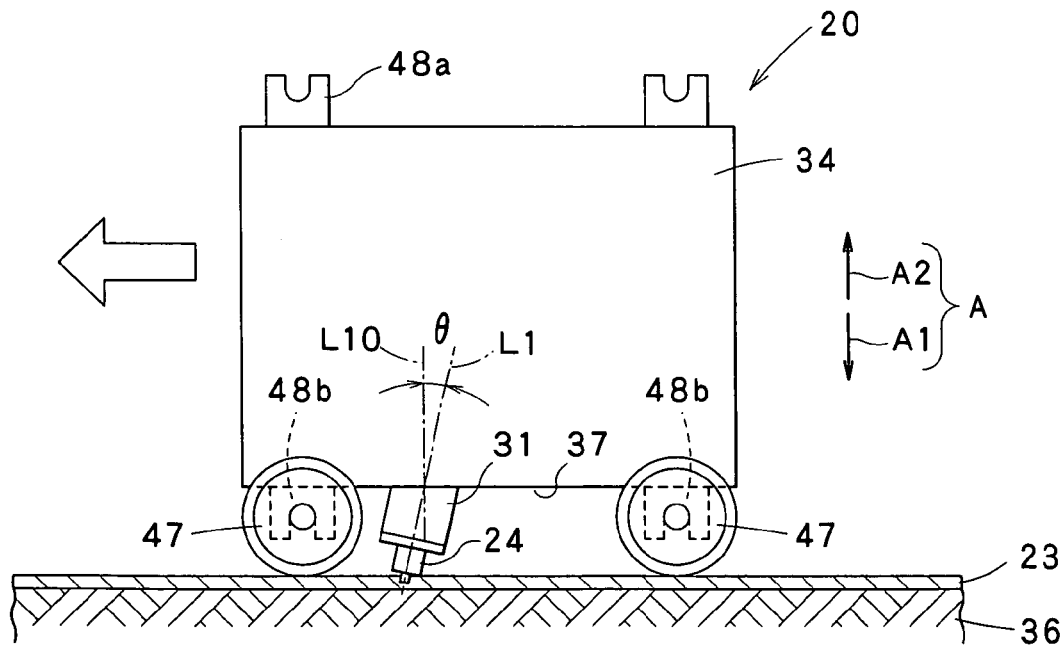
FIG. 5 is a sectional view showing another traveling condition of the welding device 20.
Figure 6:
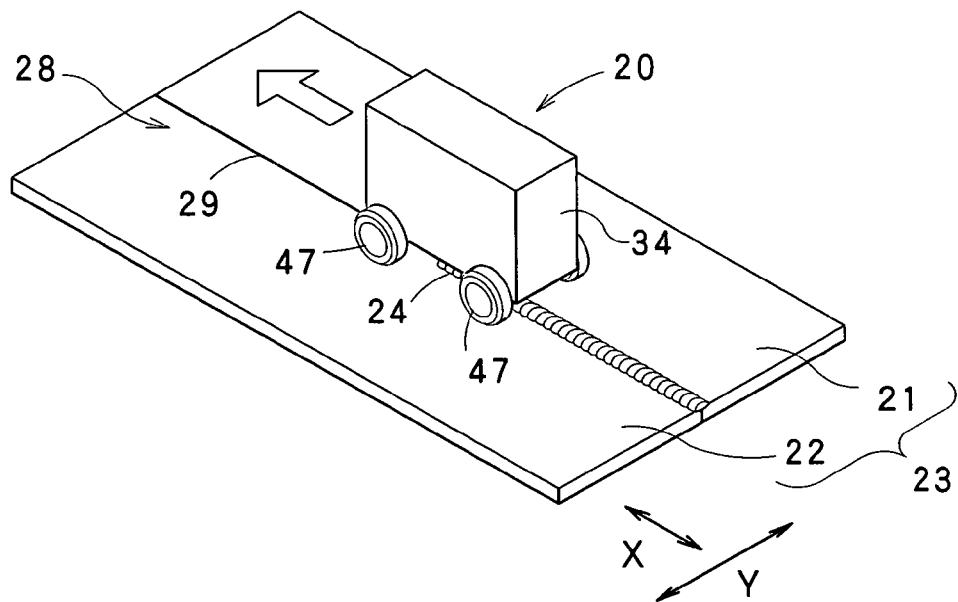
FIG. 6 is a perspective view showing another traveling condition.

Referring to FIGS. 5 and 6, when the car body 34 travels above the article to be welded 23, the car body 34 is arranged in the downward posture condition that the opposite surface 37 is the bottom and the wheels 47 are mounted on the second wheel support sections 48b.

The car body 34, at time of frictional stirring and welding, travels on the top surface of the article 23 as a traveling road surface 38. At this time, the contact member 36 such as a lining metal or a platen is preferably in contact with the bottom surface of the joint section of the welded article 23. By doing this, at time of welding, the joint section can be prevented from deformation.

Referring to FIG. 7, the welding device 20 has a traveling means 35. The traveling means 35 has a wheel rotating means for rotating the wheels 47 mounted on the wheel support sections 48a, 48b. The wheel rotating means includes a wheel rotation motor 49 installed on the car body 34 and a rotation transfer means 39 for transferring the rotation of the wheel rotation motor 49 to the wheels 47.

The rotation transfer means 39 is realized by the belt mechanism. Concretely, the belt is wound over the output shaft of the wheel rotation motor 49 and the shafts of the wheels 47. When the output shaft of the wheel rotation motor 49 rotates, the wheels 47 are rotated. The wheel rotation motor 49 is installed on the forward side in the traveling direction of the car body 34 and drives at least the front wheels to rotate in the traveling direction. By doing this, the straight traveling property of the car body can be improved. Further, the wheel rotation motor 49 may drive all the wheels to rotate by the rotation transfer means (four-wheel drive) and may be realized by a hydraulic motor. When the traveling means 35 is loaded on the car body 34 like this, the car body 34 can travel itself.

FIG. 8 is a block diagram showing the electric constitution of the welding device 20. A control means 60 includes an input unit 61, an output unit 62, a storage unit 63, and a calculation unit 64. The input unit 61 inputs an instruction from an operator and gives the input instruction to the calculation unit 64. Further, the input unit 61 may input a set value concerning frictional stirring and welding from the operator.

The input unit 61 is realized by a button. The output unit 62 outputs calculation results calculated by the calculation unit 64. Concretely, the output unit 62 gives a drive instruction and a stop instruction to the rotation driving means 32, movement driving means 33, and traveling means 35. The storage unit 63 stores a predetermined calculation program and stores calculation results calculated by the calculation unit 64. The calculation unit 64 reads and executes the calculation program stored in the storage unit 63. The calculation unit 64 executes the calculation program, thereby gives the instructions to the output unit 62 according to a predetermined friction stir welding procedure. For example, the storage unit 63 is realized by a RAM (random access memory) and a ROM (read only memory). Further, for example, the calculation unit 64 is realized by a CPU (central processing unit).

Figure 9:
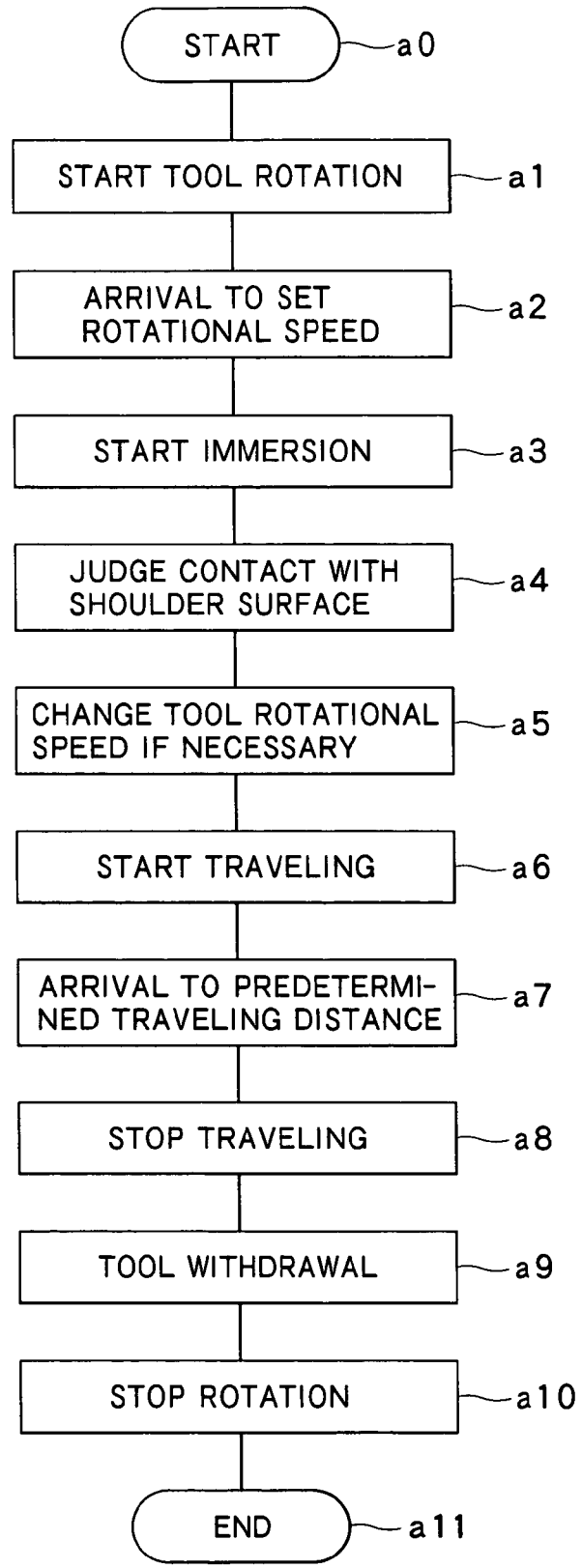
FIG. 9 is a flow chart showing an example of an operation procedure of a control means 60 in the friction stir welding.

FIG. 9 is a flow chart showing an example of the operation procedure of the control means 60 in the friction stir welding. By an operator, the members to be welded 21 and 22 are butted and held. At time of friction stir welding, the article to be welded 23 is put on the floor or platen in the operation place and the members to be welded 21 and 22 are butted beforehand by temporary welding or a forced jig so as to control a gap and a deviation to the allowable values or smaller. And, the operator inputs the welding conditions from the input unit 61 of the control means 60. The welding device 20 on which the welding tool 24 is mounted is conveyed to the position, where welding is performed, using a crane or a forklift, and is positioned at the welding starting point.

At Step a0, the control means 60 stands by in the state that the welding conditions are input. The operator operates the input unit 61 and instructs the welding device 20 to start welding. By doing this, the control means 60 is given the welding start instruction from the input unit 61, goes to Step a1, and starts the welding operation.

At Step a1, the control means 60 gives a rotation instruction to the rotation driving means 32. Then, the welding tool 24 rotates together with the tool holding section 31 and the control means 60 goes to Step a2.

At Step a2, the control means 60 decides that the rotational speed of the tool holding section 31 reaches the set rotational speed which is set as a welding condition. For example, when the electric motor is equipped with an encoder, the control means 60 obtains the angular position of the output shaft of the electric motor from the encoder and on the basis of the angular position, decides whether the rotational speed of the tool holding section 31 reaches the set rotational speed or not. Further, the control means 60 counts the time required from giving the rotation instruction up to arrival at the set rotational speed and when the time is over, may decide that it reaches the set rotational speed. When the rotational speed of the servo motor reaches the set rotational speed in this way, the control means 60 goes to Step a3.

At Step a3, the control means 60 gives an immersion instruction to the movement driving means 33. By doing this, as shown in FIG. 3(1), the welding tool 24 moves toward the article 23 together with the tool holding section 31 while rotating at the set rotational speed and goes to Step a4.

At Step a4, in the welding tool 24, as shown in FIG. 3(2), the pin part 26 makes contact with the article 23 and then immerses into the article 23. Next, as shown in FIG. 3(3), the shoulder surface 30 makes contact with the article 23.

The control means 60 decides whether the shoulder surface 30 makes contact with the article 23 or not. When the rotational speed of the electric motor is feedback-controlled, the current flowing through the electric motor is changed depending on the torque given to the article 23 by the welding tool 24. Therefore, the control means 60, when detecting the current flowing through the electric motor and finding that the current exceeds a predetermined threshold value, decides that the shoulder surface 30 makes contact with the article 23.

Further, the control means 60 counts the time required from giving the immersion instruction to the shoulder surface 30 up to making contact with the article 23 and when the time is over, may decide that the shoulder surface 30 reaches the article 23. Further, when the welding device 20 has a sensor for detecting whether the shoulder surface 30 makes contact with the article 23 or not, it is decided on the basis of the detection results given from the sensor that the shoulder surface 30 reaches the article 23.

The control means 60, when deciding in this way that the shoulder surface 30 makes contact with the article 23, goes to Step a5.

At Step a5, the control means 60 changes the rotational speed of the welding tool 24 to a predetermined rotational speed for traveling when necessary and when the set rotational speed reaches the rotational speed for traveling, goes to Step a6. For example, when the members to be welded 21 and 22 are made of thick plates, it is preferable to set the set rotational speed at time of immersion higher than the rotational speed for traveling. By doing this, before the welding tool 24 is immersed into the article, the input heat quantity given to the article 23 from the welding tool 24 can be increased.

At Step a6, the control means 60 gives an immersion stop instruction to the movement driving means 33. By doing this, the welding tool 24 stops immersion into the article 23. At this time, the welding tool 24 fluidizes the joint section of the article 23 by the frictional heat and stirs the fluidized portion. When a predetermined time elapses after the immersion stop instruction is given and the article 23 is partially fluidized sufficiently, the control means 60 gives a traveling instruction to the traveling means 35. By doing this, the welding tool 24, as shown in FIG. 3(3), moves in the traveling direction X along the welding line 29 while rotating and goes to Step a7.

At Step a7, the control means 60 decides that the car body 34, after starting traveling, moves by the set traveling distance which is set as a welding condition. For example, when the wheel rotation motor 49 is equipped with an encoder, the control means 60 obtains the angular position of the wheels 47 from the encoder and on the basis of the angular position, decides whether the car body 34 moves by the set traveling distance or not.

Further, on the basis of the detection results given from the sensor for detecting whether the car body 34 moves by the set traveling distance or not, the control means 60 may decide that the car body 34 moves by the set traveling distance. As a sensor, for example, a limit switch is used. The control means 60, when deciding in this way that the car body 34 moves by the set traveling distance, goes to Step a8.

At Step a8, the control means 60 gives the traveling stop instruction to the traveling means 35. By doing this, the car body 34 stops. When the car body 34 stops, the control means 60 goes to Step a9. At Step a9, the control means 60 gives a withdrawal instruction to the movement driving means 33. By doing this, as shown in FIG. 3(4), the welding tool 24 withdraws from the welded article 23 and the control means 60 goes to Step a10. At Step a10, the control means 60 gives the rotation stop instruction to the rotation driving means 32. By doing this, the welding tool 24 stops the rotation and the control means 60 goes to Step a11. At Step a11, the operation of the control means 60 in the frictional stirring and welding is completed.

When the control means 60 operates in this way, in the state that the rotating welding tool 24 is immersed in the article 23, the car body 34 travels along the welding line 29 of the welded article 23 and the members 21 and 22 can be welded.

For example, when the plate thickness of the members to be welded 21 and 22 is 10 mm, as welding conditions, the traveling speed when the welding tool 24 moves in the traveling direction X is 200 mm/min., and the number of rotations of the welding tool 24 is 500 rpm, and the pressing force of the welding tool 24 to the article 23 is 15 kN.

As mentioned above, according to the embodiment of the present invention, for example, the car body 34 travels itself above or below the article to be welded 23. Thus there is no need to move the article to be welded 23 and there is no need to support the rotation driving means 32 and movement driving means 33 outside the article 23 in the horizontal direction.

Therefore, regardless of the size and shape of the article 23, the frictional stirring and welding can be performed and a flexible applicability is available. Therefore, even when the article 23 is large, there is no need to enlarge the welding device 20 according to the size of the article 23. Therefore, the manufacturing cost of the welding device 20 can be lowered. Further, when not in use, it can be stored in a predetermined storage location and space saving of the job site can be realized. For example, even when welding members 21 and 22 with a length of more than 20 m for car or ship, a welding device 20 with a length, width, and height of 1 m or so can be formed, thereby is not necessarily enlarged.

Further, the wheels 47 can be mounted on either of the wheel support sections 48a and 48b and are installed removably on the wheel support sections 48a and 48b. Therefore, even if the car body 34 is arranged either of above and below the article 23, welding can be performed and the convenience can be improved.

Further, the welding tool 24, tool holding section 31, and air cylinder 52 are arranged coaxially along the reference axial line L1, thus the movement driving force generated by the air cylinder 52 can be given to the welding tool 24 as pressing force. By use of the air cylinder 52, the movement driving means can be miniaturized.

Further, when the movement driving means 32 is realized using the electric motor, to maintain and continuously give a predetermined pressing force, it is necessary to continuously supply a current to the electric motor. On the other hand, when the movement driving means 32 is realized using the air cylinder 52, it is desirable only to supply compressed air for giving the predetermined pressing force and compared with the electric motor, the energy consumption when pressed can be lowered. Further, the electric motor 50 of the rotation driving means 32 and the air cylinder 52 of the movement driving means 33 are arranged side by side perpendicularly to the reference axial direction A, thus the vertical size of the car body can be set as an inexpensive and simple structure.

Figure 10:
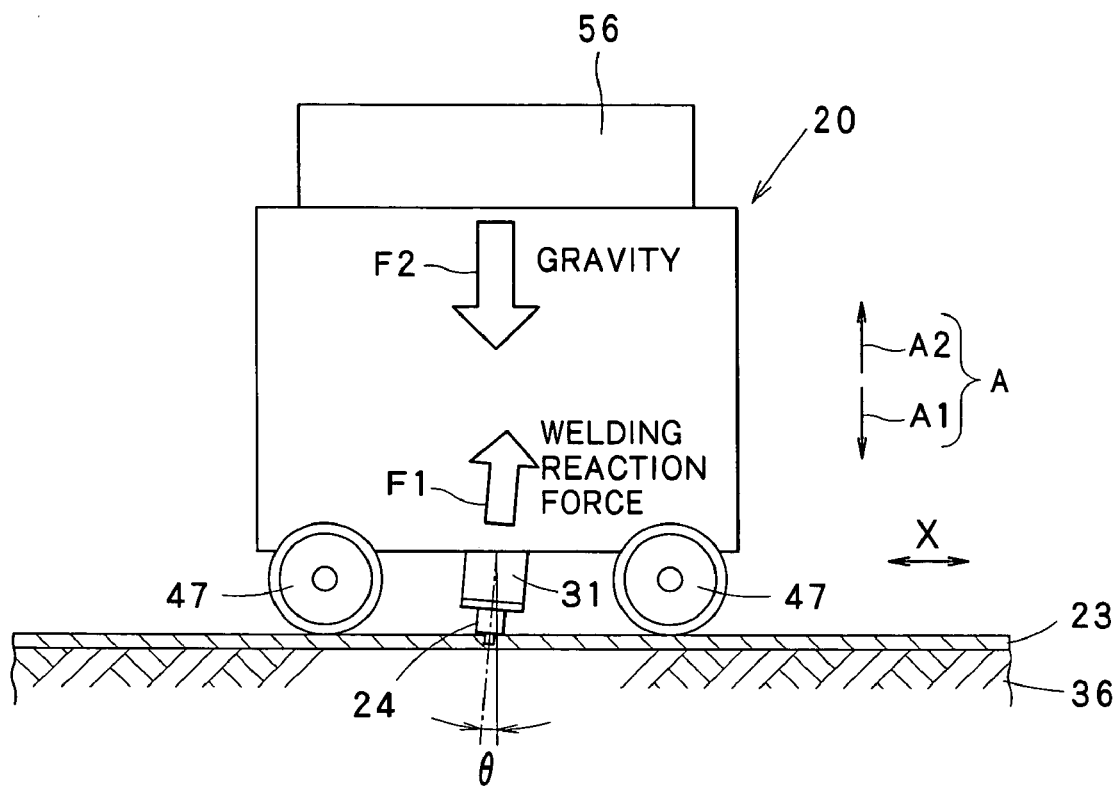
FIG. 10 is a sectional view showing the welding reaction force when a welding tool is immersed.

FIG. 10 is a sectional view showing welding reaction force F1 when the welding tool is immersed. When immersing the welding tool 24 into the article 23, the car body 34 is given the welding force F1 in the reference axial direction A from the article 23. The welding reaction force F1 is the same force as the pressing force to the article 23 by the welding tool 24 and is force in the opposite direction. In this embodiment, the inclination angle θ set in the welding device 20 is small, such as 1 to 3 degrees. Therefore, for simplicity of explanation, in the following explanation, θ=0 and cos θ≈1 are defined approximately. In this case, the welding reaction force F1 acts almost vertically.

As shown in FIG. 10, when gravity F2 acted on the welding device 20, which is arranged in the downward posture, is smaller than the welding reaction force F1, the car body 34 rises and the welding tool 24 cannot be immersed. Therefore, in this embodiment, when the weight of the welding device 20 is small, a weight 56 is loaded in the welding device 20 to prevent the car body 34 from rising. In this case, the weight 56 is a car body pressing means for giving force against the welding reaction force F1 to the car body 34.

Figure 11:
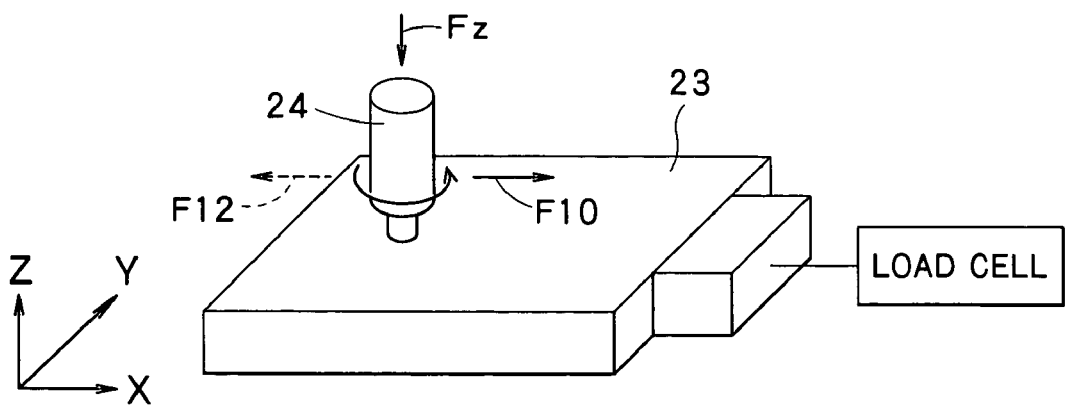
FIG. 11 is a perspective view for explaining the force given to an article to be welded 23 during movement of a car body.

FIG. 11 is a perspective view for explaining a first traveling reaction force F12 given to the article 23 during movement of the car body. When immersing the rotating welding tool 24 into the article 23 and moving it in the traveling direction X, the article 23 receives a first action force F10 acting in the traveling direction X from the welding tool 24. The first action force F10 is force acting forward in the traveling direction and force acting from the upstream side in the traveling direction to the downstream side in the traveling direction. The first action force F10 is about 0.1 to 0.3 times of the tool pressing force Fz pressing the welding tool 24 by the air cylinder 52 under appropriate welding conditions and increases as the plate thickness of the members to be welded 21 and 22 and traveling speed increase.

Further, the welding tool 24 receives reaction force from the article 23 in the opposite direction of the force given to the article 23. Therefore, the welding tool 24 is given a first traveling reaction force F12 which is reaction force acting backward in the traveling direction from the article 23, in other words, acting from the downstream side in the traveling direction to the upstream side in the traveling direction. The first traveling reaction force F12 is expressed by Fz·α. Here, Fz indicates tool pressing force and α indicates a coefficient expressing the relationship between the tool pressing force Fz and first traveling reaction force F12. The first traveling reaction force F12 and first action force F10 are the same in magnitude, so that α is set at 0.1 to 0.3.

Figure 12:
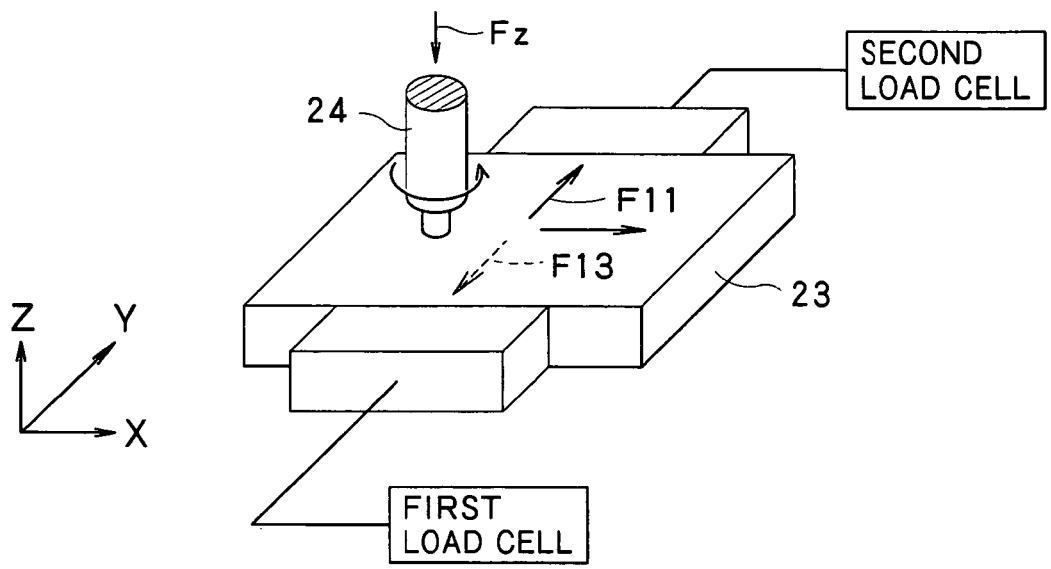
FIG. 12 is a perspective view for explaining the force given to the article 23 during movement of the car body.

FIG. 12 is a perspective view for explaining second traveling reaction force F13 given to the article 23 during movement of the car body. When immersing the rotating welding tool 24 into the article 23 and moving it in the traveling direction X, the article 23 receives a second action force F11 acting in the transverse direction Y from the welding tool 24. The second action force F11 is force in the direction in which the outer circumferential portion of the welding tool 24 passes the welding line 29 on the forward side in the traveling direction, in other words, on the downstream side in the traveling direction. The second action force F11 is about 0.1 to 0.3 times of the tool pressing force Fz pressing the welding tool 24 by the air cylinder 52.

Further, the welding tool 24 receives reaction force from the article 23 in the opposite direction of the force given to the article 23. Therefore, the welding tool 24 is given the second traveling reaction force F13 acting in the opposite direction of the direction in which the outer circumferential portion of the welding tool 24 passes the welding line 29 on the forward side in the traveling direction, that is, on the downstream side in the traveling direction. In other words, the second traveling reaction force F13 acts in the direction in which the outer circumferential portion of the welding tool 24 passes the welding line 29 on the backward side in the traveling direction, that is, on the upstream side in the traveling direction.

The second traveling reaction force F13 is expressed by $Fz \cdot \beta$. Here, Fz indicates the tool pressing force and $\beta 0$ indicates a coefficient expressing the relationship between the tool pressing force Fz and second traveling reaction force F13. $\beta$ is set at 0.1 to 0.3.

Figure 13:
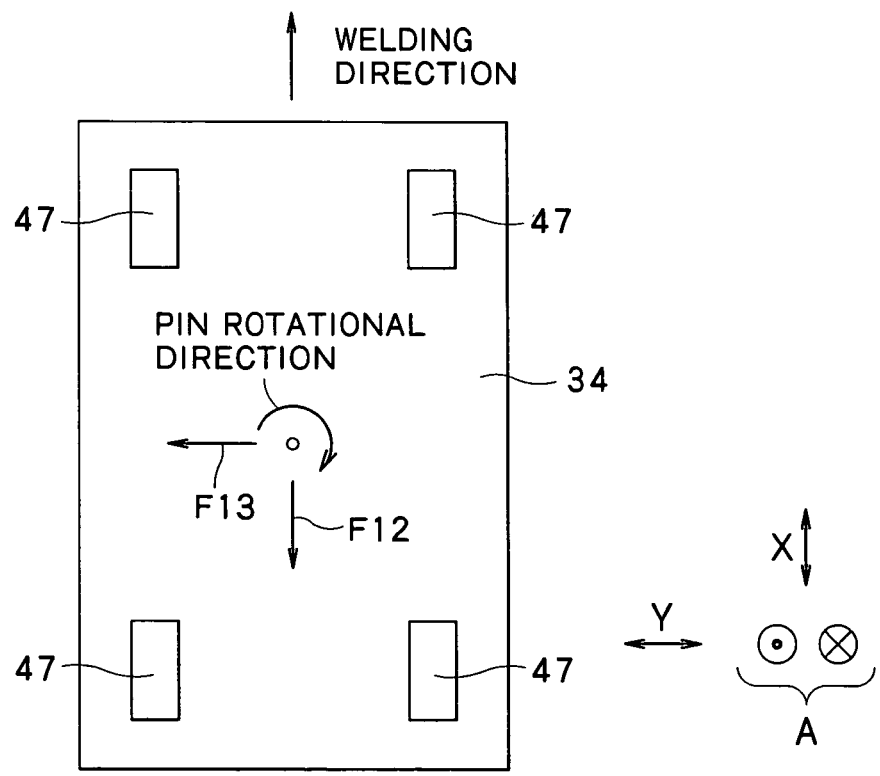
FIG. 13 is a plan view showing the reaction force given to the car body 34 from the article 23 during traveling.

FIG. 13 is a plan view showing reaction force given to the car body 34 from the article 23 during traveling. As mentioned above, the car body 34, during traveling, is given the first traveling reaction force F12 and second traveling reaction force F13.

Therefore, assuming the friction coefficient between the article 23 and the wheels 47 in the traveling direction X as $\mu x$, the own weight of the car body as W, and the tool pressing force as Fz, the relationship $Fz \cdot \alpha < (W-Fz) \cdot \mu x$ must be satisfied. Otherwise, the wheels 47 run idle and there is a fear that the car body cannot travel in the traveling direction X. Further, assuming the friction coefficient between the article 23 and the wheels 47 in the transverse direction Y as $\mu y$, the relationship $Fz \cdot \beta < (W-Fz) \cdot \mu y$ must be satisfied. Otherwise, there is a fear that the wheels 47 may change the angle round the reference axial line L1.

Therefore, it is necessary to set the own weight W of the car body and the friction coefficients $\mu x$ and $\mu y$ between the wheels 47 and the article 23 so as to satisfy the formulas aforementioned. For example, to increase the friction coefficients $\mu x$ and $\mu y$, an endless track belt type traveling mechanism composed of an endless belt wound round the wheels arranged side by side in the traveling direction, the so-called Caterpillar (registered trademark) may be used. Further, to increase the friction coefficients $\mu x$ and $\mu y$, a material with a high friction coefficient such as rubber may be adhered to the wheels or the outer circumferential portion of the endless belt. On the traveling road surface 38, a sheet with a high friction coefficient with the wheels or the endless belt may be laid. Further, to increase the contact area between the traveling road surface 38 and the wheels 47, the size of the wheels in the axial direction may be increased. Further, as mentioned above, the weight of the car body 34 may be increased.

In expectation of movement in the transverse direction Y caused by the reaction force given from the article 23, the shape and arrangement condition of the wheels 47 may be set so as to move in the opposite direction of the direction of movement due to the reaction force given from the article 23. For example, when the second traveling reaction force F13 is not given, the car body 34 may be steered so as to move in the opposite direction of the direction in which the second traveling reaction force F13 is given. In this case, when the car body travels in the state that the second traveling force F13 is given to the car body, the car body 34 can go straight on.

Figure 14:
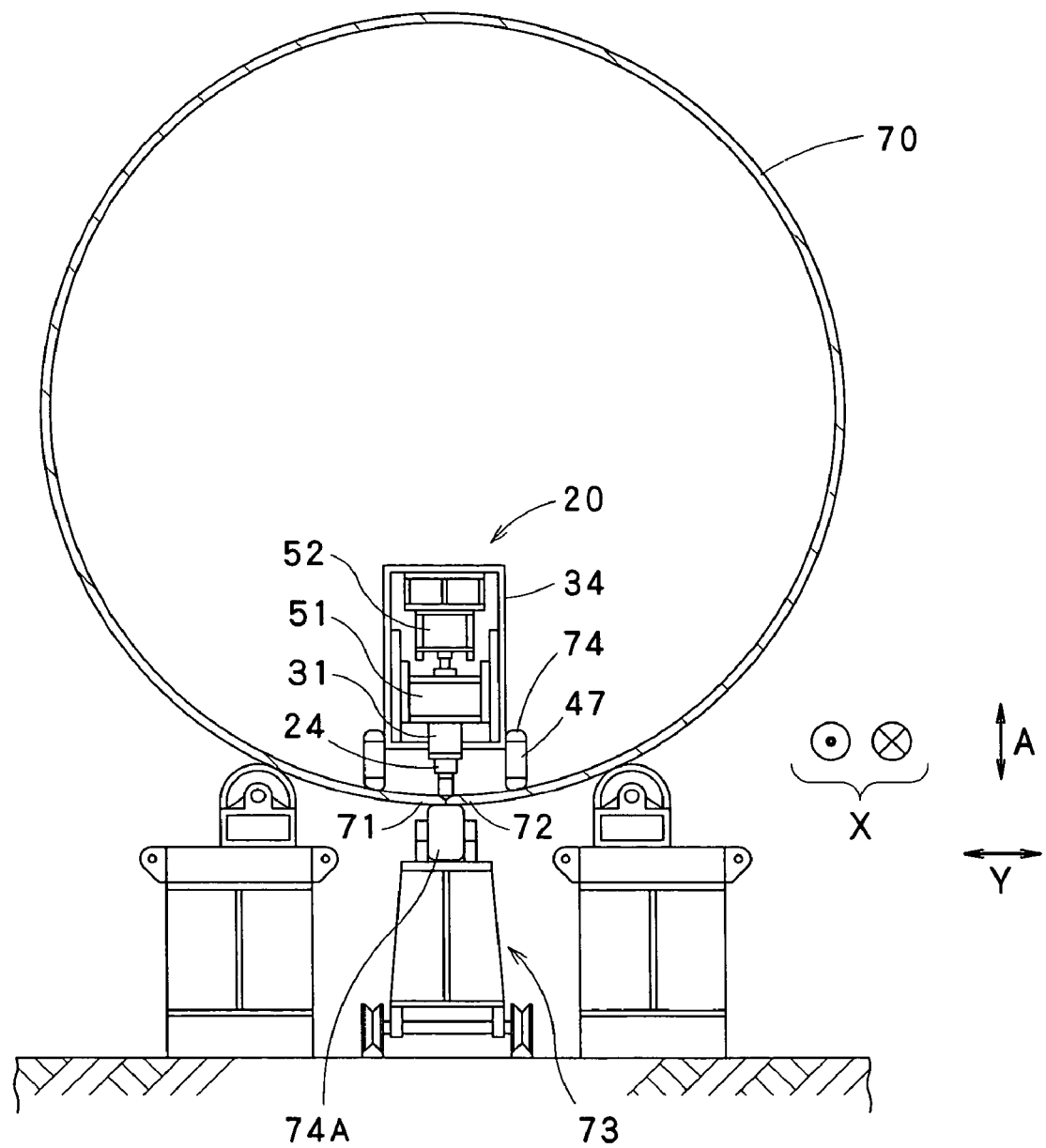
FIG. 14 is a front view showing another welding condition of the welding device 20.
Figure 15:
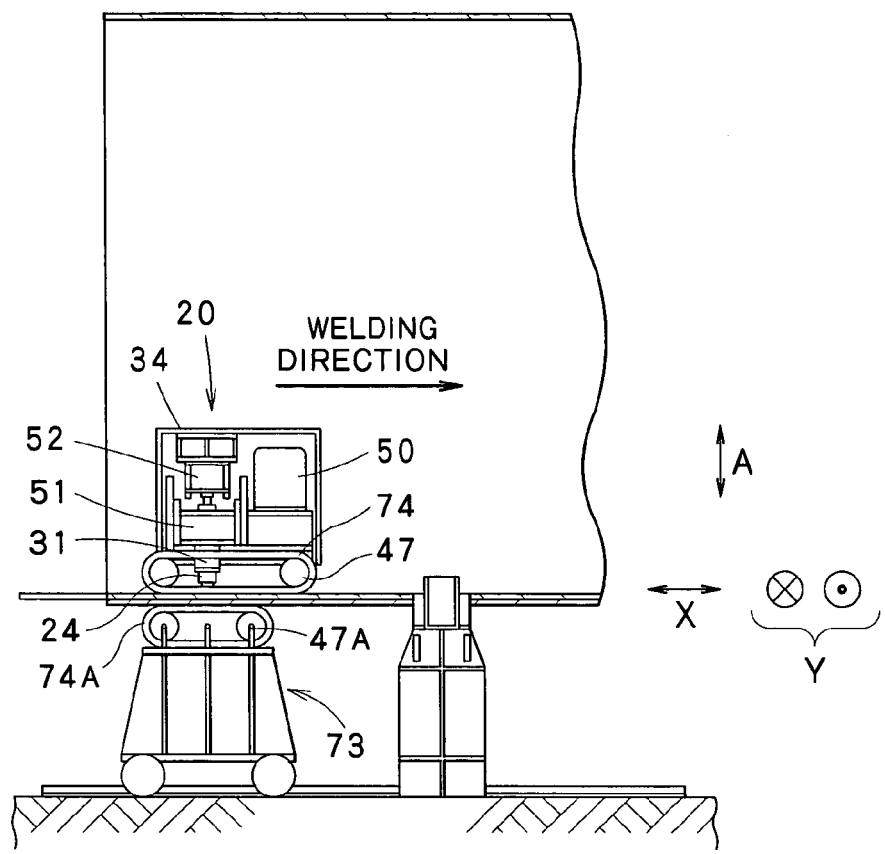
FIG. 15 is a sectional view showing still another welding condition of the welding device 20.

FIG. 14 is a front view showing another welding condition of the welding device 20 and FIG. 15 is a sectional view showing the welding condition of the welding device 20. The friction stir welding device can weld one end 71 of a preformed pipe member 70 formed in a C-shape in the circumferential direction and another end 72 in the circumferential direction. The preformed pipe member 70, when one end 71 in the circumferential direction and another end 72 in the circumferential direction are welded, forms a cylindrical pipe.

When welding both ends 71 and 72 of the preformed pipe member 70 in the circumferential direction, a lining device 73 making contact with the joint section where both ends 71 and 72 of the preformed pipe member 70 in the circumferential direction are butted may be installed. The lining device 73 is installed movably in the axial direction of the preformed pipe member 70. The lining device 73 is equipped with an endless belt 74A making contact with the joint section of the preformed pipe member 70. The endless belt 74A is wound around a roller 47A and as the lining device 73 moves, the position making contact with the preformed pipe member 70 moves.

When performing frictional stirring and welding, the welding device 20 travels on the inner circumferential surface of the preformed pipe member 70 in the axial direction of the preformed pipe member 70. In this case, the endless belt 74A of the lining device 73 makes contact with the outer circumferential surface of the preformed pipe member 70. The welding tool 24 and the endless belt 74A of the lining device 73 are arranged on the opposite positions across the preformed pipe member 70. The welding device 20 goes in the axial direction of the preformed pipe member 70 in connection with the lining device 73. By doing this, the joint section can be prevented from deformation. Alternatively, the welding tool 24 may make contact with the outer circumferential surface of the preformed pipe member 70 and the endless belt 74A of the lining device 73 may make contact with the inner circumferential surface of the preformed pipe member 70. Further, the members to be welded may be frictionally stirred and welded so that about a half of the plate thickness from both circumferential surfaces of the members are stirred and welded. Further, in place of the endless belt 74A, the roller 47A may directly make contact with the road surface.

Figure 16:
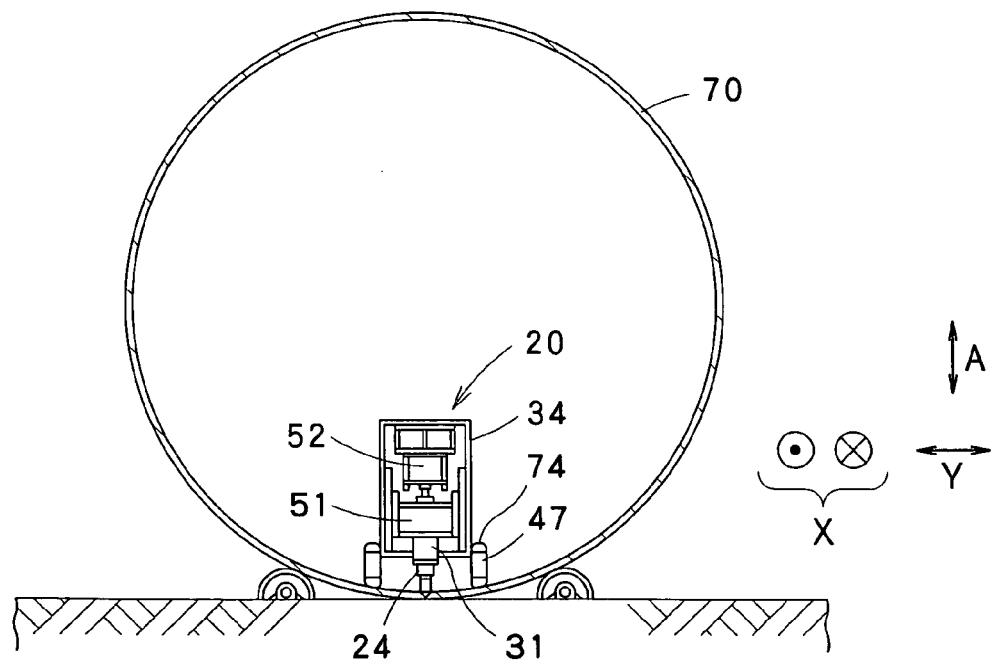
FIG. 16 is a front view showing a modification of another welding condition.
Figure 17:
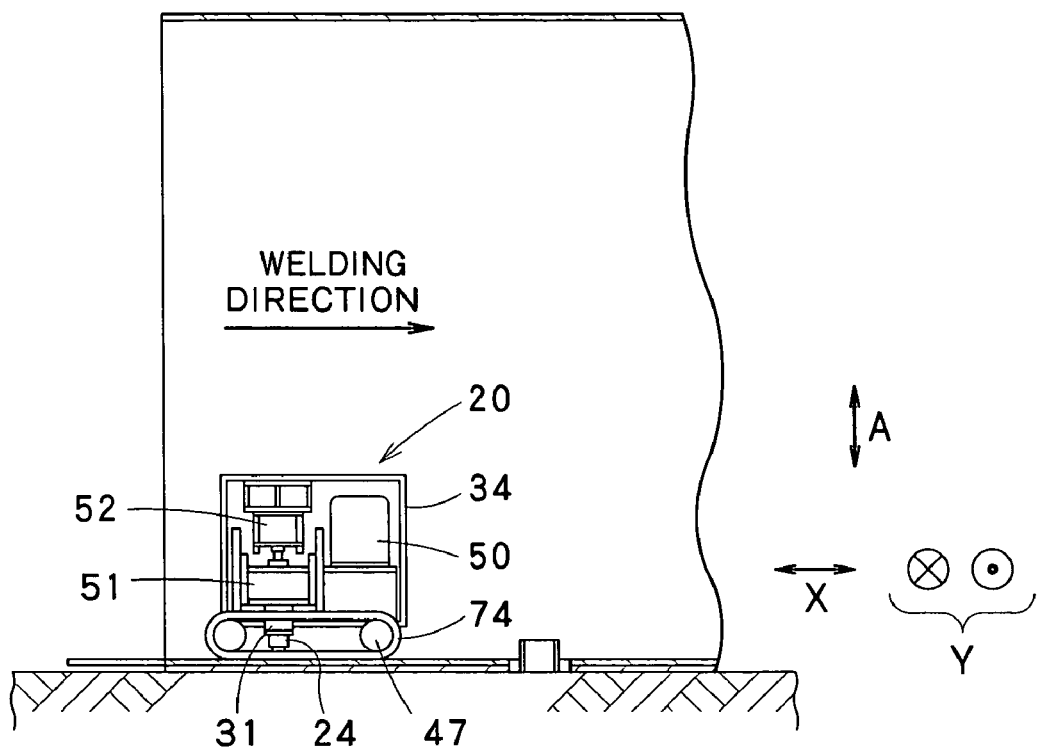
FIG. 17 is a sectional view showing a modification of still another welding condition.

FIG. 16 is a front view showing a modification of the welding condition shown in FIG. 14, and FIG. 17 is a sectional view showing the modification of the welding condition shown in FIG. 15. As shown in FIGS. 16 and 17, the outer circumferential surface of the preformed pipe member 70 makes contact with the platen or floor, thus the welding device 20 does not require the lining device 73. The welding device 20 travels in the internal space of the preformed pipe member 70 and can weld both circumferential ends 71 and 72 of the preformed pipe member 70.

Figure 18:
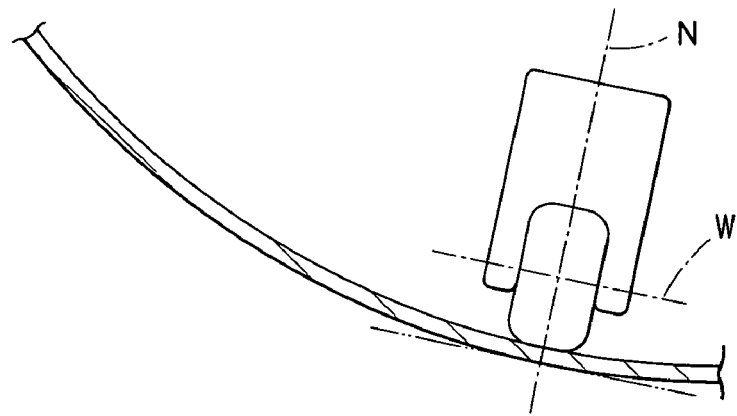
FIG. 18 is a sectional view showing an enlarged part of the welding condition shown in FIG. 14.

FIG. 18 is a sectional view showing an enlarged part of the welding condition shown in FIG. 14. As mentioned above, when the car body 34 passes the inner circumferential surface of the preformed pipe member 70, that is, when the traveling road surface of the car body 34 is a curved surface, a wheel axis 76 of the wheel 47 is inclined. Concretely, the wheel axis 76 is inclined so as to be almost perpendicular to a normal N of the traveling road surface. By doing this, the area where the endless belt 74 or the wheels 47 make contact with the traveling road surface can be increased and the slip of the endless belt 74 or the wheels 47 can be reduced.

Figure 19:
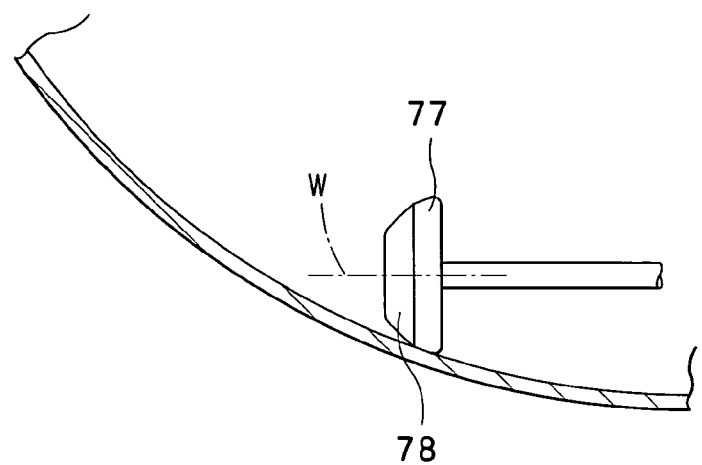
FIG. 19 is a sectional view showing a wheel 77 of another embodiment of the present invention.

FIG. 19 is a cross sectional view showing a wheel 77 of another embodiment of the present invention. When the traveling road surface of the car body 34 is a curved surface, an outer circumferential surface 78 of the wheel 77 may be formed along the inclination of the traveling road surface. For example, the wheel 77 is formed in a truncated cone shape. By doing this, the area where the wheel 77 and the traveling road surface make contact with each other can be increased and the slip of the wheel 77 can be reduced. Further, the wheel 77 may be wound with an endless belt.

Figure 20:
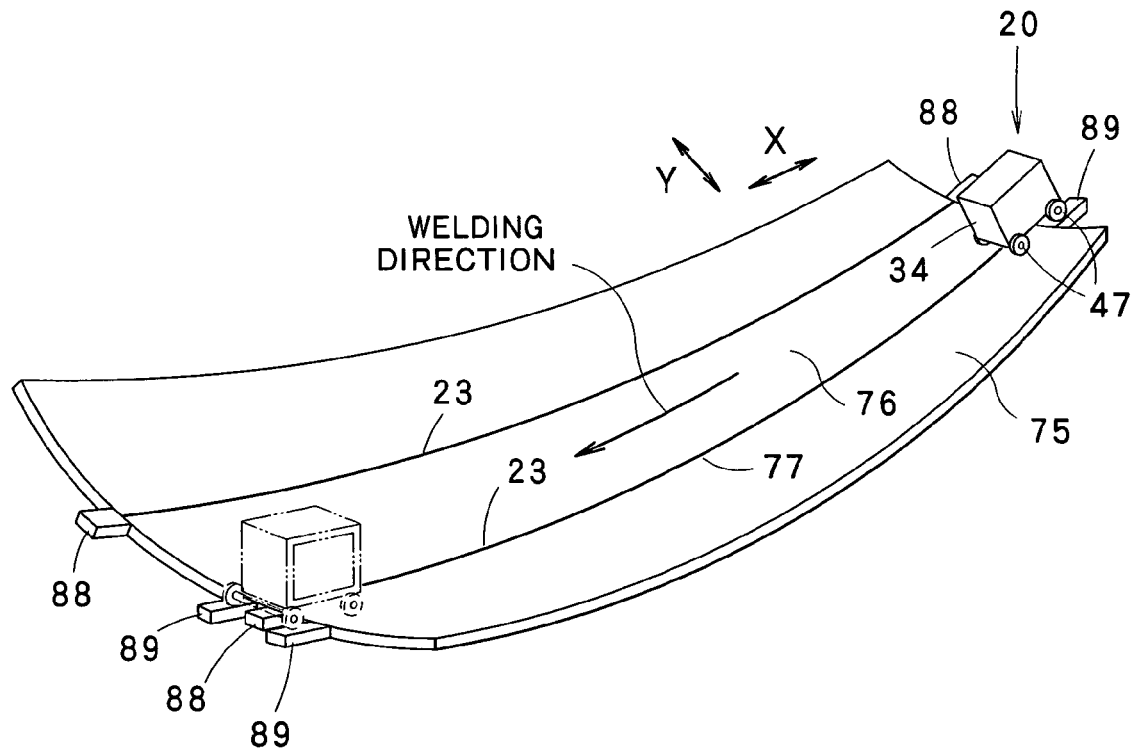
FIG. 20 is a perspective view showing still another welding condition of the welding device 20.

FIG. 20 is a perspective view showing still another welding condition of the welding device 20. In the other welding conditions aforementioned, both ends of the preformed pipe member in the circumferential direction are welded to form a cylindrical pipe. Similarly, two members to be welded 75 and 76 in a curved plate shape are welded, thus a spherical shell structural body having a curved surface or a spherical shape can be formed.

In this case, the two members 75 and 76 in a curved plate shape are butted and fixed so as to have a predetermined curved shape. And, similarly to the case shown in FIG. 14, the welding device 20 travels along the joint section 77 where the two members 75 and 76 in a curved plate shape are butted, thus the spherical shell structural body can be formed. In this way, for example, an LNG (liquefied natural gas) tank structural body can be formed.

Further, as shown in FIG. 20, when welding the article 23 over both ends thereof in the traveling direction, as a preparation operation before welding, on both sides of the beveling portion in the traveling direction, a traveling road member 89 is connected to the article 23. In this embodiment, the traveling road member 89 is arranged in line with the article 23 and is connected to the article 23 by a jig. The traveling road member 89, when welding both ends of the article by the welding device 20, is formed in a rail shape where the front wheels or rear wheels of the welding device 20 are loaded, is adjusted in the interval in the transverse direction Y by the jig, and is connected to the welded article 23. The traveling road member 89, after welding, is released from the connection by the jib, thereby is removed from the welded article 23.

Further, as shown in FIG. 20, in this embodiment, when welding the article 23 over both ends thereof in the traveling direction, as a preparation operation before welding, on both sides of the beveling portion in the traveling direction, a tab member 88 is welded to the article 23. The tab member 88 is arranged in the neighborhood of the welding line 29 of the article 23. The welding tool 24 is immersed into the tab member 88 arranged on the upstream side in the traveling direction, then moves in the traveling direction X, thereby passes the welding line 29, and reaches the tab member 88 arranged on the downstream side in the traveling direction. And, it is shifted from the tab member 88. The tab member 88 is removed from the welded article 23 after welding. The welding tool 24 is immersed into and shifted from the tab member 88 in this way, thus the article 23 can be prevented from forming an immersion mark and a shifting mark of the welding tool and the welding quality of the welded article 23 can be improved.

The traveling road member 89 and tab member 88 aforementioned can be applied to the other embodiments described above and later. Therefore, the article 23 can be welded preferably over both ends thereof in the traveling direction.

Figure 21:
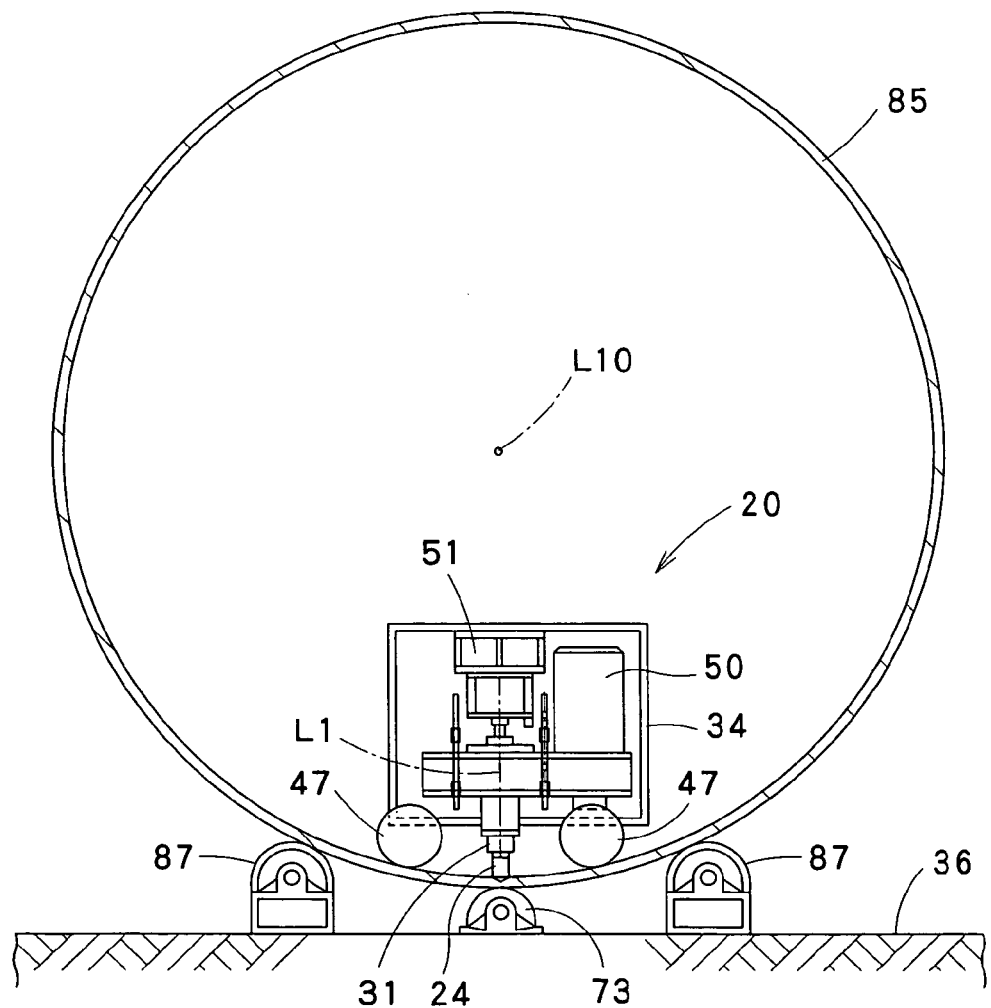
FIG. 21 is a front view showing a further welding condition of the welding device 20.
Figure 22:
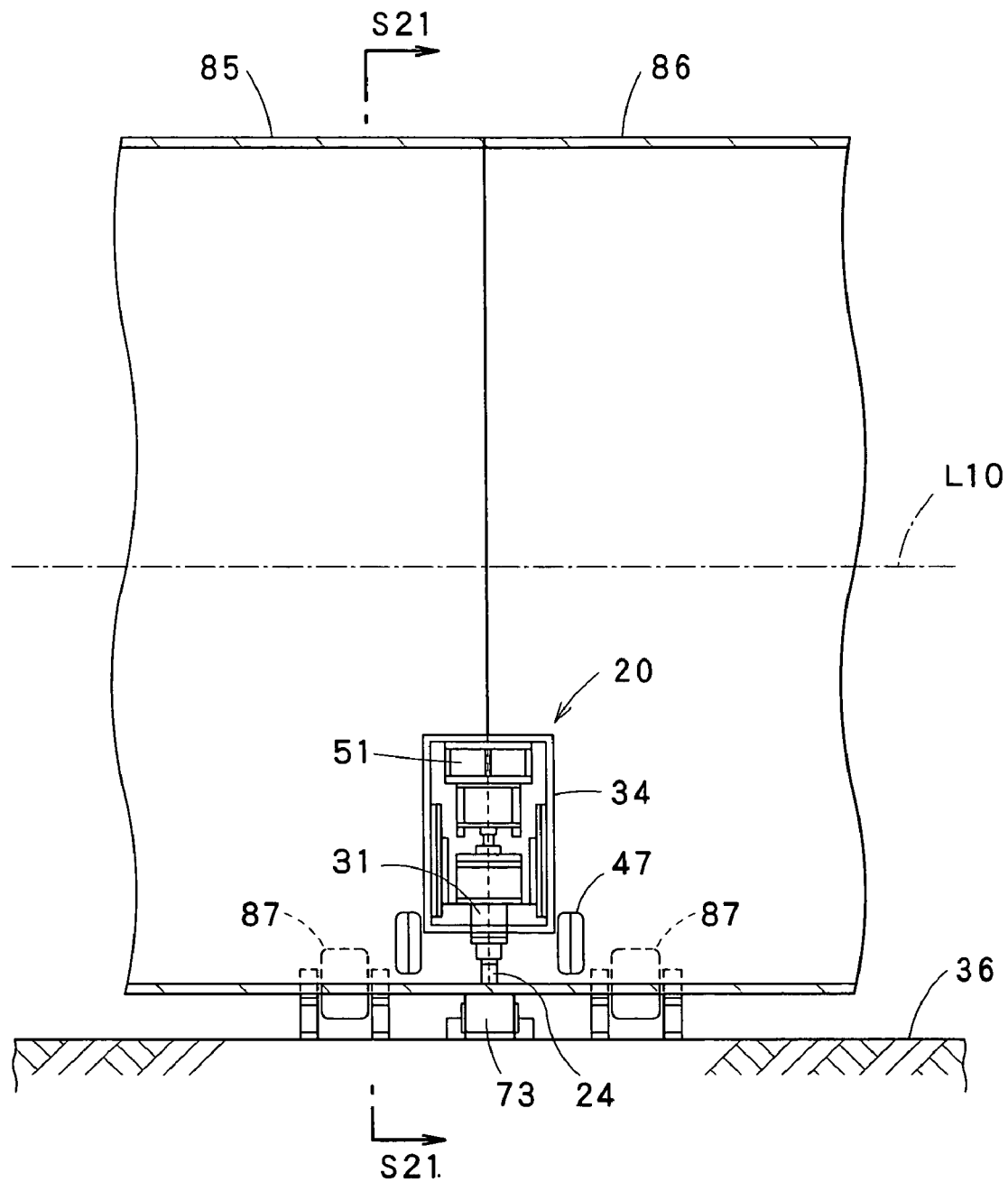
FIG. 22 is a sectional view showing a still further welding condition of the welding device 20.

FIG. 21 is a front view showing a further welding condition of the welding device 20 and FIG. 22 is a sectional view showing the welding condition of the welding device 20. The friction stir welding device welds the butt portions of two butt cylindrical pipes 85 and 86. By doing this, the ends of the pipes 85 and 86 are connected each other so as to form a butt joint.

In this case, the two pipes 85 and 86 are positioned coaxially so as to butt both ends thereof. And, the butt joint portions of the pipes 85 and 86 are temporarily welded. And, the lining device 73 makes contact with the outer circumferential portions of the joint portions and the welding device 20 is arranged in the internal space of the pipes 85 and 86.

When this welding preparation is completed, the frictional stirring and welding is performed. When performing the frictional stirring and welding, the welding device 20 travels on the inner circumferential surfaces of the pipes 85 and 86 in the circumferential direction of the pipes. Concretely, the rotating welding tool 24 is immersed into the joint portions of the pipes 85 and 86. Next, by a pipe rotating means 87 different from the welding device 20, the pipes 85 and 86 are rotated round the pipe axial line L10 and the welding device 20 travels in the circumferential direction of the pipes 85 and 86.

By doing this, when the pipes 85 and 86 rotate and make a round with respect to the welding device 20 which is opposite to the lining device 73, the welding device 20 can weld both ends of the pipes 85 and 86 in the circumferential direction. Therefore, at an outdoor pipe installation site, two pipes 85 and 86 can be welded and the operation efficiency can be improved.

Figure 23:
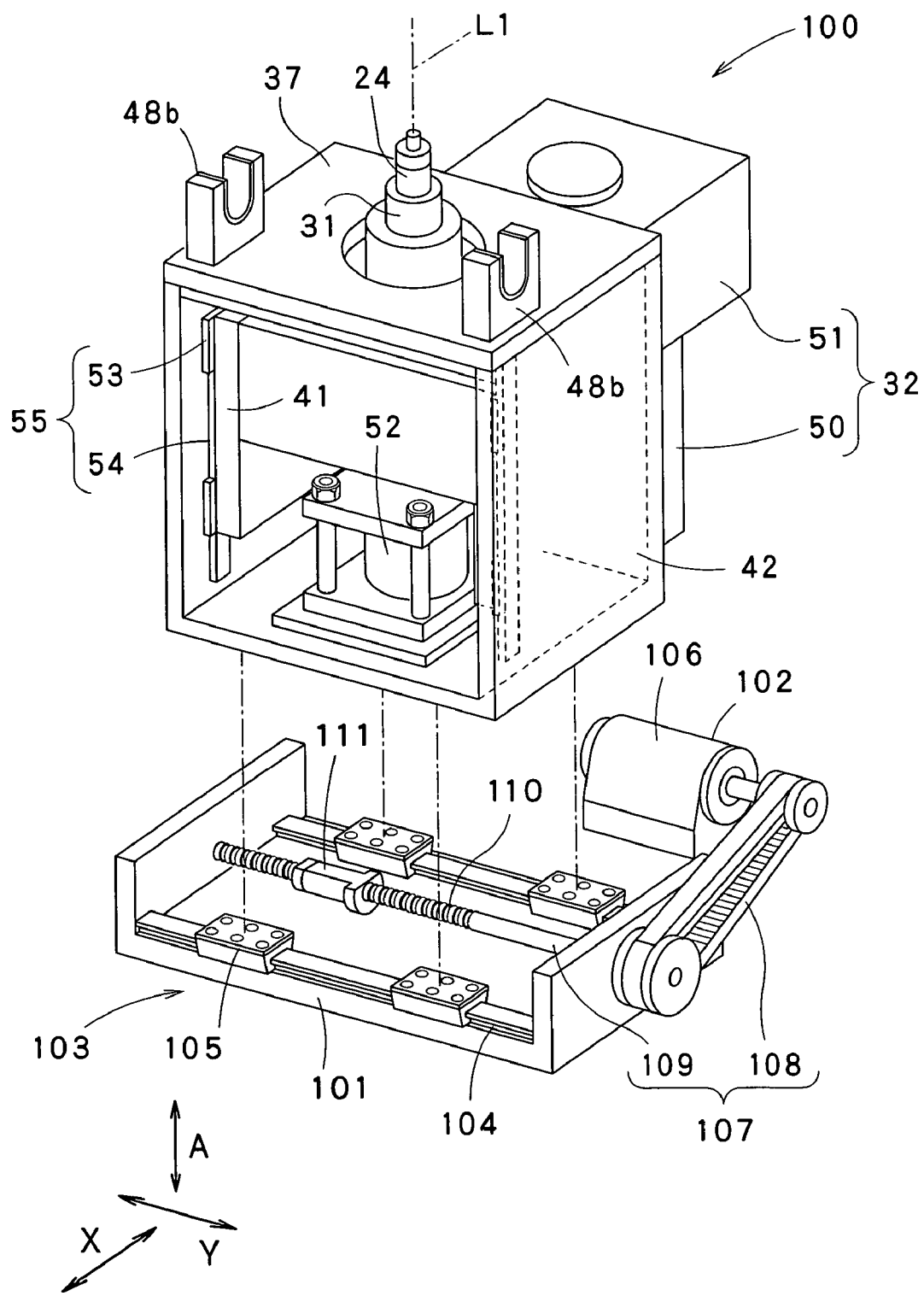
FIG. 23 is an exploded perspective view showing a part of a welding device 100 of a second embodiment of the present invention.

FIG. 23 is an exploded perspective view showing a part of a welding device 100 of the second embodiment of the present invention. The welding device 100 of the second embodiment is installed so as to move the tool holding section 31 in the transverse direction Y. The other constitution is the same as that of the welding device 20 of the first embodiment shown in FIG. 1. In the welding device 100 of the second embodiment, the same constitution as that of the welding device 20 of the first embodiment is omitted in explanation and the same reference numerals are assigned.

The welding device 100 additionally includes a loading section 101 and a crossing driving means 102. The loading section 101 supports the cylinder support section 42 movably in the transverse direction Y. The crossing driving means 102 drives the cylinder support section 42 to move in the transverse direction Y. The loading section 101 is fixed to the frame body 43 and has a rail mechanism 103 for connecting the cylinder support section 42 movably in the transverse direction Y.

The rail mechanism 103 includes a rail 104 extending in the transverse direction Y and a guide body 105 guided by the rail 104. The guide body 105 is installed movably in the transverse direction Y and is prevented from moving in the other directions. The cylinder support section 42 is connected to the guide body 105. By doing this, the cylinder support section 42 is installed on the loading body 101 movably in the transverse direction Y. In this embodiment, a plurality of, for example, two rail mechanisms 101 are installed. The two rail mechanisms 101 are arranged side by side in the traveling direction X.

The crossing driving means 102 includes a power generation source 106 and a power transfer section 107. The power generation source 106 is realized by an electric motor. The electric motor, when power is supplied from the power source, rotates the output shaft thereof. Further, the electric motor is controlled by a control means. In this case, the control means adjusts the current supplied to the electric motor.

The power transfer section 107 converts the turning power generated by the power generation source 106 to straight advance force moving in the transverse direction Y and gives the straight advance force to the cylinder support section 42. The power transfer section 107 transfers the turning power to a screw shaft 110 of a ball screw 109 by a rotation transfer mechanism 108 such as a belt or a gear. When the screw shaft 110 rotates, a mobile body 111 helically fit to the screw shaft 110 moves. The screw shaft 110 extends in the transverse direction Y and the mobile body 111 is fixed to the cylinder support section 42. Therefore, when the power generation source 106 generates power, the cylinder support section 42 can move together with the mobile body 111. Further, when the rotational direction of the output shaft of the power generation source is made changeable, the cylinder support section 42 can move on both sides in the transverse direction.

Figure 24:
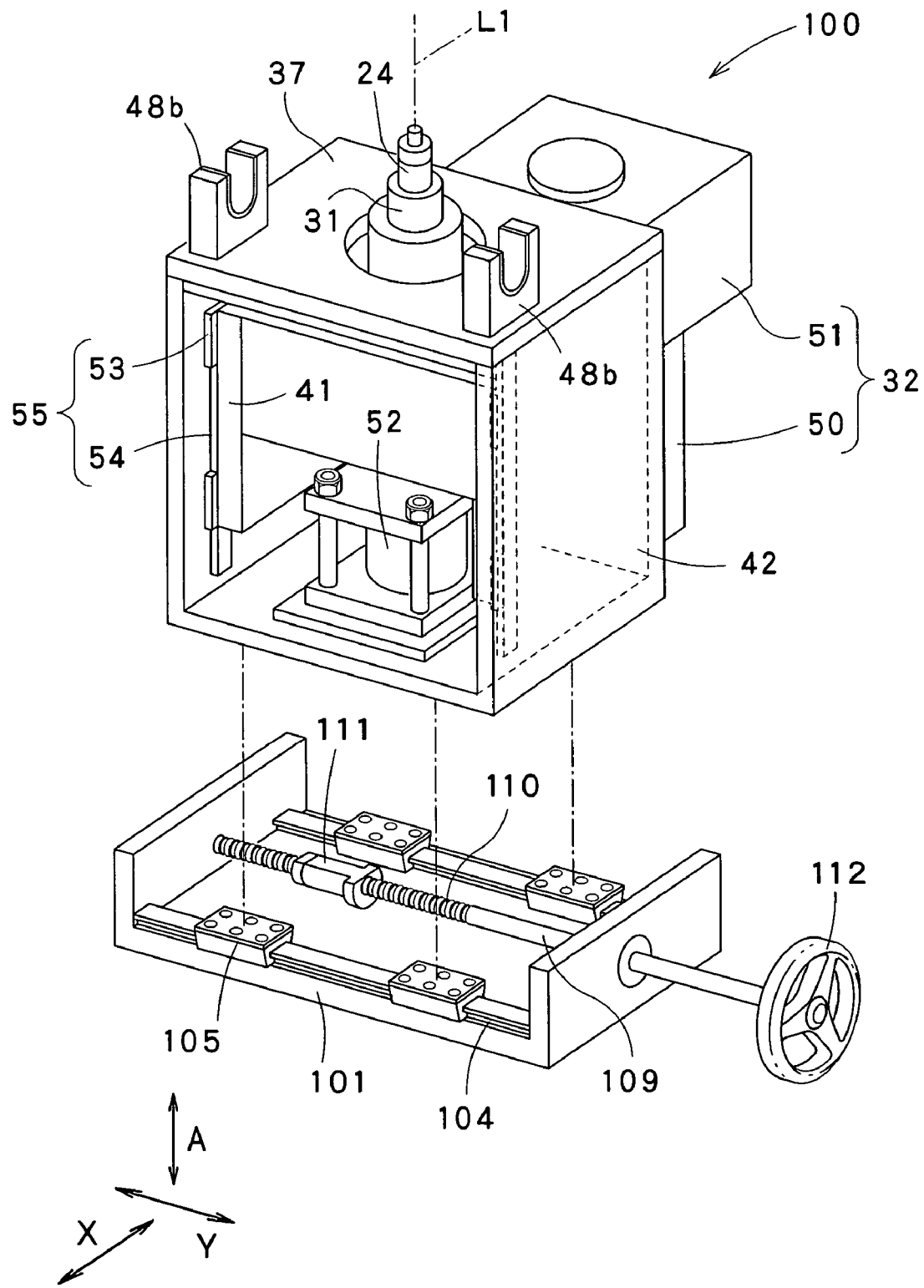
FIG. 24 is a sectional view showing a modification of the welding device 100.

FIG. 24 is a sectional view showing a modification of the welding device 100 of the second embodiment. Although the screw shaft 110 of the ball screw 109 is rotated by the power generation source 106 in FIG. 23, the power for rotating the screw shaft 110 may be given by an operator. In this case, a handle 112 for rotating the screw shaft 110 is rotated by the operator, thus the cylinder support section 42 can be moved on both sides in the transverse direction Y.

Figure 25:
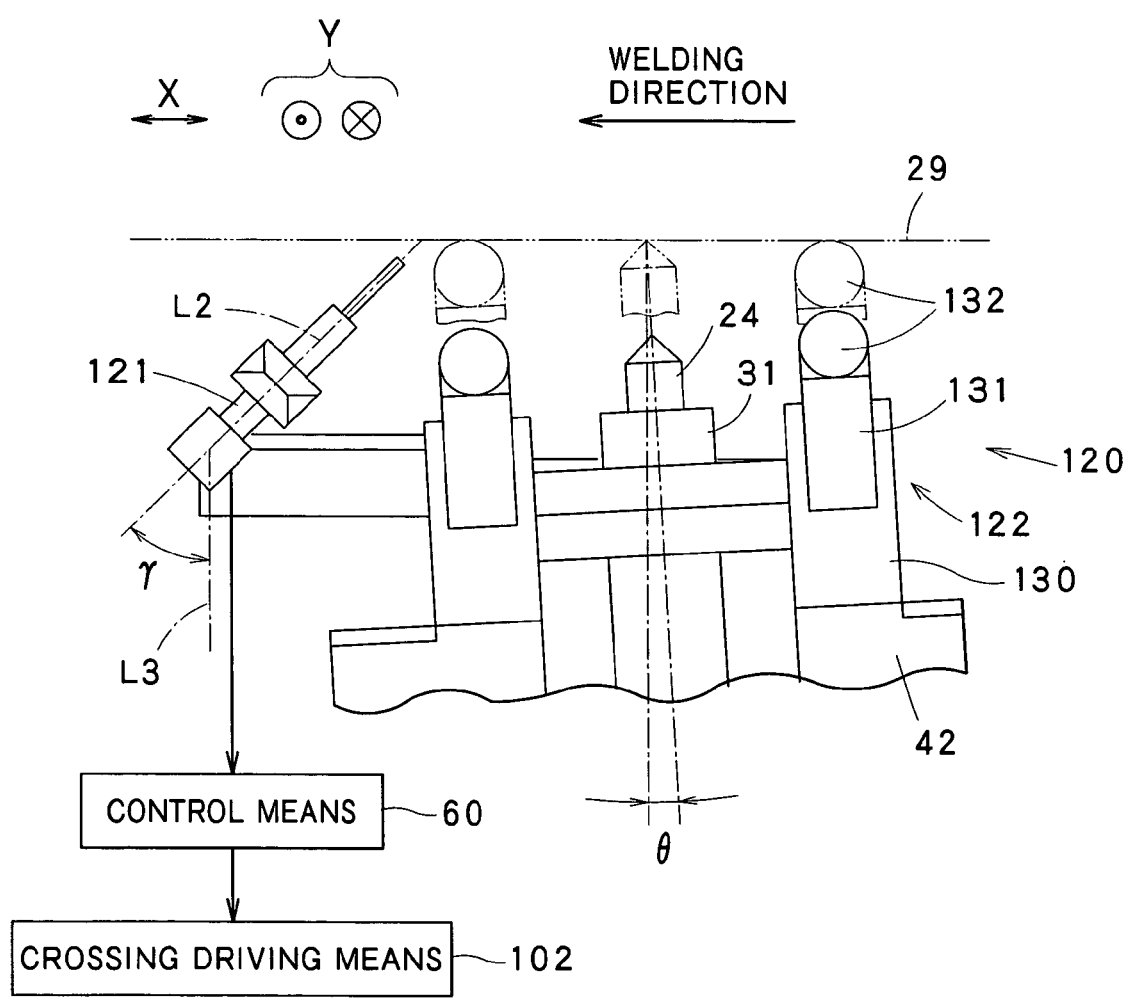
FIG. 25 is a drawing of an enlarged part of a welding device 120 of a third embodiment of the present invention.

FIG. 25 is a drawing of an enlarged part of a welding device 120 of the third embodiment of the present invention. The welding device 120 of the third embodiment includes a detection means 121 for detecting the position of the welding line 29 of the article 23 and a regulation means 122 for controlling movement of the tool holding section 31 so as to make the immersion amount into the article 23 by the welding tool 24 coincide with a predetermined immersion amount.

The welding device 120 of the third embodiment, with respect to the other constitution, has the same constitution as that of the welding device 100 of the second embodiment. In the welding device 120 of the third embodiment, the same constitution as that of the welding device 100 of the second embodiment is omitted in explanation and the same reference numerals are assigned. Further, in this embodiment, the detection means 121 is formed almost cylindrically and detects the beveling position with respect to the welding device by the front end thereof. The angle between the axial line L2 of the detection means 121 and the vertical line L3 is a backward angle γ in the opposite direction of the inclination angle θ of the welding tool 24. In other words, in the detection means 121, from the base end toward the front end, the axial line L3 thereof is extended from the backward side in the traveling direction, in other words, from the downstream side in the traveling direction to the upstream side.

Figure 26:
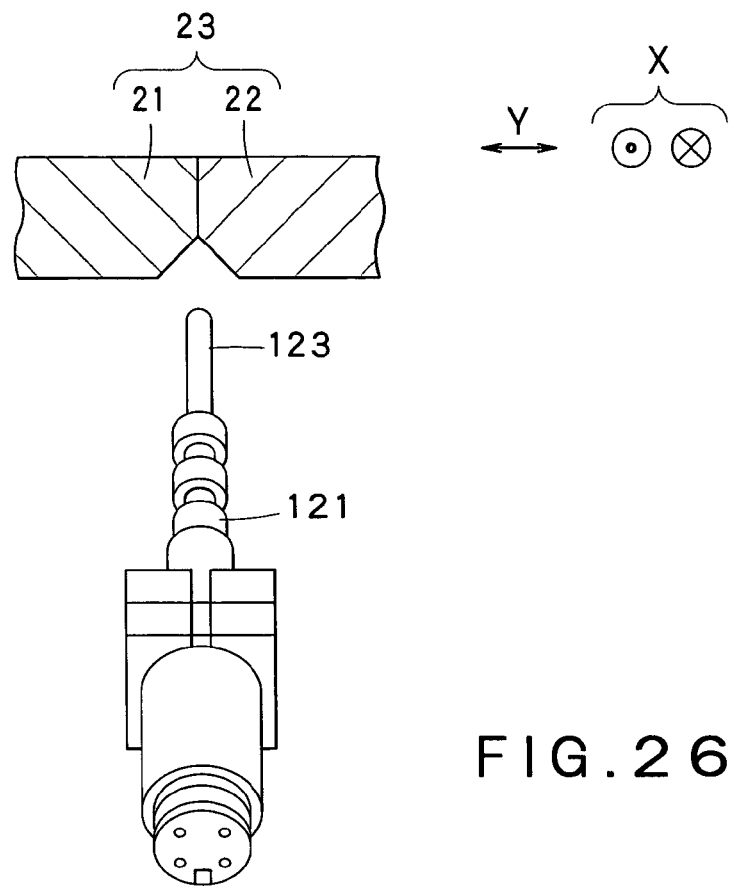
FIG. 26 is a front view showing a detection means 121.

FIG. 26 is a front view showing the detection means 121. The detection means 121 functions as a shift amount detection means for detecting the shift amount between the tool holding section 31 and the welding position. For example, the detection means 121 is realized by a contact sensor. The detection means 121, when the car body 34 is arranged on the traveling road surface, is arranged so that a contactor 123 approaches or makes contact with the welding line 29. The contactor 123 detects the beveling portion formed on a welding line 29 and detects a shift between the beveling portion and the contactor 123 in the transverse direction Y. The shift amount indicates a shift amount between the tool holding section and the welding position.

The detection means 121 gives detection results to the control means. The control means, on the basis of the detection results of the detection means 121, gives a shift amount correction instruction to the crossing driving means 120. By doing this, the crossing driving means 120 moves the cylinder support section 42 to the position where the shift between the welding tool 24 and the welding position in the transverse direction Y is canceled. Therefore, the control means 60 and crossing driving means 102 function as a correction moving means for correcting the shift in the transverse direction Y.

Further, although the control means 60, on the basis of the detection results of the detection means 121, drives the crossing driving means 102, when the traveling means 35 is provided with a steering function, the steering function may be controlled. For example, when the traveling means 35 is formed so as to change the direction of the wheels 47, on the basis of the detection results of the detection means 121, the control means 60 may change the direction of the wheels 47. Further, when the wheels 47 on one side in the transverse direction and the wheels 47 on the other side in the transverse direction are to be driven independently, on the detection results of the detection means 121, the control means 60 may set the wheels 47 to be driven. In this way, to make the wheels 47 follow the welding line 29, the traveling direction may be changed. In this case, the control means 60 and traveling means 35 function as a correction moving means for correcting the shift in the transverse direction Y.

When the detection means 121 detects the shift amount between the tool holding section 31 and the welding position, on the basis of the shift amount, the control means 60 moves the tool holding section 31 with respect to the article 23 so as to cancel the shift. The shift between the tool holding section 31 and the welding position is canceled in this way, thus even if a teaching error of the welding position, a welding position error, or a traveling movement error is caused, the article 23 can be welded accurately at the welding position. Further, even if the car body 34 receives reaction force from the article 23, the welding tool 24 can be prevented from shifting from the traveling route where the welding tool 24 is to travel.

Further, the tool holding section 31 is moved in the transverse direction Y with respect to the car body 34 by the crossing driving means 102, thus regardless of the movement of the car body 34, the tool holding section 31 can be moved according to the shift. By doing this, the follow-up of the tool holding section 31 to the welding position is improved and the welding tool 24 can be prevented from shifting from the welding line 29. Further, the position of the welding tool 24 can be adjusted finely.

Further, since the tool holding section 31 can be moved in the transverse direction Y by the traveling means 35, even if the moving direction and welding line are shifted from each other, and the shift amount is increased as the tool holding section 31 travels, the welding tool 24 can be prevented from shifting from the welding line 29.

Figure 27:
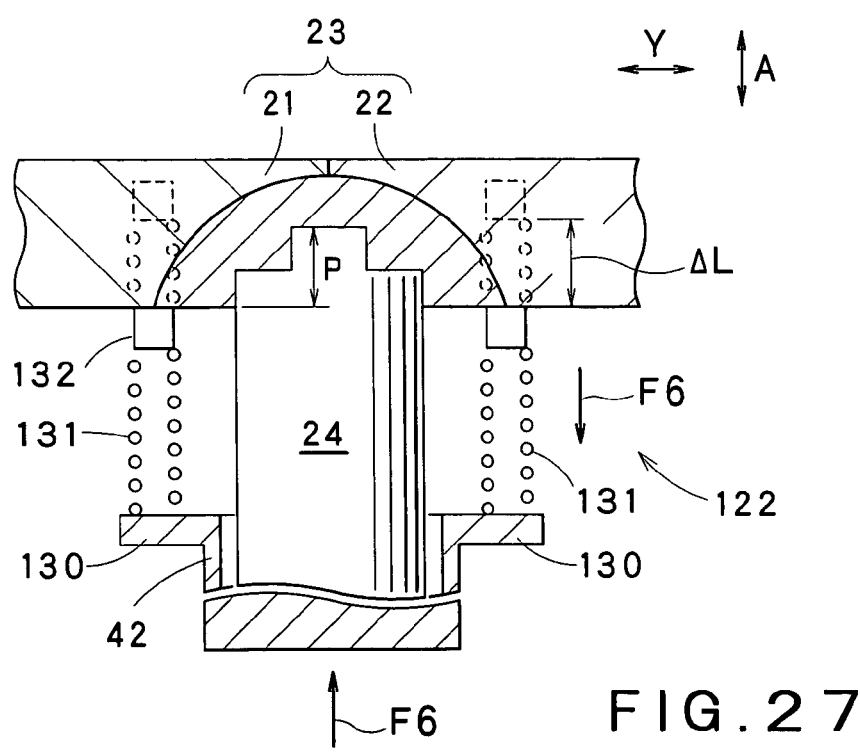
FIG. 27 is a sectional view showing a regulation means 122 simplified.

FIG. 27 is a sectional view showing the regulation means 122 simplified. The regulation means 122 includes a connection section 130, an expansion and contraction section 131, and a roller section 132. The connection section 130 is fixed to the motor support section 42 and moves in the reference axial direction A together with the motor support section 42. Further, the expansion and contraction section 131 is connected to the connection section 130 and expands and contracts elastically along the reference axial line L1. The roller section 132 is installed on the other side in the axial direction of the connection section 130.

When the air cylinder 52 presses the motor support section 42, the welding tool 24 and expansion and contraction section 131 move toward the article 23 together with the motor support section 42. The welding tool 24, by pressing the article 23 by a predetermined pressing force F6, immerses into the article 23. Further, with respect to the expansion and contraction section 131, when the welding tool 24 reaches a predetermined immersion amount, the roller section 132 makes contact with the article 23. And, when the welding tool 24 immerses more, the expansion and contraction section 131 is contracted. At this time, the expansion and contraction section 131 generates spring force in the direction of returning to the natural state. By doing this, the tool support section 42 receives force in the opposite direction of the tool immersion direction. The spring force generated by the expansion and contraction section 131 is increased according to a contraction amount $\Delta L$ of the expansion and contraction section 131 and increased as the immersion of the welding tool 24 proceeds.

When the welding tool 24 reaches a predetermined immersion amount P, the spring force F6 given from the expansion and contraction section 131 becomes almost zero. At this time, the spring length is the natural length and the contraction and expansion amount becomes zero. When it is set like this, it can be controlled that the welding tool 24 is immersed more than the predetermined immersion amount. The expansion and contraction section 131, for example, can be realized by a coil spring or an air spring.

Further, the roller section 132 is supported rotatably by the expansion and contraction section 131. By doing this, even if the car body is in the traveling state, the spring force F6 of the expansion and contraction section 131 can be given to the motor support section 42. And even if the car body is traveling, the immersion amount of the welding tool 24 can be kept at the preset immersion amount. In this case, even during traveling, the motor support section 41 can be pressed by the air cylinder 52 at the predetermined pressing force F5.

By doing this, regardless of the moving speed of the car body 34, the welding tool 24 can be prevented from excessive immersion into the article 23. When the friction stir welding device travels itself, depending on the condition of the traveling road surface 38, there is a case that it is difficult to keep the immersion of the welding tool 24 constant. However, by use of the regulation means 122 aforementioned, even if the welding line 29 of the article 23 is long, during movement along the welding line 29, the immersion amount of the welding tool 24 can be prevented from changing and the welding quality can be improved. Further, when the immersion amount is kept mechanically constant, there is no need to use a sensor and the control means can be realized by a simple constitution. Therefore, even if an air cylinder in which it is difficult to accurately adjust the immersion position is used as a movement driving means, the immersion amount of the welding tool can be kept constant. Further, the welding tool 24 can travel in the state that the pressurization by the air cylinder is continued.

Figure 28:
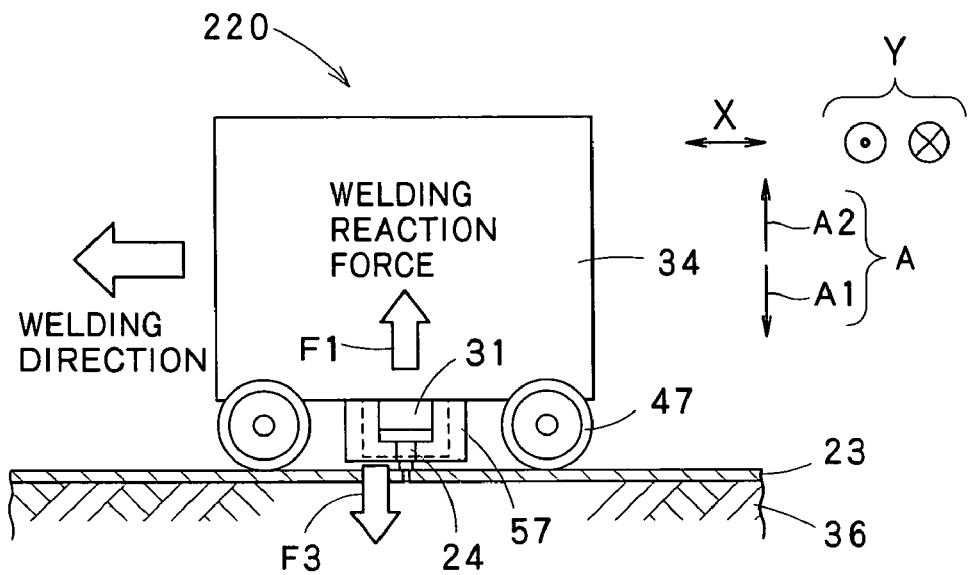
FIG. 28 is a sectional view showing a welding device 220 of a fourth embodiment of the present invention.

FIG. 28 is a sectional view showing a welding device 220 of the fourth embodiment of the present invention. The welding device 220 of the fourth embodiment is equipped with a car body pressing means for giving force against the reaction force given from the article 23 in the reference axial direction to the car body and the other constitution is the same as that of the welding device 20 of the first embodiment. Therefore, for the same constitution as that of the welding device of the first embodiment, the explanation will be omitted.

When at least either of the article 23 and contact member 36 is a ferromagnetic substance, the welding device 220 is equipped with a magnet body 57 on one side A1 in the reference axial direction of the car body 34 in order to prevent rising. The magnet body 57 may be a permanent magnet or an electromagnet. When the magnet body 57 is an electromagnet, the control means 60 excites the electromagnet 57 when immersing the welding tool. By doing this, magnetic force F3 toward the article 23 is generated in the car body 34. In this case, the magnet body 57 functions as a car body pressing means for giving force against the welding force F1 to the car body 34. Further, when the welding tool 24 is not immersed, the excitation of the electromagnet is stopped, thus the force F3 toward the article 23 can be canceled and the convenience can be improved.

Figure 29:
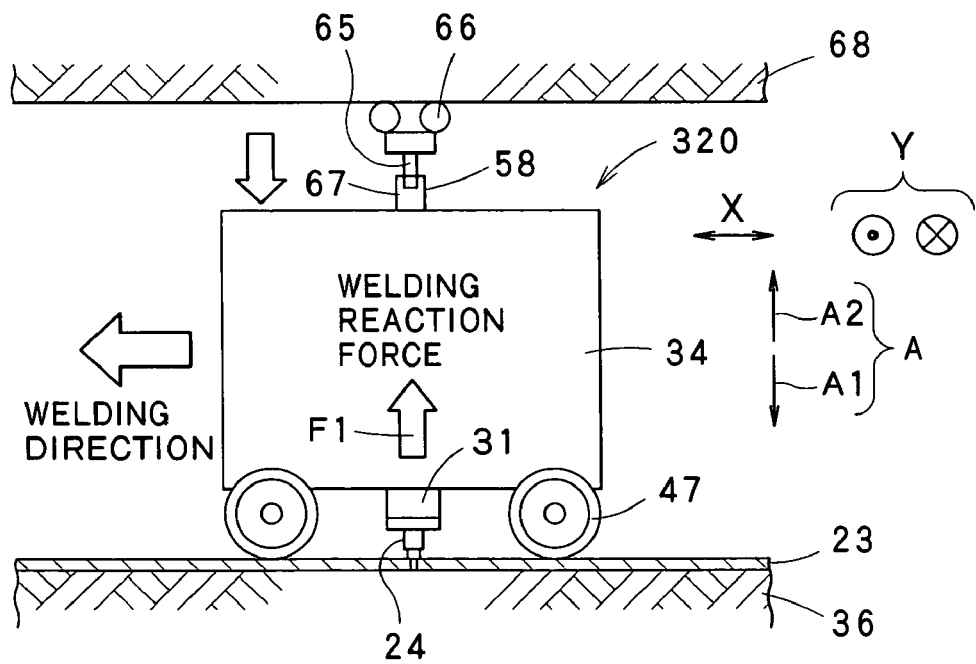
FIG. 29 is a sectional view showing a welding device 320 of a fifth embodiment of the present invention.

FIG. 29 is a sectional view showing a welding device 320 of the fifth embodiment of the present invention. The welding device 320 of the fifth embodiment is equipped with a car body pressing means 58 for giving force against the reaction force given from the article 23 in the reference axial direction to the car body and the other constitution is the same as that of the welding device 20 of the first embodiment. Therefore, for the same constitution as that of the welding device 20 of the first embodiment, the explanation will be omitted.

The welding device 320, to prevent rising, has the car body pressing means 58 for pressing the car body 34 on one side A2 in the reference axial direction from the ceiling or wall at the welding job site. The car body pressing means 58 includes an expansion and contraction section 65, a ceiling contact portion 66, and a car body contact portion 67. The expansion and contraction section 66 is installed expansibly and contractibly in the longitudinal direction. The ceiling contact portion 66 is installed at one end of the expansion and contraction section 66 in the longitudinal direction and makes contact with a ceiling 68. The car body contact portion 67 is installed at the other end of the expansion and contraction section 66 in the longitudinal direction and makes contact with the car body 34. For example, the expansion and contraction section 65 is realized by an air cylinder. The ceiling contact portion 66 includes a roller which makes contact with the ceiling 68 and can rotate and a contact portion for supporting rotatably the roller.

When immersing the welding tool, the control means 60 expands the expansion and contraction section 65 of the pressing means 58. Since the ceiling contact portion 66 is in contact with the ceiling 68, the pressing means 58 presses down the car body 34 by the car body contact portion 67. By doing this, the car body 34 can be prevented from rising due to the reaction force.

Figure 30:
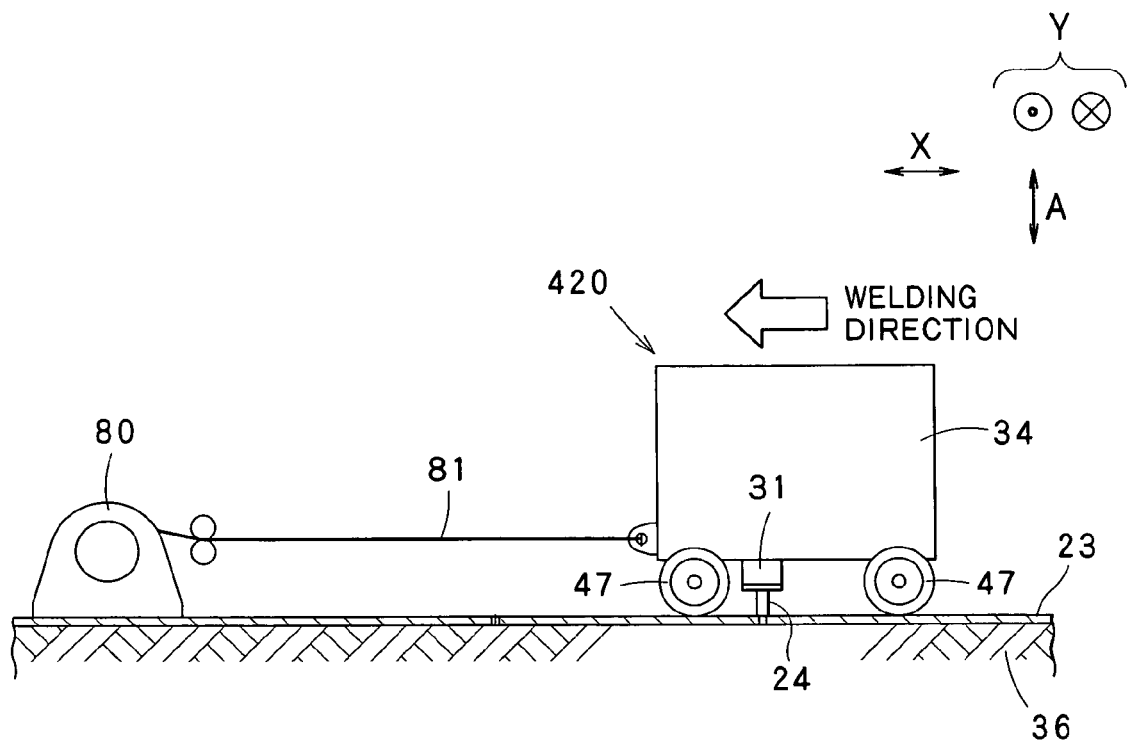
FIG. 30 is a sectional view showing a welding device 420 of a sixth embodiment of the present invention.

FIG. 30 is a sectional view showing a welding device 420 of the sixth embodiment of the present invention. The welding device of the sixth embodiment is different in the constitution of the traveling means from the welding device 20 of the first embodiment. The other constitution is the same as that of the welding device 20 of the first embodiment. Therefore, for the same constitution as that of the welding device of the first embodiment, the explanation will be omitted.

When the welding line 29 of the article 23 is a straight line, the car body 34 may travel by a winch mechanism. In this case, a wire winding device 80 is arranged at one end of the welding line 29 of the article 23 and the car body 34 is arranged at the other end of the welding line 29 of the article 23. And, the car body 34 and wire winding device 80 are connected by a wire 81. The wire winding device 80 winds the wire 81, thus the car body 34 can move along the welding line. The car body 34 can travel in this way.

Figure 31:
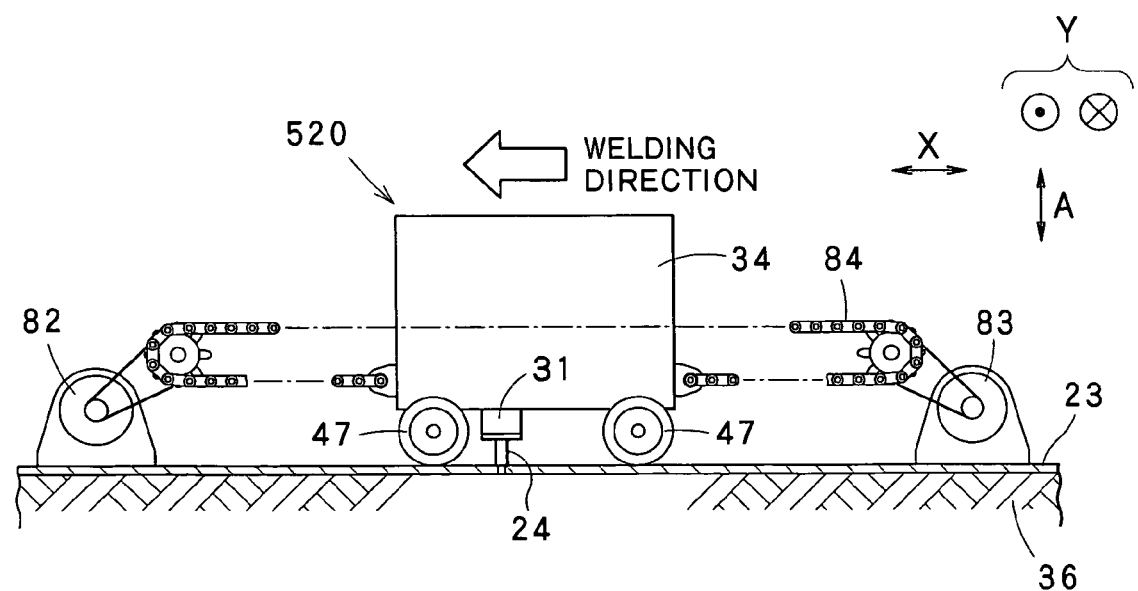
FIG. 31 is a sectional view showing a welding device 520 of a seventh embodiment of the present invention.

FIG. 31 is a sectional view showing a welding device 520 of the seventh embodiment of the present invention. The welding device 520 of the seventh embodiment is different in the constitution of the traveling means from the welding device 20 of the first embodiment. The other constitution is the same as that of the welding device 20 of the first embodiment. Therefore, for the same constitution as that of the welding device of the first embodiment, the explanation will be omitted.

When the welding line 29 of the article 23 is a straight line, the car body 34 may travel by a winch mechanism. In this case, a first sprocket rotator is installed at one end of the welding line 29 of the article 23 and a second sprocket rotator is installed at the other end of the welding line 29 of the article 23. The first sprocket rotator 82 and second sprocket rotator 83 respectively support rotatably the sprockets.

A chain 84 is wound over the two sprockets. At least either of the two sprocket rotators 82 and 83 has a rotating means for driving the sprocket to rotate. A part of the chain 84 is connected to the car body 34. The sprockets are rotated by the rotating means, thus the chain moves, and the car body 34 travels along the welding line 29 together with the chain 84.

Figure 32:
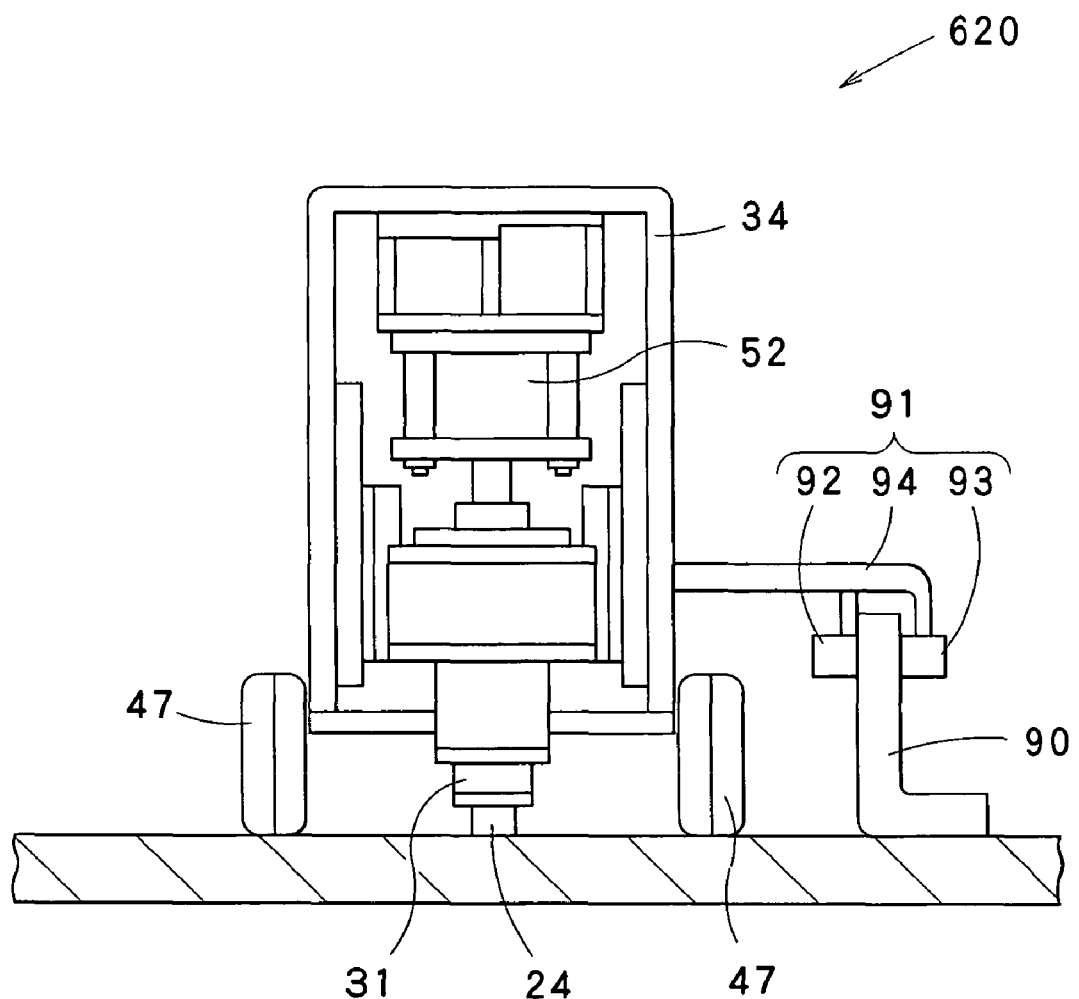
FIG. 32 is a sectional view showing a welding device 620 of an eighth embodiment of the present invention.

FIG. 32 is a sectional view showing a welding device 620 of the eighth embodiment of the present invention. The welding device 620 of the eighth embodiment, compared with the welding device 20 of the first embodiment, additionally has a guide mechanism to travel precisely on the traveling route. The other constitution is the same as that of the welding device 20 of the first embodiment. Therefore, for the same constitution as that of the welding device of the first embodiment, the explanation will be omitted.

When the welding device 620 has a guide function, a guide body 90 extending in parallel with the welding line 29 is temporarily fixed to the article 23. The welding device 620 has a guide mechanism 91 moving along the guide body 90. The guide mechanism 91 has a pair of rollers 92 and 93 for clamping the guide body 90 on both sides in the transverse direction and a fixing section 94 fixed to the car body for supporting rotatably the rollers 92 and 93. The guide mechanism 91 is realized by the so-called cam follower (a cantilever radial bearing).

The car body is guided by the guide mechanism 91, thus the car body, even if reaction force is given from the article 23, will not be shifted in the transverse direction. Therefore, the car body can move accurately along the welding line 29. Further, a rib formed on the article 23 may be used as a guide body 90. As mentioned above, the guide mechanism functions as a traveling auxiliary means for traveling the car body along the traveling route where the car body travels. The guide body 90 temporarily fixed is removed after the frictional stirring and welding. Further, when the guide body is installed at the job site or on the platen, it may be repeatedly used permanently.

Further, the guide mechanism 91 may travel on the guide body by forming a slit in the wheels 47. Further, in place of the wheels, a direct acting bearing is attached and combined with the guide body, thereby it may be used as a linear guide. Further, a rail is formed in a rack shape and formed as a pinion shape on the outer periphery of each wheel, and the rail may be meshed with the wheels.

Figure 33:
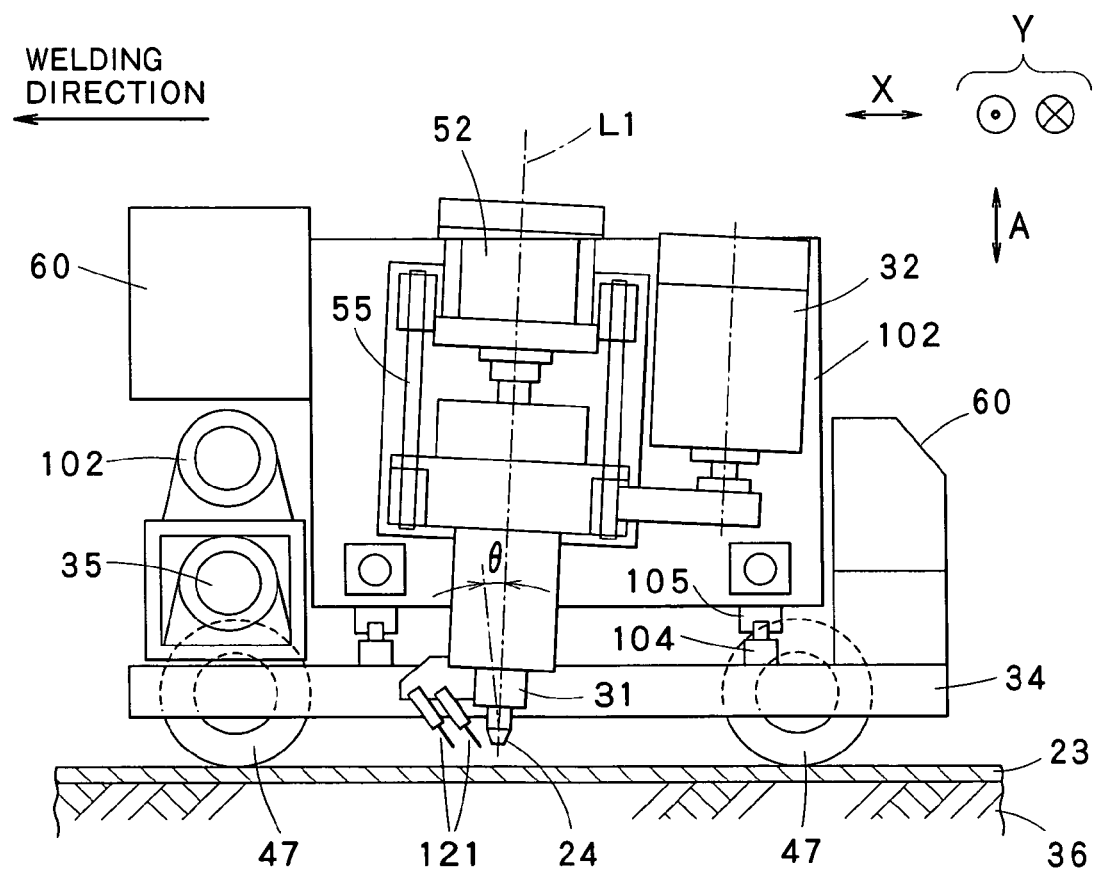
FIG. 33 is a side view showing a welding device 720 of a ninth embodiment of the present invention.
Figure 34:
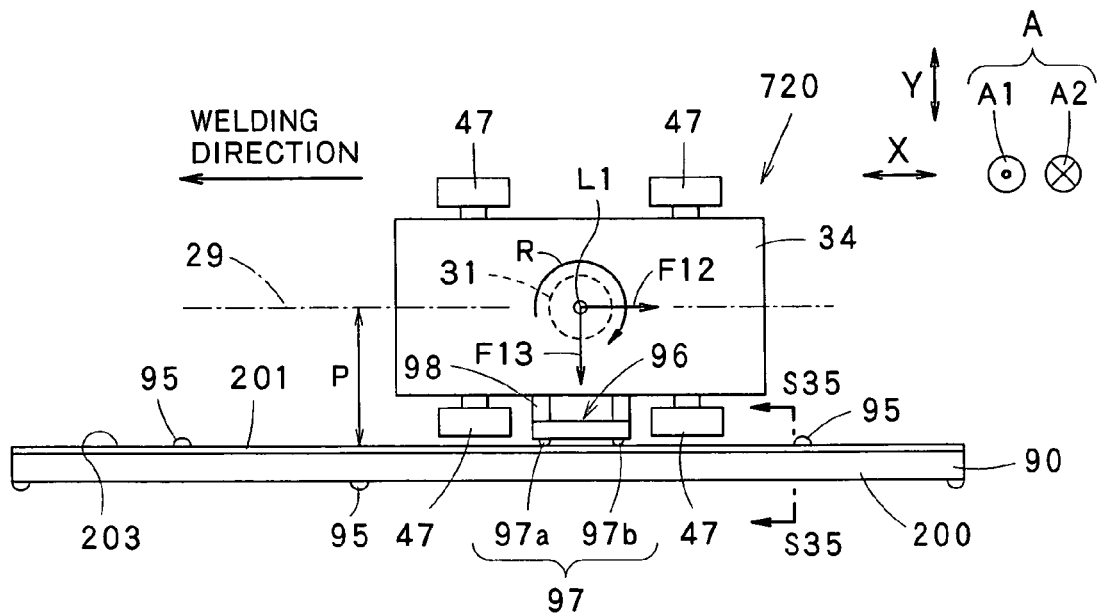
FIG. 34 is a plan view showing the welding device 720.

FIG. 33 is a side view showing a welding device 720 of the ninth embodiment of the present invention and FIG. 34 is a plan view showing the welding device 720. The welding device 720 has the same constitution as that of the welding device of each of the embodiments aforementioned. For the same constitution, the explanation is simplified or omitted and the same reference numerals are assigned.

The welding device 720 includes the tool holding section 31 for holding the welding tool 24, the rotation driving means 32 for driving the tool holding section 31 to rotate round the reference axial line L1, the air cylinder 52 for moving the tool holding section 31 along the reference axial line L1, the car body 34 for loading the tool holding section 31, rotation driving means 32, and air cylinder 52, the traveling means 35 for traveling the car body 34, and the control means 60 for controlling the rotation driving means 32, traveling means 35, and air cylinder 52. The welding device 720 can weld the two members to be welded 21 and 22 along the welding line 29 since the control means 60 executes the operation procedure shown in FIG. 9.

Further, the welding device 720 has the crossing driving means 102 for driving the tool holding section 31 to move in the transverse direction Y and the detection means 121 for detecting the position of the welding line 29 of the article 23. The control means 60, on the basis of the detection results given from the detection means 121, controls the crossing driving means 102, thus the tool holding section 31 can be arranged on the welding line 29. The detection means 121 may be arranged on both sides of the welding line 29 in the transverse direction Y and may be arranged on both sides of the welding line 29 in the traveling direction.

As shown in FIG. 34, the welding device 720 additionally has a guide mechanism 96 in order to travel along a predetermined traveling route. In this case, the guide body 90 for guiding the guide mechanism 96 is installed on the article 23 or a fixing object fixed integrally to the article 23. The guide body 90 is installed at a predetermined interval P with respect to the welding line 29 in the transverse direction Y and extends parallel with the welding line 29.

When the welding line 29 is a straight line, the guide body 90 also extends linearly. Further, when the welding line 29 is a curved line, the guide body 90 also extends curvedly almost similarly to the welding line 29. In this embodiment, the guide body 90 is installed on the top surface of the article 23 which is a traveling road surface and is fixed to the article 23 at a plurality of welding portions 95 by spot welding. In this embodiment, the guide body 90 is arranged in the direction in which the second traveling reaction force F13 is acted from the car body 34.

The guide mechanism 96 has a contact portion 97 fixed to the car body 34. The contact portion 97, in the car body traveling state, makes contact with a guide surface 203 which is the surface of the guide body on one side in the width direction. The guide surface 203 is the surface on one side in the transverse direction Y and extends in the traveling direction X. Further, the guide surface 203 is the surface of the guide body 90 on the upstream side in the direction in which the second traveling reaction force F13 acts. In other words, the guide surface 203 is the surface of the guide body 90 on the upstream side in the direction in which the outer circumferential portion of the tool holding section 24 passes the welding line 29 on the backward side in the traveling direction. In other words, the guide surface 203 is the surface on the upstream side in the opposite direction of the direction in which the outer circumferential portion of the tool holding section 31 passes the welding line 29 on the forward side in the traveling direction.

The contact portion 97 is arranged on one side of the guide body 90 in the width direction and is projected beyond the positions of the wheels 47 on one side in the transverse direction Y. In the car body traveling state, the contact portion 97 makes contact with the guide surface 203, thus the contact portion 97 transfers the second traveling reaction force F13 given to the car body 34 from the article 23 to the guide body 90. In this embodiment, viewing the welding tool 24 from the forward side in the traveling direction, that is, from the downstream side in the traveling direction, the contact portion 97 is installed on a car body portion 98 in the opposite direction of the direction in which the outer circumferential portion of the tool holding section 24 passes the welding line 29. Concretely, the contact portion 97 is structured so as to include a first contact portion 97a positioned on the forward side of the welding tool 24 in the traveling direction, that is, on the downstream side in the traveling direction and a second contact portion 97b positioned on the backward side of the welding tool 24 in the traveling direction, that is, on the upstream side in the traveling direction. Further, the first contact portion 97a and second contact portion 97b are arranged between the two wheels 47 arranged side by side in the traveling direction X.

As mentioned above, the welding device 720 is a self-traveling friction stir welding device having the detection means 121 for detecting the welding line 29 and the crossing driving means 102 for correcting the position of the welding tool 24 in the transverse direction Y according to the detection position and has a cantilever guide roller in consideration of the reaction force in the transverse direction Y which is given from the article 23.

Figure 35:
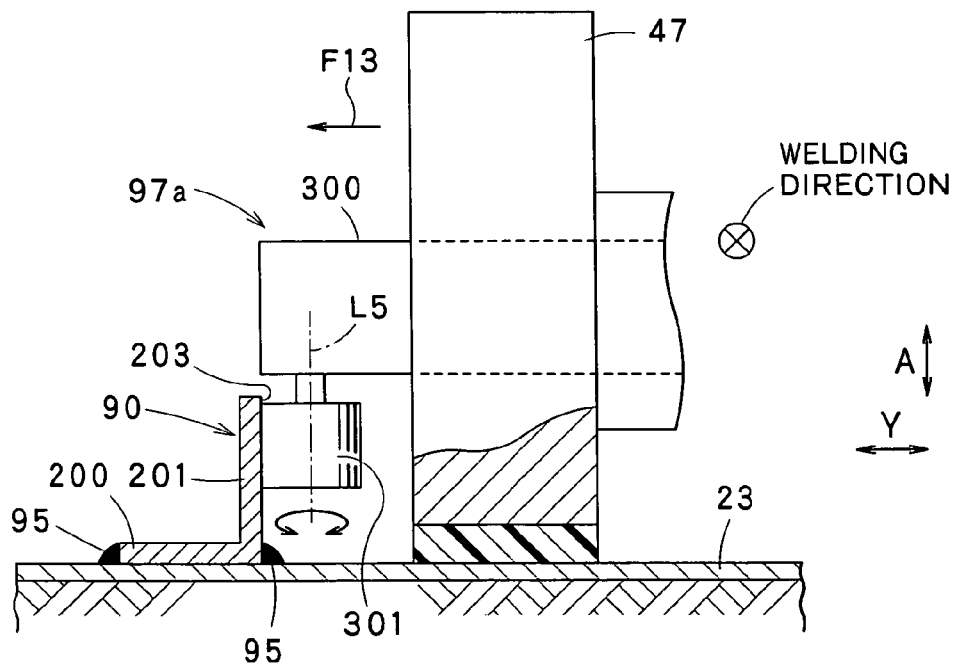
FIG. 35 is a sectional view showing the welding device 720 viewed from the cut sectional line in the direction of the arrow S35-S35 shown in FIG. 34.

FIG. 35 is a sectional view showing the welding device 720 viewed from the cut sectional line in the direction of the arrow S35-S35 in FIG. 34. The guide body 90 is formed in the continuous shape extending in the traveling direction and the shape of the section perpendicular to the longitudinal direction is almost an L-shape. The guide body 90 is composed of a fixed portion 200 in contact with the article 23 and a guide portion 201 which is bent and extended from the end of a fixed portion 200. The fixed portion 200 is spot-welded to the article 23 at the plurality of welding portions 95. Further, on the guide portion 201, a guide surface 203 which extends along the welding line 29 and extends vertically is formed. The guide surface 203, when the welding device travels, becomes a surface where the contact portion 97 makes contact with.

Each of the contact portions 97 includes a projected portion 300 projected from the car body 34 and a rotator 301 which is installed at the front end of the projected portion 300 and is formed rotatably round a predetermined rotation axial line L5. Here, the rotation axial line L5 is set perpendicularly to the traveling road surface. Further, the rotator 301 is formed in a cylindrical shape coaxial with the rotation axial line L5.

The welding device 720 travels while performing the frictional stirring and welding, thereby is given the second traveling reaction force F13 from the article 23. The car body 34 moves in the traveling direction X and is given force for sliding and moving in the transverse direction Y by the second traveling reaction force F13. And, the contact portion 97 makes contact with the guide surface 203 of the guide body 90. The contact portion 97 makes contact with the guide body 90, thereby gives the second traveling reaction force F13 given to the car body 34 from the article 23 to the guide body 90. The car body 34, when the contact portion 97 is in contact with the guide body 90, is prevented from further moving in the transverse direction Y and can move in the traveling direction X. By doing this, the car body 34 is guided by the guide body 90 and the welding tool 24 can move along the welding line 29.

In this embodiment, the contact portion 97 makes contact with the guide body 90 only on one side in the width direction. Therefore, compared with the case using the cam follower shown in FIG. 32, the preparation operation necessary for welding can be simplified. Concretely, when using the cam follower, it is necessary to hang up the welding device by a lifting device, adjust the position so as to fit the guide body 90 between the pair of rollers 92 and 93, and then hang down the welding device.

On the other hand, in this embodiment, only by arranging the welding device 720 so as to position the contact portion 97 on one side of the guide body 90 in the width direction, the welding device 720 can be arranged at a position suited to welding. Therefore, the preparation operation for frictional stirring and welding can be simplified. Further, even if a gap is formed between the contact portion 97 and the guide body 90, when the traveling is started, the car body 97 moves toward the guide body 90. By doing this, the contact portion 97 can make surely contact with the guide body 90. Therefore, in the state before welding, there is no need to strictly position the contact portion 97 and guide body 90 and the preparation operation can be simplified.

Further, the welding device 720 is equipped with the crossing driving means 102, so that even if the guide body 90 is slightly shifted from the line parallel with the welding line 29, the tool holding section 31 is moved in the transverse direction Y by the crossing driving means 102. Thus the welding tool 24 can be moved more surely along the welding line 29. Further, in this embodiment, when the rotator 301 of the contact portion 97 is in contact with the guide surface 203 of the guide body 90, the rotator 301 rotates round the rotation axial line L5. By doing this, the life span of the rotator 301 can be lengthened. Further, the two contact portions 97a and 97b are installed, so that the car body 34 can be guided more stably by the guide body 90.

Figure 36:
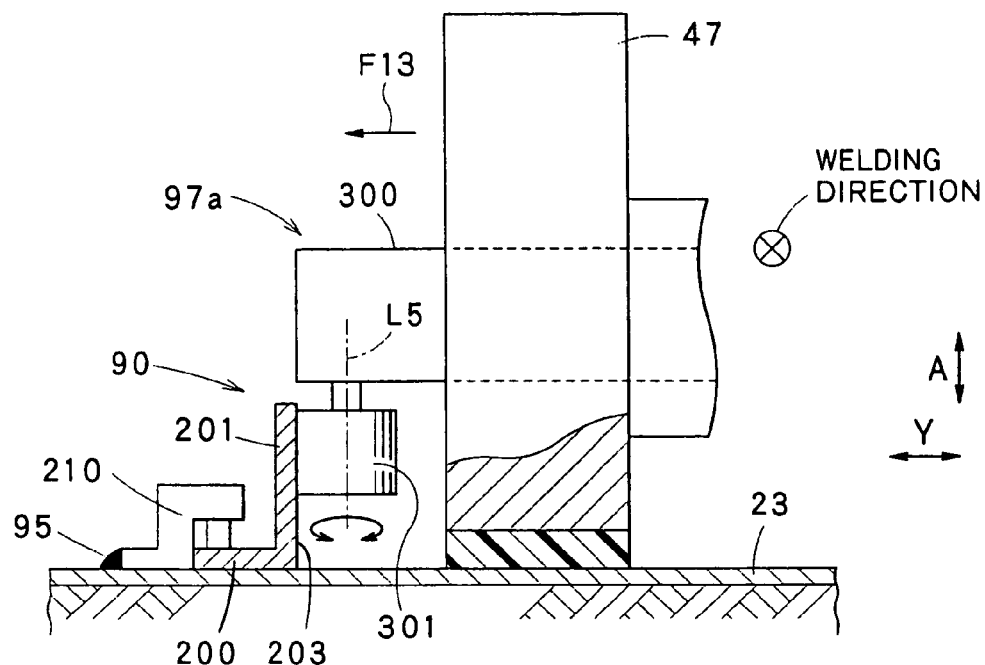
FIG. 36 is a sectional view showing a second embodiment of the guide body 90.

FIG. 36 is a sectional view showing the second embodiment of the guide body 90. Although the guide body 90 shown in FIG. 35 is directly welded to the article to be welded 23, it may be indirectly fixed to the article to be welded 23. For example, as shown in FIG. 36, the guide body 90 may be fixed to a fixing object 210 fixed to the article 23. As mentioned above, the fixing method for fixing the guide body 90 to the article 23 is not restricted particularly. For example, the fixing object 210 may be realized by a rib installed on the article 23. In this case, the rib and guide body 90 are fixed via a joining means such as a vice, thus the guide body 90 can be indirectly fixed to the article 23. After ending of the frictional stirring and welding, the vice is loosened, thus the guide body 90 can be easily removed from the welded article 23.

Figure 37:
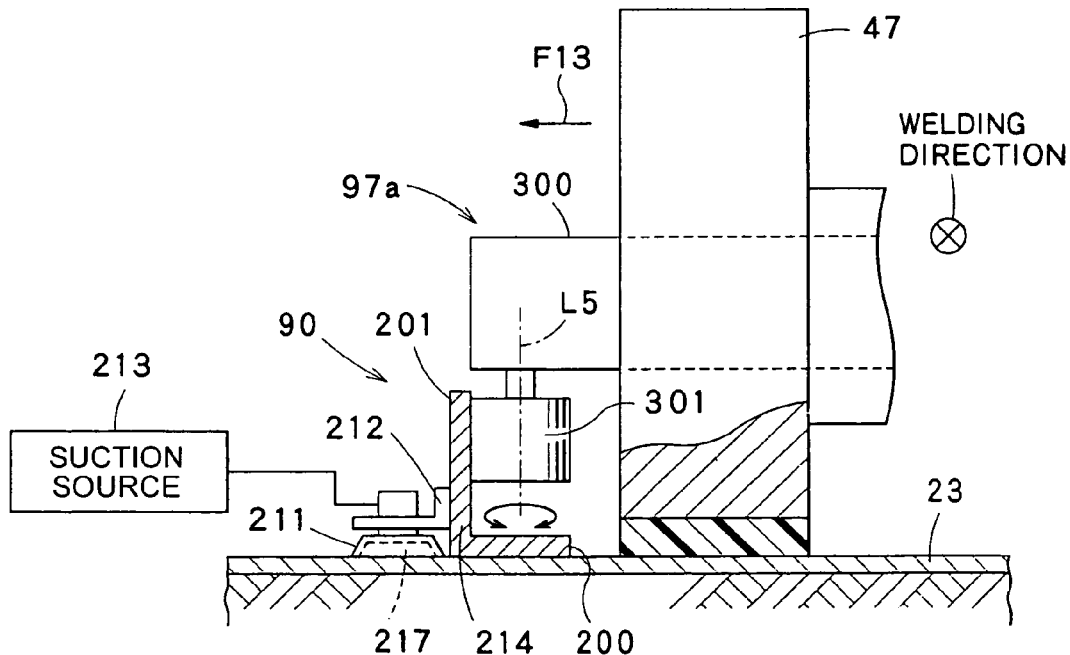
FIG. 37 is a sectional view showing a third embodiment of the guide body 90.

FIG. 37 is a sectional view showing the third embodiment of the guide body 90. As shown in FIGS. 36 and 37, the guide body 90 may be fixed to the article 23 or fixing object 210 by vacuum suction. In this embodiment, the guide body 90 is fixed to the article 23 by vacuum suction. In this case, the guide body 90 includes a body part 214 having the fixed portion 200 and guide portion 201, a suction means 211, and a connection body 212 for fixing the body part 214 and suction means 211.

In this embodiment, the suction means 211 is realized by a vacuum suction pad. The suction pad, when it is in contact with the article 23, forms a closed space 217 between the article 23 and itself. And, air filled in the closed space 217 is suctioned by a suction source 213, thus the suction pad is adhered to the article 23. The suction means 211 and the body part 214 are connected by the connection means 212, thus the body part 214 is fixed to the article 23. When the body part 214 is fixed to the article 23 by the suction means 211 in this way, after ending of the frictional stirring and welding, the suction is canceled by the suction source 213, thus the body part 214 can be removed easily from the welded article 23. By doing this, compared with the case that the guide body 90 is fixed to the article 23 by welding, the operability can be improved and the article 23 can be prevented from damage.

Figure 38:
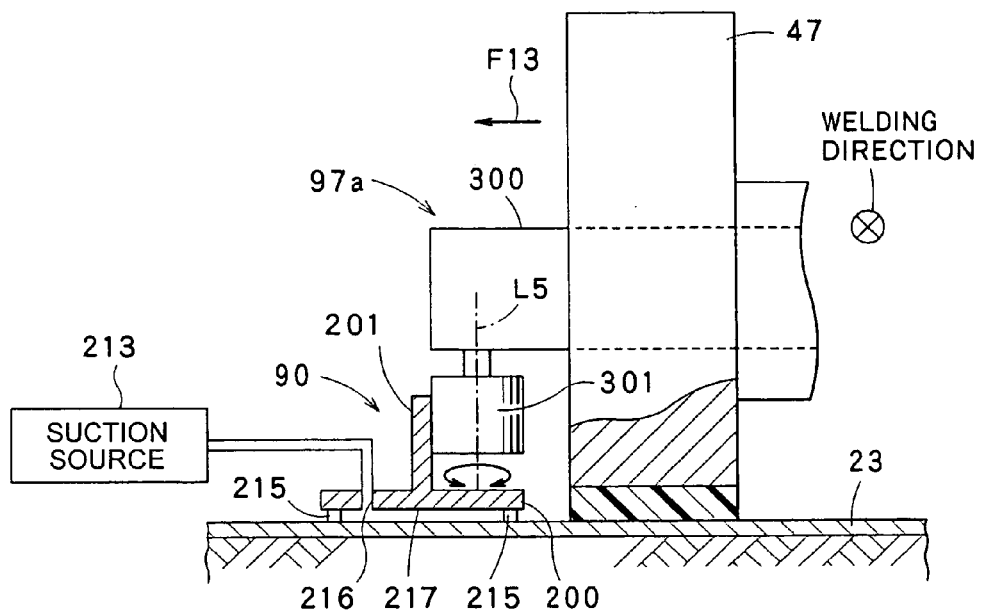
FIG. 38 is a sectional view showing a fourth embodiment of the guide body 90.

FIG. 38 is a sectional view showing the fourth embodiment of the guide body 90. The suction means 211 and body part 214 may be structured integrally with each other. In this embodiment, the guide body 90 includes the plate-shaped fixed portion 200 opposite to the article 23 and the guide portion 201 upright from the fixed portion 200 for guiding the car body 34.

On the fixed portion 200, a pad member 215 for enclosing the space between the fixed portion 200 and the article 23 is installed. The pad member 215 is a member which is flexible and elastic. Therefore, the suction space 217 enclosed by the article 23, fixed portion 200, and pad member 215 is formed. Further, in the fixed portion 200, a through hole 216 for interconnecting the suction source 213 and suction space 217 is formed.

Air filled in the suction space 217 is suctioned via the through hole 216 by the suction source 213, thus the pressure in the suction space 217 is reduced compared with the atmospheric pressure. By doing this, the fixed portion 200 is pressed against the article 23 by the atmospheric pressure and is fixed integrally to the article 23. The suction space 217 is formed almost overall the fixed portion 200 in this way, thus the surface area of the suction space 217 can be increased and the suction force for attaching the fixed portion 200 to the article 23 can be increased. Therefore, even if the second traveling force F13 is given from the car body 34, the guide body 90 can be prevented more surely from shifting from the article 23.

Figure 39:
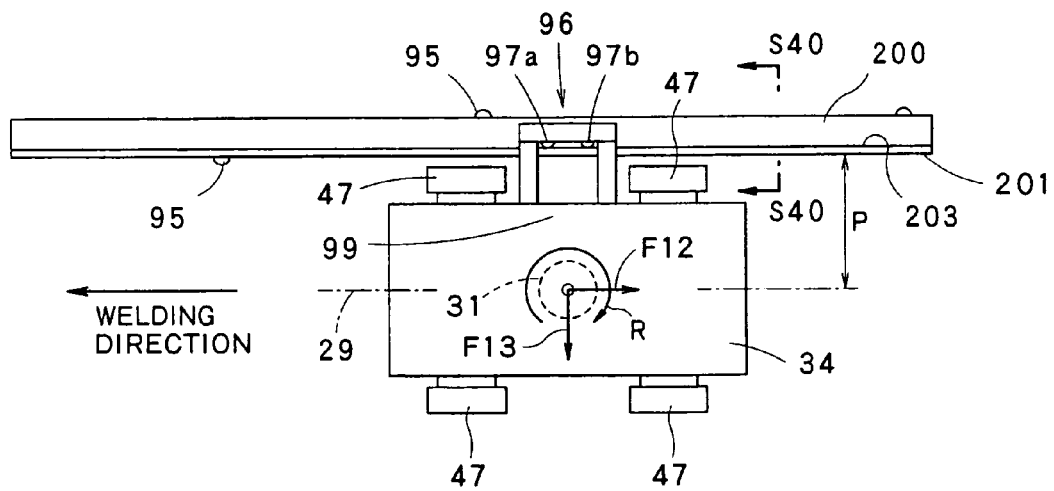
FIG. 39 is a plan view showing a modification of the welding device 720 of the ninth embodiment.
Figure 40:
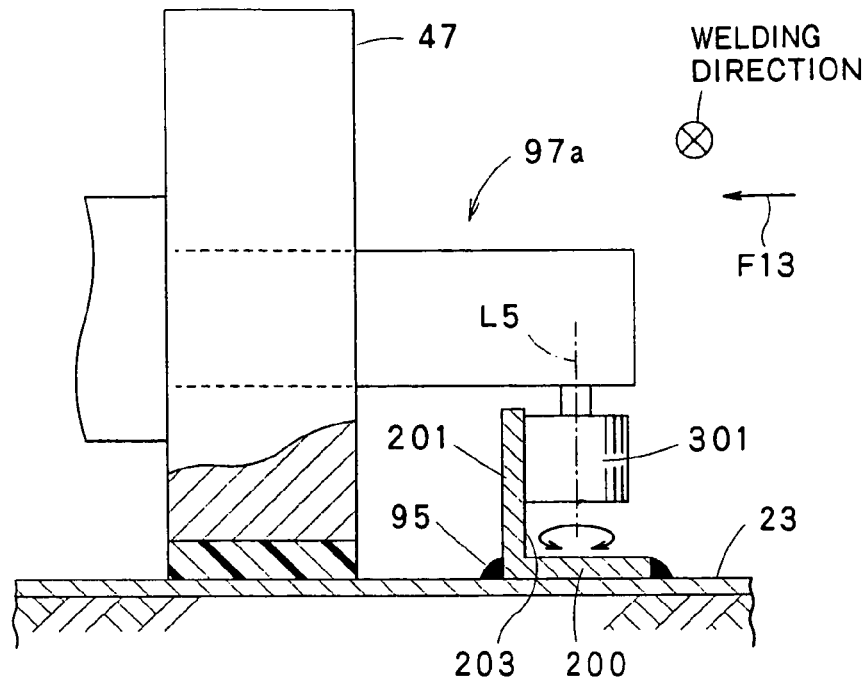
FIG. 40 is a sectional view showing the welding device 720 viewed from the cut sectional line in the direction of the arrow S40-S40 shown in FIG. 39.

FIG. 39 is a plan view showing a modification of the welding device 720 of the ninth embodiment and FIG. 40 is a sectional view showing the welding device 720 viewed from the cut sectional line in the direction of the arrow S40-S40 shown in FIG. 39. In the welding device 720 of this modification, the guide body 90 and guide mechanism are arranged at the different positions from the positions shown in FIG. 34. Concretely, the guide body 90 is arranged with respect to the car body 34 in the opposite direction of the direction in which the second traveling reaction force F13 acts from the car body 34. The contact portion 97 is projected in the opposite direction of the direction in which the second traveling reaction force F13 acts from the car body 34. And, the contact portion 97, across the guide body 90, in the car body traveling state, makes contact with the guide portion 201 which is the portion of the guide body 90 on one side in the width direction.

Even if the guide body 90 is installed on the article 23 in this way, the contact portion 97, in the car body traveling state, makes contact with the guide surface 203 which is the surface of the guide body 90 on one side in the width direction. The guide surface 203 is the surface of the guide body 90 of the portion on the upstream side in the direction in which the second traveling reaction force F13 acts.

Also in this case, the welding device 720 travels while performing the frictional stirring and welding, thereby is given force for sliding and moving in the transverse direction Y by the second traveling reaction force F13. And, the contact portion 97 makes contact with the guide surface 203 of the guide body 90. The contact portion 97 makes contact with the guide body 90, thereby gives the second traveling reaction force F13 given to the car body 34 from the article 23 to the guide body 90. The car body 34, when the contact portion 97 is in contact with the guide body 90, is prevented from further moving in the transverse direction Y and moves in the traveling direction X. By doing this, the car body 34 is guided by the guide body 90 and the welding tool 24 can move along the welding line 29.

Even in such an embodiment, the contact portion 97 makes contact with the guide body 90 only on one side in the width direction, so that compared with the case using the cam follower to guide the car body, the preparation operation in the frictional stirring and welding can be simplified. Therefore, in the welding device 720, since the direction in which the second traveling reaction force F13 is given is predetermined, it is desirable to install the contact portion 97 in the position where the second traveling reaction force F13 can be supported and it is preferable to allow the contact portion 97 to make contact with only one side of the guide body 90 in the width direction.

For example, it is possible for the car body to pass above the guide body 90. Further, since the installation position of the guide body 90 on the article 23 may be restricted in some cases, it is preferable that the installation position of the contact portion 97 on the car body 34 can be changed and the projection amount thereof from the car body 34 can be adjusted.

In this embodiment, the welding device 720 travels above the article 23 and the welding tool 24 is immersed into the article 23 arranged below the car body 34. However, as shown in FIG. 1, the welding tool 24 may be immersed into the welded article 23 arranged above the car body 34. In this case, the welding device 720 is guided by the guide body 90 fixed to the traveling road surface and the guide body 90 is formed in the same constitution as that of the guide body aforementioned. Therefore, the guide body 90 may not be fixed to the article 23 and may be fixed to a fixed structural body integral with the article 23. Further, in place of the welding device 720 of this embodiment, when the guide mechanism 96 is installed on the aforementioned welding device, the same effect as that of the welding device 720 of this embodiment can be obtained.

Figure 41:
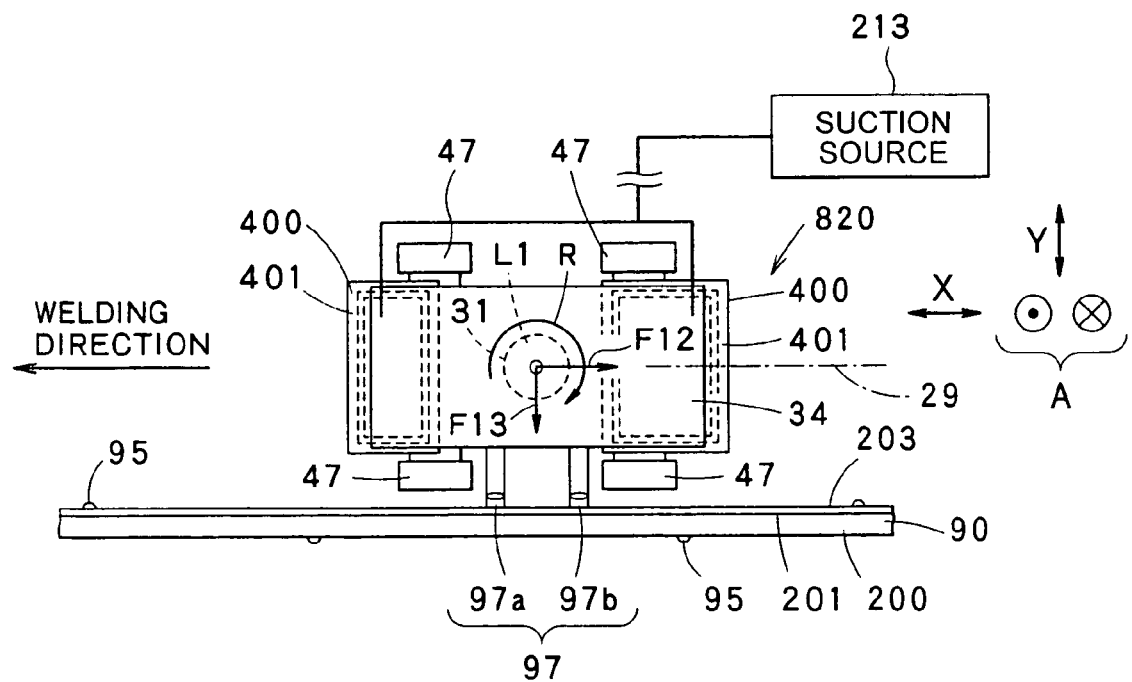
FIG. 41 is a plan view showing a welding device 820 of a tenth embodiment of the present invention.

FIG. 41 is a plan view showing a welding device 820 of the tenth embodiment of the present invention and FIG. 42 is a side view showing the welding device 820. The welding device 820 has the same constitution as that of the welding device 720 of the ninth embodiment and further has a suction means 400 for fixing the car body 34 by suction on the traveling road surface. The suction means 400 is a car body pressing means and at time of welding, gives force against the welding reaction force F1 given to the car body 34 from the article 23 to the car body 34. By doing this, at time of welding, the car body 34 can be prevented from separating from the article 23 and the immersion amount of the welding tool 24 into the article 23 can be prevented from deficiency.

In this embodiment, across the reference axial line L1, two suction means 400 are formed on both sides in the traveling direction. The respective suction means 400 have the similar constitution, so that one of the suction means 400 will be explained.

Figure 44:
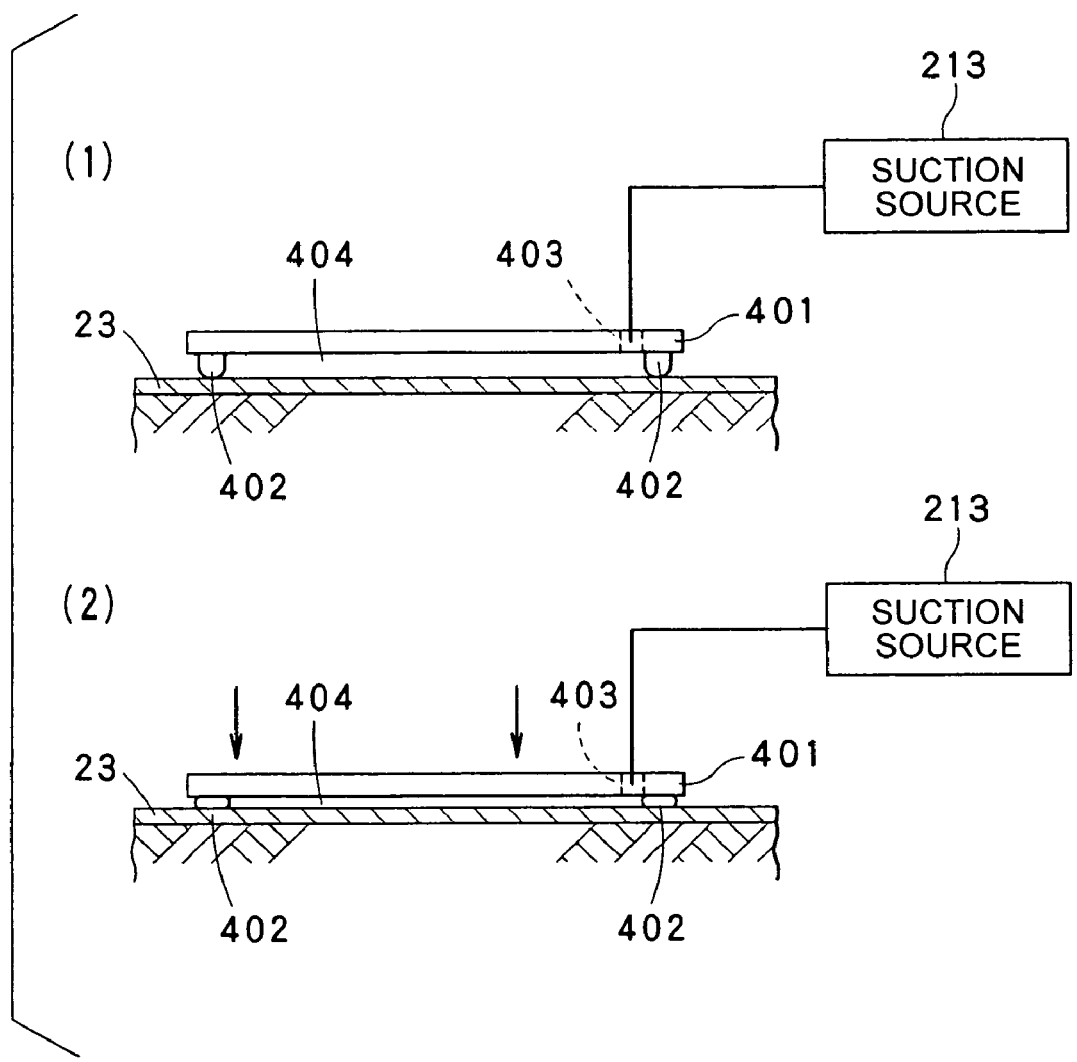
FIG. 44 is a side view showing the operation of the suction means 400.

FIG. 43 is a plan view showing the suction means 400 and FIG. 44 is a side view showing the operation of the suction means 400. The suction means 400 is connected to the car body 34 and is formed so as to include a plate-shaped opposite section 401 opposite to the article 23 and a circular pad section 402 which is projected from the surface of the opposite section 401 on one side in the thickness direction and makes a round of the surface of the opposite section 401.

The opposite section 401 is arranged on the bottom of the car body 34 so as to make the distance between the article 23 which is a traveling road surface and the opposite section 401 smaller as far as possible. In this embodiment, the opposite section 401 is formed almost in a four-sided shape and the surface on one side in the thickness direction is opposite to the article 23. The pad section 402 is made of a flexible and elastic material and encloses the space between the article 23 and the opposite section 401. The pad section 402 extends along the four sides of the opposite section 401 and makes a round of it. Further, in the opposite section 401, a through hole 403 passing through in the thickness direction in the area enclosed by the pad section 402 is formed.

As shown in FIG. 44, air which is a fluid filled in a suction space 404 enclosed by the article 23, opposite section 401, and pad section 402 is suctioned via the through hole 403. Thus the pressure inside the suction space 404 is decreased compared with the atmospheric pressure. By doing this, the opposite section 401 is pressed to the article 23 by the atmospheric pressure and the car body 34 is pressed to the article 23. Therefore, the car body 34 can be prevented from rising from the article 23 when the welding tool is immersed.

In this case, assuming the tool pressing force as Fz, the own weight of the welding device as W, the suction force per unit area as q, and the area of the opposite section 401 as A, the relationship $Fz<(W+q\cdot A)$ must be satisfied. Further, assuming the friction coefficient between the article 23 and the wheels 47 in the traveling direction X as μx, the relationship $Fz\cdot\alpha<(W+q\cdot A-Fz)\cdot\mu x$ must be satisfied. Further, assuming the friction coefficient between the article 23 and the wheels 47 in the transverse direction Y as μy, the relationship $Fz\cdot\beta<(W+q\cdot A-Fz)\cdot\mu y$ must be satisfied.

As mentioned above, the welding device 820 of this embodiment obtains force for pressing the welding device 820 to the article 23 by the vacuum suction force and the own weight of the welding device 820. Therefore, as compared with the case that a weight is loaded on the welding device, since force for pressing the welding device to the welded article 23 is obtained, the weight of the welding device can be reduced. By doing this, the welding device 820 can be easily conveyed and installed.

For example, when the pressing force for pressing the welding tool 24 to the article 23 is 24 kN, if the suction means 400 is not installed, the own weight of the welding device loaded with the weight must be 4600 kg or more. On the other hand, when the surface area of the opposite section 401 in the thickness direction is set to about 0.3 m² and the pressure in the closed space is set to 10 kPa, the own weight of the welding device 820 is sufficiently 2000 kg or more. In this case, when the suction means 400 is installed on the welding device 820, as compared with the case that a weight for preventing rising is loaded in the welding device, the weight can be reduced by about 57%.

Further, in this embodiment, the suction source 213 is installed separately from the welding device 820. Therefore, the welding device 820 can be lightened more. Further, when fixing the guide body 90 by suction, the suction means 400 installed on the welding device 820 and the suction means 211 installed on the guide body 90 can be operated by one suction source 213 and the convenience can be improved more.

Figure 45:
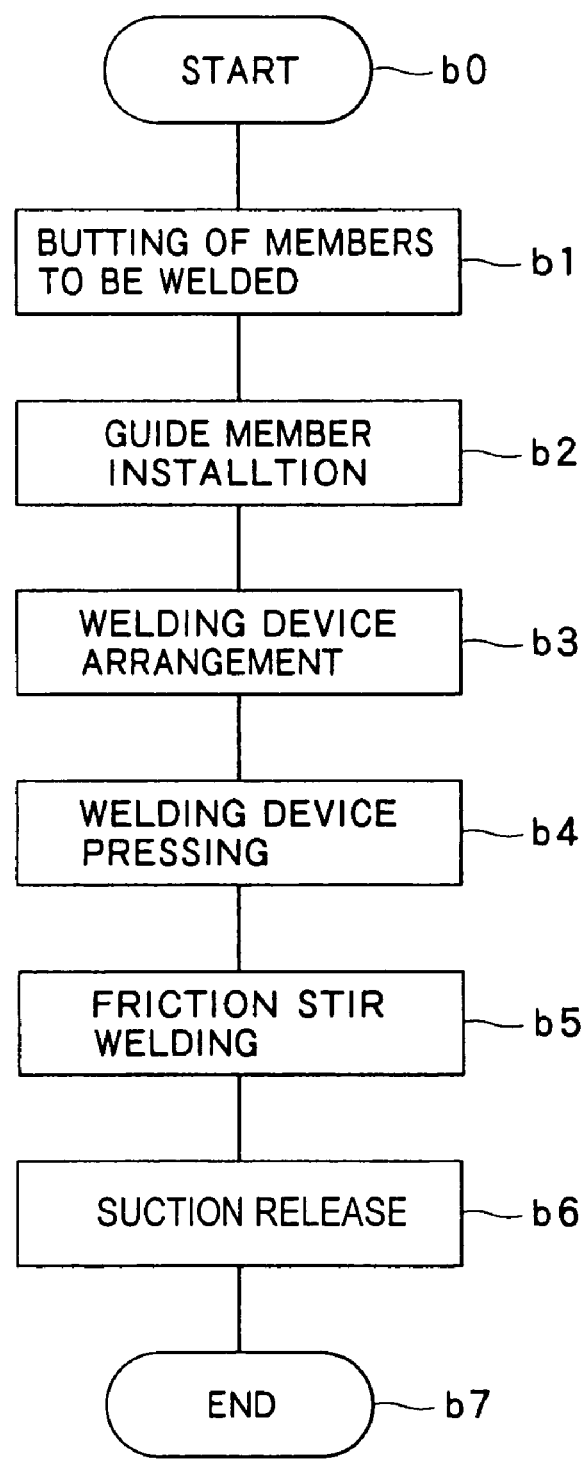
FIG. 45 is a flow chart showing the operation procedure of an operator when adhering the guide body 90 and the welding device 820 by suction and performing the frictional stirring and welding.

FIG. 45 is a flow chart showing the operation procedure of an operator when fixing the guide body 90 and welding device 820 by suction and performing the frictional stirring and welding. Firstly, at Step b0, when the operator prepares the two members to be welded 21 and 22, goes to Step b1. At Step b1, the members 21 and 22 are fixed to the platen, and the two members 21 and 22 are butted to each other to form the welding line 29, and then goes to Step b2.

At Step b2, the guide body 90 is arranged along the welding line 29. When one guide body 90 is shorter in length than the welding line 29, a plurality of guide bodies 90 are arranged side by side in the traveling direction X. When the guide body 90 is arranged along the welding line 29, the suction means 211 of the guide body 90 is operated by the suction source 213 so that the guide body 90 is fixed by suction to the article 23, and then goes to Step b3.

At Step b3, the contact portion 97 of the welding device 820 is arranged in the neighborhood of the guide surface 203 of the guide body 90. And then, goes to Step b4. At Step b4, the suction means 400 of the welding device 820 is operated by the suction source 213 so that the welding device 820 is fixed by suction to the article 23, and then goes to Step b5.

At Step b5, the operator operates the control means 60 to start the frictional stirring and welding operation. And, when the frictional stirring and welding operation is finished, goes to Step b6. At Step b6, the suction by the suction source 213 is released to cancel the suction of the suction means 211 of the guide body 90 and the suction means 400 of the welding device 820, and then goes to Step b7. At Step b7, the guide body 90 and welding device 820 are removed from the top surface of the welded article 23 and finishes the welding procedure.

As mentioned above, the suction means 400 is operated during the frictional stirring and welding operation, and is stopped other than the welding operation. Thus, during the period requiring no pressing force, the pressing force can be released, and the welding device 820 can be conveyed and installed easily. Particularly in this embodiment, a self-traveling friction stir welding device which is suited to frictional stirring and welding to a large structural body such as a pillar and a hull structural body, can reduce the equipment cost, and highly flexibly can deal with various articles to be welded having various shapes and dimensions can be realized. Furthermore, the suction means are installed on the guide body and friction stir welding device, thus the operation efficiency can be increased greatly.

Figure 46:
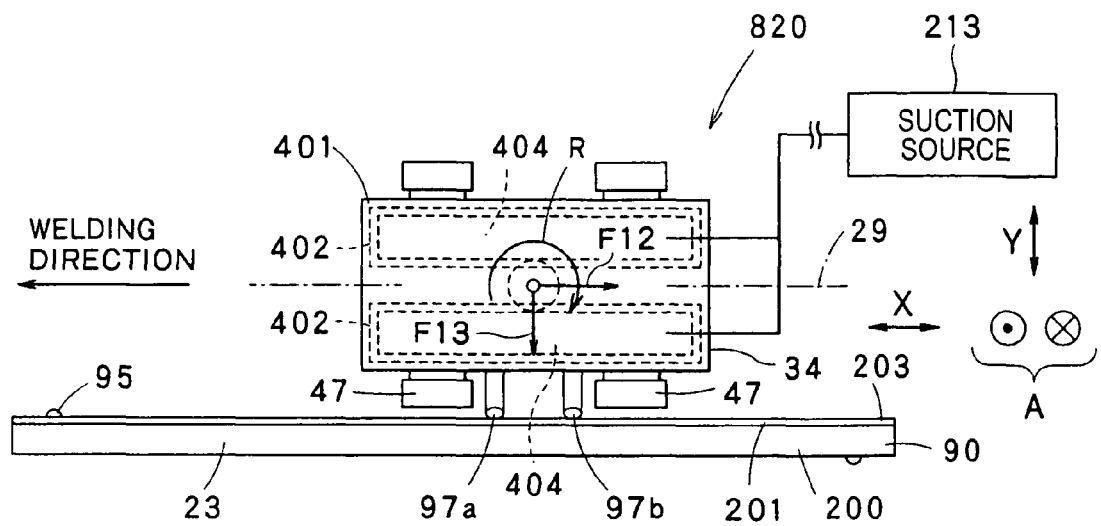
FIG. 46 is a plan view showing a modification of the welding device 820 of the tenth embodiment.

FIG. 46 is a plan view showing a modification of the welding device 820 of the tenth embodiment. In the suction means 400 shown in FIG. 41, two suction means 400 are formed on both sides in the traveling direction across the reference axial line L1. However, the suction means 400 may be formed on the bottom of the car body 34 excluding the immersion area of the welding tool 24.

In this embodiment, the suction space 404 is formed excluding the space extending in the traveling direction X including the reference axial line L1. Concretely, the suction space 404 is formed excluding the backward space at the center in the transverse direction extending on the backward side in the traveling direction from the reference axial line L1 including the reference axial line L1, that is, on the upstream side in the traveling direction and is formed excluding the forward space at the center in the transverse direction extending on the forward side in the traveling direction from the reference axial line L1 including the reference axial line L1, that is, on the downstream side in the traveling direction. By doing this, when the car body 34 travels above the article 23 and performs frictional stirring and welding, the opposite section 401 is prevented from facing the welding mark portion of the article 23 and the beveling portion of the article 23. Therefore, the pad section 402 can be prevented from touching burrs formed in the welding mark portion and beveling portion of the article 23 and the adhesion of the suction space 404 can be improved. Further, even if the welding mark portion and beveling portion are uneven, the gap between the pad section 402 and the article 23 is prevented from growing larger and the adhesion of the suction space 404 can be prevented from lowering.

Figure 47:
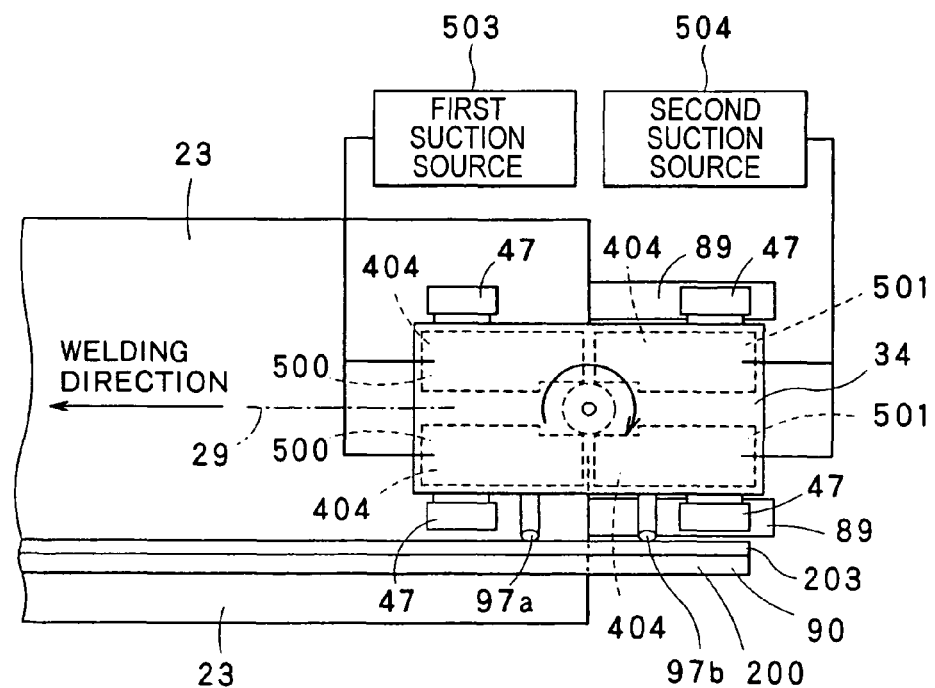
FIG. 47 is a plan view showing a modification of the welding device 820 of the tenth embodiment.

FIG. 47 is a plan view showing a modification of the welding device 820 of the tenth embodiment. In this embodiment, for the reference axial line L1, a first suction means 500 on the forward side in the traveling direction and a second suction means 501 on the backward side in the traveling direction are formed so as to operate independently of each other. In this embodiment, the suction means 500 and 501 respectively suction gas filled in the suction space 404 by suction sources 503 and 504. Concretely, the first suction means 500 suctions gas in the suction space 404 by the first suction source 503 and the second suction means 501 suctions gas in the suction space 404 by the second suction source 504. By doing this, even if the ends of the article 23 are to be frictionally stirred and welded, the car body 34 can be prevented from rising.

Concretely, as shown in FIG. 47, when welding the ends of the article 23 on the backward side in the traveling direction, that is, on the upstream side in the traveling direction by the car body 34, the car body 34 enters the state that the forward portion thereof in the traveling direction faces the article 23 and the backward portion thereof in the traveling direction does not face the article 23. In this case, in this embodiment, the first suction means 500 facing the article 23 is operated, thus even if the backward portion of the car body 34 does not face the article 23, the car body 34 can be pressed to the article 23.

Similarly, when welding the ends of the article 23 on the forward side in the traveling direction, that is, on the downstream side in the traveling direction by the car body 34, the car body 34 enters the state that the forward portion thereof in the traveling direction does not face the article 23 and the backward portion thereof in the traveling direction faces the article 23. In this case, in this embodiment, the second suction means 501 facing the article 23 is operated, thus even if the forward portion of the car body 34 does not face the article 23, the car body 34 can be pressed to the article 23.

Figure 48:
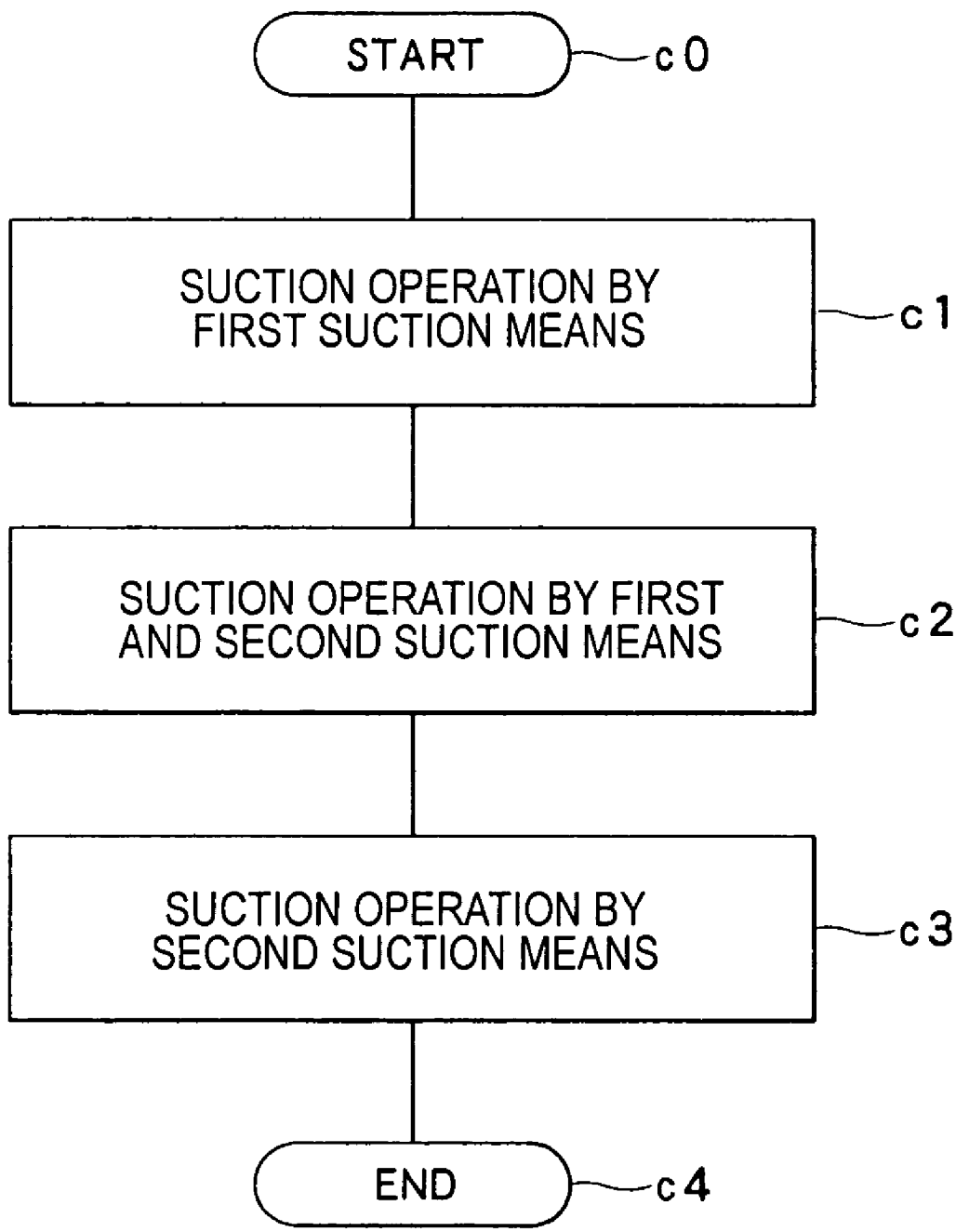
FIG. 48 is a flow chart showing the suction operation when welding the article to be welded 23 over both ends thereof.

FIG. 48 is a flow chart showing the suction operation when welding the article 23 over both ends thereof. As shown in FIG. 47, when the suction means 500 and 501 are respectively installed on both sides in the traveling direction across the reference axial line L1, to weld the ends of the article 23 in the traveling direction and to weld the middle portion thereof in the traveling direction, the suction condition of the suction means 500 and 501 are switched, thus the article 23 can be welded over both ends thereof in the traveling direction.

Concretely, firstly at Step c0, the members to be welded 21 and 22 are butted so as to form a beveling portion, and the traveling road member 89 is arranged on both sides of the beveling portion in the traveling direction, and the traveling road member 89 and members 21 and 22 are connected by a jig. When this preparation is completed, the process goes to Step c1. At Step c1, when the front wheels of the welding device 820 are arranged on the article 23 and the rear wheels are arranged on the traveling road member, only the first suction source 503 is operated. And, the car body 34 is pressed to the article 23 by the first suction means 400, and then the welding tool 24 is immersed, and the frictional stirring and welding operation is started. And, when the whole welding device 820 is moved onto the article 23, the process goes to Step c2.

At Step c2, at least either of the first suction source 503 and second suction source 504 is operated, and the car body 34 is pressed to the article 23 by the first and/or second suction means 400 or 401, and then the frictional stirring and welding operation is continued.

For example, until the welding device 820 reaches the neighborhood of the central position of the welding line 29 in the traveling direction, the first suction source 503 may be used and when it passes the central position of the welding line 29 in the traveling direction, the second suction source 504 may be used. Further, compared with the case using one suction source 503, in the state that the suction capacity is lowered, the two suction sources 503 and 504 may be used. When the front wheels of the welding device 820 move to the traveling road member 89 from the article 23 in this way, the process goes to Step c3.

At Step c3, only the second suction source 504 is operated. And, the car body 34 is pressed to the article 23 by the second suction means 501, and then the frictional stirring and welding operation is continued. And, when the welding tool 23 becomes apart from the welded article 23, the process goes to Step c4. At Step c4, the suction operation by the second suction source 504 is finished.

When the two suction sources 503 and 504 are switched and operated in this way, even when welding both ends of the article 23 in the traveling direction by the welding device, the article 23 can be prevented from rising and the article 23 can be welded satisfactorily. Here, the switching operation of the two suction sources 503 and 504 may be performed manually and may be performed by the control means 60. Further, in this embodiment, the two suction sources 503 and 504 are used. However, a switching valve for switching the suction route of one suction source to either of the first suction means and second suction means may be installed so that the switching condition of the switching valve can be switched. Even in this example, the similar effect can be obtained.

The embodiments of the present invention aforementioned are examples of the present invention and within the scope of the present invention, the constitution may be changed. For example, the rotation driving means 32, instead of an electric motor, may be realized by a hydraulic motor or an air motor. Further, the movement driving means 32, instead of an air cylinder, may be realized by a hydraulic cylinder or an electric servo pressure mechanism. Further, a constitution composed of several embodiments combined may be used. Further, for example, to allow the traveling direction of the device and the position of the welding tool to follow the welding line 29 against the reaction force given from the article 23 in the transverse direction Y, according to the detection results of the detection means 121, the respective traveling wheels on both sides in the transverse direction or the respective traveling wheels may be driven independently. Further, the suction source 213 may be loaded in the car body 34. Further, the welded article 23 may be used to manufacture a large and continuous aluminum structural body such as a ship and car. Or, it may be used to manufacture an LNG structural body.

Figure 49:
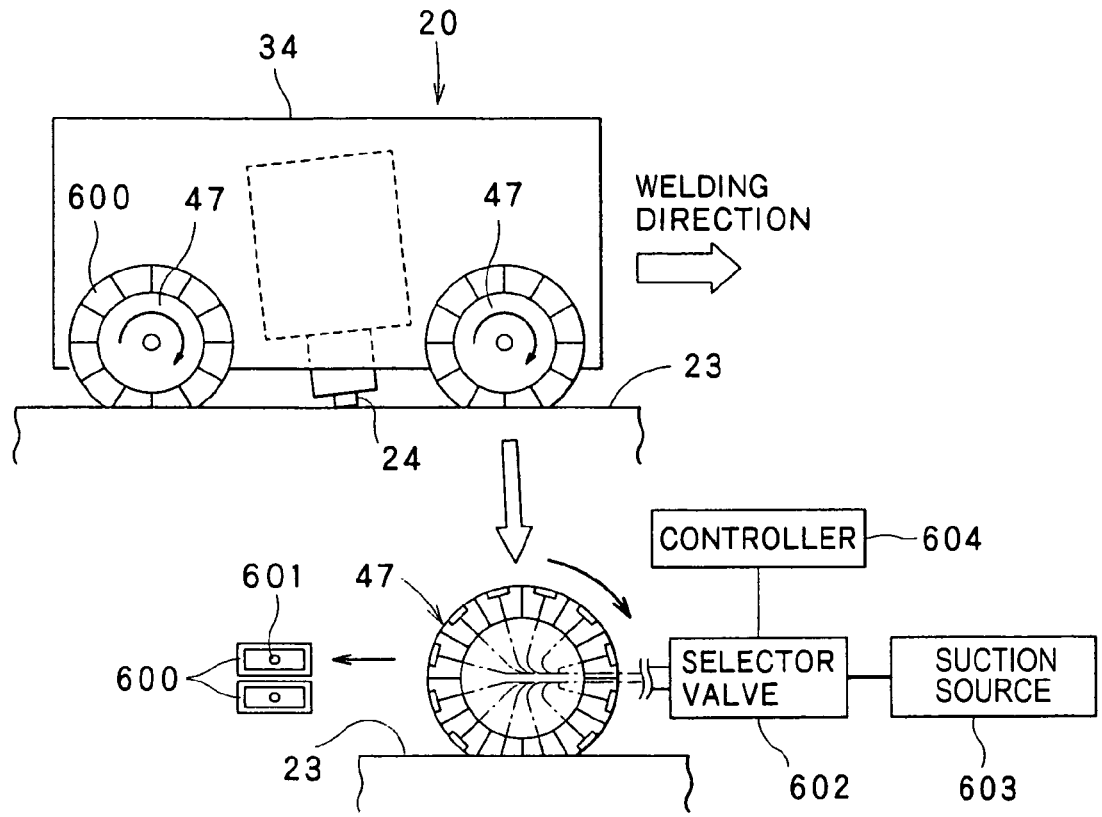
FIG. 49 is still another embodiment of the present invention having suctioning means on a wheel.

FIG. 49 shows still another embodiment of the present invention. In this embodiment, the wheels 47 are respectively provided with suctioning means comprising a plurality of vacuum suction pads 600. The vacuum suction pads 600 are circumferentially arranged on the outer periphery of the wheel 47. Each of the suction pads 600 has an opening which opens radially outward. A suction port 601 is formed in each of the suction pad 600 in order to suction a fluid (gas) in the suction pad 600. Each of the suction ports 601 is fluidly communicated with a selector valve 602 which is fluidly communicated with a suction source 603.

The selector valve 602 is controlled by a controller 604 so that only a suction pad/suction pads 600, which is/are opposed to a traveling road surface, i.e., the surface of the article 23, is/are suctioned by the suction source 603. In other words, the remaining suction pads 600, which are not opposed to the traveling load surface, are not suctioned by the suction source 603. Moreover, the wheels 47 can be suctioned independently with each other by the controller 604 so that only a part of the wheels 47, e.g., front wheels 47 or rear wheels 47, can be suctioned to the article 23.

According to this embodiment, the welding device 20 can be pressed against the article 23 by the suctioning means even when the welding device 20 is traveling. Accordingly, not only a spot welding but also a linear welding can be performed without any inconveniences.

Moreover, only a part of the wheels 47, e.g., the front wheels 47 or the rear wheels 47, can be suctioned so that the welding operations at the ends of the welding line can be performed without any inconveniences.

Figure 50:
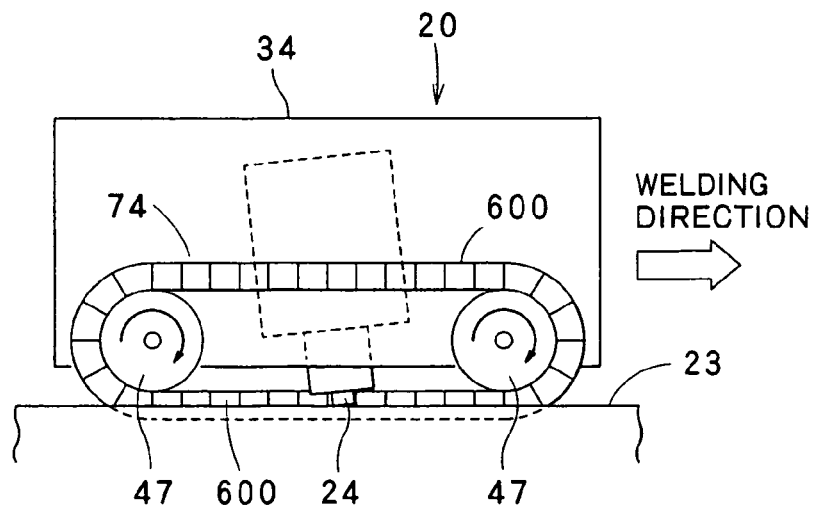
FIG. 50 is still another embodiment of the present invention having suctioning means on an endless belt.
Figure 51:
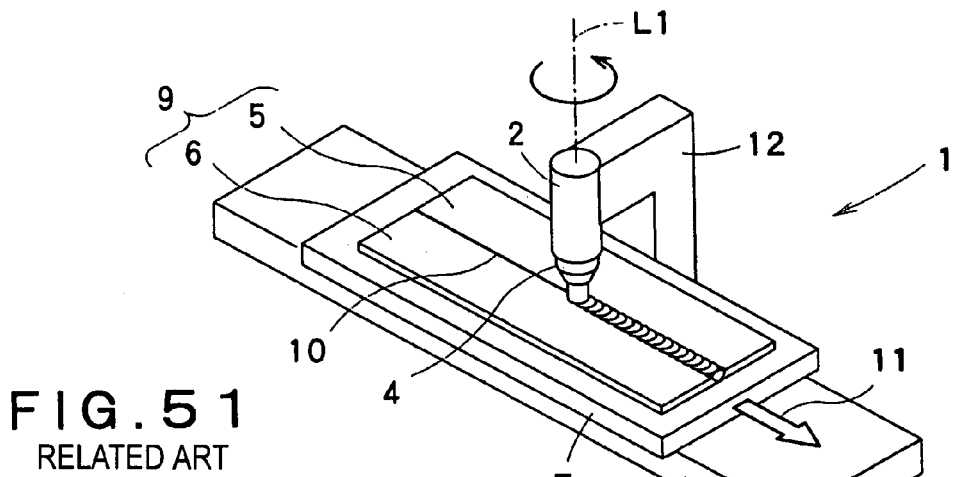
FIG. 51 is a perspective view showing the friction stir welding device 1 of the first related art.
Figure 52:
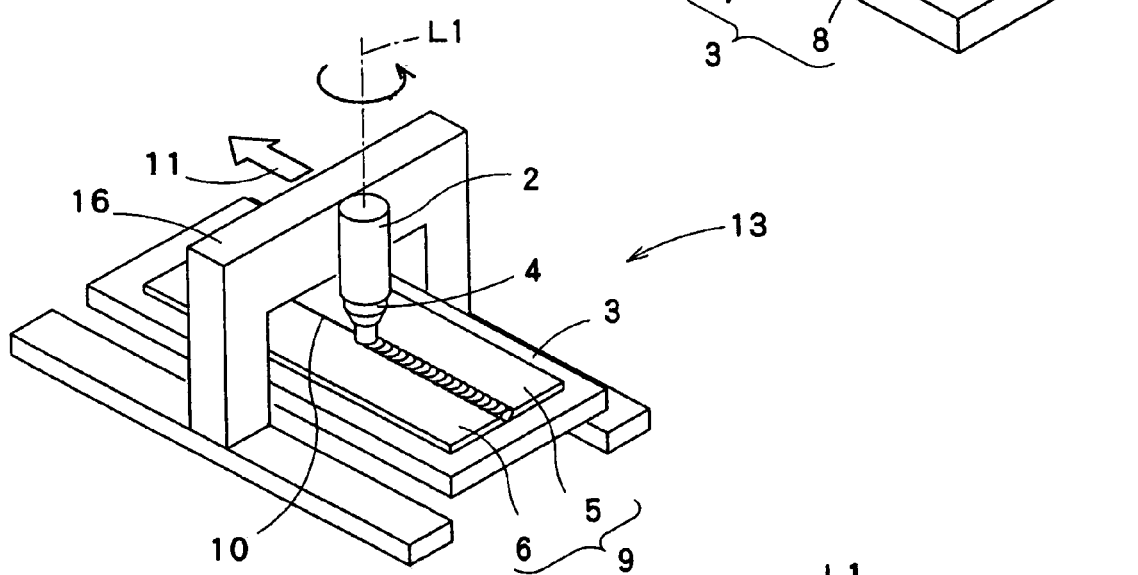
FIG. 52 is a perspective view showing the friction stir welding device 13 of the second related art.
Figure 53:
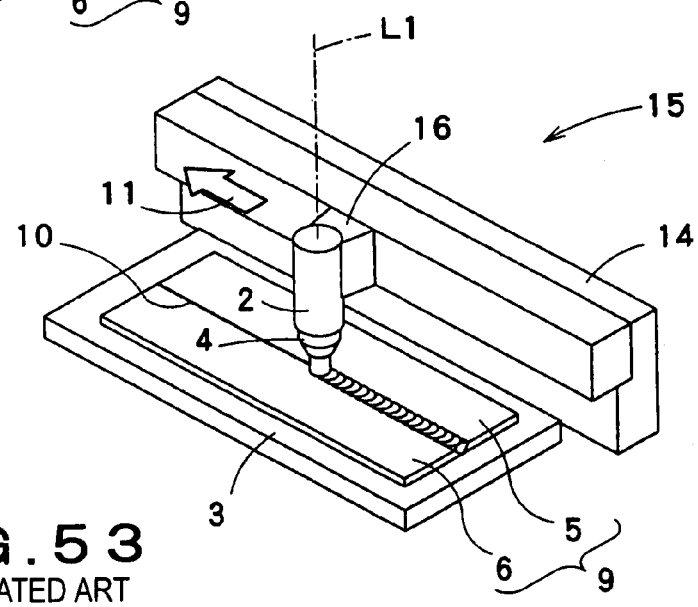
FIG. 53 is a perspective view showing the friction stir welding device 15 of the second related art.

FIG. 50 shows still another embodiment of the present invention which is made by modifying the embodiment shown in FIG. 49. Specifically, in this embodiment, a pair of endless belts 74 are used instead of the wheels 47. The endless belt 74 comprises a plurality of vacuum suction pads 600 which are circumferentially arranged. Similar to the embodiment shown in FIG. 49, the vacuum suction pads 600 are fluidly communicated with the suction source 603 via the selector valve 602 which is controlled by the controller 604. The operations and effects of this embodiment are similar to the embodiment shown in FIG. 49.

Further, the present invention may realize the following embodiments.

(1) A friction stir welding device for welding an article composed of a plurality of members to be welded by frictionally stirring the article using a welding tool, including:

a tool holding section installed rotatably round a predetermined reference axial line for holding the welding tool;

a rotation driving means for driving the tool holding section to rotate round the reference axial line;

a movement driving means for driving the tool holding section to move along the reference axial line; and a car body configured to travel, the tool holding section, the rotation driving means, and the movement driving means being loaded on the car body, wherein the car body is configured to travel above the article to be welded.

According to this constitution, in the state that the tool holding section holding the welding tool is rotated and is immersed into the article, the car body travels along the welding line of the article. By doing this, the two members are welded. Therefore, unlike the first related art, there is no need to move the article to be welded. The car body travels above the article so that, unlike the second related art, the friction stir welding device does not need to support the tool holding section, rotation driving means, and movement driving means outside the article in the horizontal direction. Therefore, it can perform frictional stirring and welding regardless of the size and shape of articles to be welded.

Therefore, even if the article to be welded is large, the friction stir welding device is not necessarily enlarged. Therefore, the equipment cost and installation space of the friction stir welding device can be reduced. Further, even if the shape of the article to be welded is changed, only the traveling route of the friction stir welding device is changed and there is no need to separately install a new device. By doing this, a flexible applicability is available and the wide usability can be improved.

(2) A friction stir welding device for welding an article composed of a plurality of members to be welded by frictionally stirring the article using a welding tool, including:

a tool holding section installed rotatably round a predetermined reference axial line for holding the welding tool;

a rotation driving means for driving the tool holding section to rotate round the reference axial line;

a movement driving means for driving the tool holding section to move along the reference axial line; and a car body configured to travel, the tool holding section, the rotation driving means, and the movement driving means being loaded on the car body, wherein the car body is configured to travel below the article to be welded.

According to this constitution, in the state that the tool holding section holding the welding tool is rotated and is immersed into the welded article, the car body travels along the welding line of the article to be welded. By doing this, the two members are welded. The car body travels below the article to be welded so that the friction stir welding device does not need to support the tool holding section, rotation driving means, and movement driving means outside the article in the horizontal direction. Therefore, it can perform frictional stirring and welding regardless of the size and shape of articles to be welded.

According to this constitution, even if the car body is arranged either of above and below the article to be welded, welding can be performed and the convenience can be improved. For example, when the article to be welded is large, in the state that the article is held by another holding device, the friction stir welding device can travel itself and perform the frictional stirring and welding operation. At this time, even if the friction stir welding device can arrange the car body only in one direction among the upward and downward directions for the article, the device can weld the article in accordance with the direction and in the state that the article is held by another holding device, the device can perform the welding operation.

(3) The car body is equipped wheels or an endless belt rotating on the traveling road surface and the wheels or endless belt can be removably formed at both ends of the car body in the reference axial direction.

According to this constitution, the reference axial direction is the vertical direction at time of frictional stirring and welding. When the car body is arranged above the article, the tool holding section is arranged downward and the wheels or endless belt are mounted at the lower end of the car body. At time of welding, the tool holding section is driven to move downward and the welding tool is immersed into the article.

Further, when the car body is arranged below the article to be welded, the tool holding section is arranged upward and the wheels or endless belt are mounted at the lower end of the car body. At time of welding, the tool holding section is driven to move upward and the welding tool is immersed into the article.

The car body or endless belt can be mounted at both ends in the reference axial direction in this way, thus even if the car body is arranged above or below the article to be welded, it can travel in the state that the tool holding support, rotation driving means, and movement driving means are supported from below and the frictional stirring and welding operation can be performed.

(4) The friction stir welding device further includes a car body pressing means, at time of welding, for giving force against the reaction force in the reference axial direction given from the article to the car body.

According to this constitution, when immersing the welding tool into the article, the car body receives reaction force in the reference axial direction from the article. The car body is given pressing force against the reaction force by the car body pressing means, thus the car body can be prevented from separation from the article. By doing this, the immersion amount of the welding tool into the article can be prevented from deficiency.

According to this constitution, when the car body pressing means gives pressing force against the reaction force given from the article to the car body, the car body can be prevented from separation from the welded article. By doing this, the immersion amount of the welding tool into the article can be prevented from deficiency and the welding quality can be improved.

For example, when the immersion direction of the welding tool is downward in the vertical direction, the friction stir welding device traveling itself can be prevented from rising. The car body pressing means may be a pressing mechanism which extends from the wall of the ceiling and physically presses the car body. Moreover, it may give force to the car body using electromagnetic force or suction force by air suction. Further, the car body pressing means may be a weight loaded on the car body in order to generate force exceeding the pressing force given to the article by the welding tool.

(5) The friction stir welding device, at time of welding, in consideration of the reaction force in the perpendicular direction to the reference axial direction given from the article, further includes a traveling auxiliary means for traveling the car body along a predetermined movement route.

According to this constitution, when traveling the car body along a predetermined movement route in the state that the welding tool is rotated and is immersed into the article, the car body receives the reaction force in the direction perpendicular to the reference axial direction from the article. The traveling auxiliary means, in consideration of the reaction force, travels the car body along the predetermined traveling route, thus the welding tool can be prevented from shifting from the movement route.

According to this constitution, the traveling auxiliary means, in consideration of the reaction force given from the article, travels the car body along the predetermined traveling route. By doing this, even if the friction stir welding device travels itself, the welding tool can be prevented from shifting from the movement route. Therefore, the welding tool can accurately follow the welding line of the article. Therefore, when the welding line is long, that is, even if the article is large, the welding tool can move along the welding line and the welding quality can be prevented from lowering. For example, the traveling auxiliary means may be realized by a steering means for adjusting the moving direction or a guide rail for guiding the car body along the welding line.

(6) The friction stir welding device further includes a correction movement means for moving the tool holding section to the position where the shift amount between the tool holding section and the welding position is canceled.

According to this constitution, the tool holding section can be moved with respect to the article so as to cancel the shift by the correction movement means. The correction movement means may move the tool holding section with respect to the car body and may move the tool holding section together with the car body. The shift between the tool holding section and the welding position is canceled in this way, thus even if a teaching error of the welding position, a welding position error, or a traveling movement error is caused, the article can be welded accurately at the welding position. Further, even if the car body receives reaction force from the article, the welding tool can be prevented from shifting from the predetermined traveling route.

(7) The friction stir welding device further includes a shift amount detection means for detection a shift amount between the tool holding section and the welding position and a control means for controlling the auxiliary movement means on the basis of detection results of the shift amount detection means.

According to this constitution, the shift amount detection means detects a shift amount between the tool holding section and the welding position and the control means moves the tool holding section with respect to the article so as to cancel the shift using the correction movement means. By doing this, the operator does not need to operate the correction movement means and the convenience can be improved.

(8) The correction movement means moves the tool holding section with respect to the car body.

According to this constitution, the tool holding section is moved with respect to the car body, thus regardless of movement of the car body, the tool holding section can be moved according to the shift. By doing this, the follow-up of the tool holding section to the welding position is improved, thus the welding tool can be prevented from shifting from the predetermined traveling route. Further, the position of the welding tool can be adjusted finely.

(9) The correction movement means corrects the moving angle of the car body.

According to this constitution, only by correcting the moving angle of the car body, the tool holding section can be moved according to the shift. By doing this, even if the moving direction and welding line are shifted from each other and the shift amount is increased as the car body travels, the welding tool can be prevented from shifting from the predetermined traveling route.

(10) The wheels or endless belt has an outer circumferential portion formed by a material of a high friction coefficient with respect to the traveling road surface. According to this constitution, the friction coefficient of the wheels or endless belt is set high, thus the wheels or endless belt can be prevented from slipping.

(11) The friction stir welding device further includes a regulation means for controlling the movement of the tool holding section so as to adjust the immersion amount of the welding tool into the article to a predetermined immersion amount. According to this constitution, the immersion amount of the welding tool is adjusted to the predetermined immersion amount by the regulation means. By doing this, the welding tool can be prevented from excessive immersion into the article.

(12) The regulation means includes a connection section connected to the tool holding section and an elastic expansion and contraction section which is connected to the connection section and expands and contracts along the reference axial line. When the welding tool is about to immerse more from the state that it is immersed by the predetermined immersion amount, the regulation means controls the immersion of the welding tool by the spring force given to the tool holding section from the expansion and contraction section in contact with the article.

According to this constitution, when the welding tool is immersed, the connection section and the expansion and contraction section move toward the article together with the tool holding section. When the welding tool is immersed into the article by the predetermined immersion amount, the front end of the expansion and contraction section makes contact with the article and is prevented from moving in the reference axial direction. When the welding tool is immersed more, the expansion and contraction section is contracted, thereby gives the spring force in the opposite direction to the immersion direction to the tool holding section. By doing this, when the welding tool is immersed deeper than the predetermined immersion amount, the spring force from the expansion and contraction section is given to the tool holding section, so that a further immersion of the welding tool can be controlled.

According to this constitution, the regulation means is realized by the elastic expansion and contraction section. When the friction stir welding device travels itself, depending on the traveling road surface condition, it may be difficult to keep the immersion amount of the welding tool constant. However, by use of the regulation means having the expansion and contraction section aforementioned, the immersion amount of the welding tool can be prevented from shifting from the predetermined immersion amount. By doing this, even if the welding line of the article is long, the immersion amount of the welding tool can be prevented from changing during movement along the welding line and the welding quality can be improved. Further, when the immersion amount is fixed mechanically, there is no need to use a sensor and the regulation means can be realized by a simple constitution.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. A friction stir welding device for welding an article to be welded by frictionally stirring the article by means of a welding tool, comprising:
   a tool holding section configured to hold the welding tool and rotate around a predetermined reference axial line;
   a rotation driving unit configured to drive the tool holding section to rotate around the reference axial line;
   a movement driving unit configured to drive the tool holding section to move along the reference axial line;
   a car body defining an upper side and a lower side, the car body loaded with the tool holding section, the rotation driving unit and the movement driving unit, the car body being configured to travel above or below the article, wherein the car body includes a wheel or an endless belt configured to rotate on a surface, the wheel or endless belt configured to be detachably mounted on the upper and lower sides of the car body so that the car body can be reversed upside down together with the tool holding section; and
   a suctioning unit mounted on the car body and configured to be attached to a surface by suction so that the car body is fixed on the surface,
   wherein the car body comprises a contact portion which is configured to make contact with a part of a guide body on one side of the guide body in a width direction in a traveling state of the car body, the guide body being disposed so as to extend parallel with a welding line of the article while keeping a predetermined interval from the welding line, the contact portion transmitting a reaction force, which is given from the article in a transverse direction perpendicular to both the reference axial line and a traveling direction of the car body, to the guide body.

2. A friction stir welding device according to claim 1, further comprising:
   a shift amount detection unit configured to detect an amount of shift of the tool holding section from the welding line in the transverse direction;
   a correction moving unit mounted on the car body and configured to move the tool holding section in the transverse direction with respect to the car body; and
   a controller configured to control the correction moving unit based on a detection result of the shift amount detection unit.

3. A friction stir welding device according to claim 1, wherein the car body is configured to travel in a trackless manner.

4. A friction stir welding device according to claim 1, wherein the car body is configured to be placed on the article so as to travel on the article.

5. A friction stir welding device according to claim 1, wherein the suctioning unit comprises an opposite section connected to the car body so as to be opposite to the surface and a pad section configured to close a space between the opposite section and the surface, a fluid filled in a suction space enclosed by the opposite section and the fluid within the suction space being suctioned by a suction source.

6. A friction stir welding device according to claim 5, wherein the suction source is installed separately from the car body.

7. A friction stir welding device according to claim 5, wherein the suction space is formed in an area excluding a backward space in a middle in a transverse direction which is perpendicular to both the reference axial line and a traveling direction of the car body, the backward space extending backward in the traveling direction from the reference axial line including the reference axial line.

8. A friction stir welding device according to claim 5, wherein the suction space is formed in an area excluding a forward space in a middle in a transverse direction which is perpendicular to both the reference axial line and a traveling direction of the car body, the forward space extending forward in the traveling direction from the reference axial line including the reference axial line.

9. A friction stir welding device according to claim 5, wherein the suction space comprises a plurality of suction spaces, fluids filled in the suction spaces being able to be suctioned independently of each other.

10. A friction stir welding device according to claim 9, wherein the spaces comprise a first suction space formed in a forward position in a traveling direction with respect to the reference axial line and a second suction space formed in a rearward position in the traveling direction with respect to the reference axial line, fluids filled in the first and the second suction spaces being able to be suctioned independently of each other.

11. A friction stir welding device according to claim 1, wherein the car body comprises a wheel or an endless belt which is configured to rotate on the surface, and wherein the suctioning unit comprises a plurality of suction spaces circumferentially arranged on an outer periphery of the wheel or the endless belt so as to open radially outward, a fluid in a part of the suction spaces, which are opposite to the surface being suctioned by a suction source when the car body is traveling on the surface.

12. A friction stir welding device according to claim 1, wherein the article comprises two members to be welded, each of the members being formed in a curved surface shape.

13. A friction stir welding device for welding an article to be welded by frictionally stirring the article by means of a welding tool, comprising:
   a tool holding section configured to hold the welding tool and rotate around a predetermined reference axial line;
   a rotator configured to drive the tool holding section to rotate around the reference axial line;
   a driver configured to drive the tool holding section to move along the reference axial line;
   a car body defining an upper side and a lower side, the car body loaded with the tool holding section, the rotator and the driver, the car body being configured to travel above or below the article, wherein the car body includes a wheel or an endless belt configured to rotate on a surface, the wheel or endless belt configured to be detachably mounted on the upper and lower sides of the car body so that the car body can be reversed upside down together with the tool holding section; and
   a suction unit mounted on the car body and configured to be attached to a surface by suction so that the car body is fixed on the surface, wherein the car body comprises a contact portion which is configured to make contact with a part of a guide body on one side of the guide body in a width direction in a traveling state of the car body, the guide body being disposed so as to extend parallel with a welding line of the article while keeping a predetermined interval from the welding line, the contact portion transmitting a reaction force, which is given from the article in a transverse direction perpendicular to both the reference axial line and a traveling direction of the car body, to the guide body.

* * * * *